United States Patent
Murphy et al.

(10) Patent No.: US 12,465,573 B2
(45) Date of Patent: Nov. 11, 2025

(54) STRUCTURED NANOCOATINGS FOR THE STABILIZATION OF PLURIPOTENT STEM CELL MEDIA COMPONENTS

(71) Applicant: Wisconsin Alumni Research Foundation, Madison, WI (US)

(72) Inventors: William L. Murphy, Waunakee, WI (US); Andrew Khalil, Madison, WI (US); Angela Xie, Middleton, WI (US); Hunter Johnson, Brooklyn, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 969 days.

(21) Appl. No.: 17/045,293

(22) PCT Filed: Apr. 5, 2019

(86) PCT No.: PCT/US2019/026086
§ 371 (c)(1),
(2) Date: Oct. 5, 2020

(87) PCT Pub. No.: WO2019/195748
PCT Pub. Date: Oct. 10, 2019

(65) Prior Publication Data
US 2021/0145757 A1    May 20, 2021

Related U.S. Application Data

(60) Provisional application No. 62/653,847, filed on Apr. 6, 2018.

(51) Int. Cl.
*A61K 9/50* (2006.01)
*C12N 5/0735* (2010.01)
*C12N 5/074* (2010.01)

(52) U.S. Cl.
CPC ............ *A61K 9/501* (2013.01); *C12N 5/0606* (2013.01); *C12N 5/0696* (2013.01); *C12N 2501/115* (2013.01); *C12N 2501/15* (2013.01); *C12N 2531/00* (2013.01); *C12N 2533/18* (2013.01); *C12N 2533/90* (2013.01)

(58) Field of Classification Search
CPC ............... C12N 5/0606; C12N 5/0696; C12N 2501/115; C12N 2533/10
See application file for complete search history.

(56) References Cited

U.S. PATENT DOCUMENTS

| | | |
|---|---|---|
| 2009/0311735 A1 | 12/2009 | Scully et al. |
| 2014/0161886 A1 | 6/2014 | Murphy et al. |
| 2015/0079046 A1 | 3/2015 | Sinden et al. |

FOREIGN PATENT DOCUMENTS

| | | |
|---|---|---|
| WO | 00/71152 A1 | 11/2000 |

OTHER PUBLICATIONS

Eiselleova et al., Stem Cells, 27, 2009, 1847-1857.*
Johnson, Diabetes, 5(2), 1982, 1-9.*
Wang et al., J Control Release, 2009, 134(2), 81-90.*
Tsai et al., Molecular Cell, 47, 1699-182, 2012.*
Khalil et al., "Substained release and protein stabilization reduce the growth factor dosage required for human pluripotent stem cell expansion," Biomaterials, Elsevier, vol. 248, Apr. 6, 2020 (Apr. 6, 2020).
Lotz et al., "Sustained Levels of FGF2 Maintain Undifferentiated Stem Cell Cultures with Biweekly Feeding", PLOS ONE, vol. 8, No. 2, Feb. 20, 2013, p. e56289.
Yu et al., "Multilayered Inorganic Microparticles for Tunable Dual Growth Factor Delivery," Advanced Functional Materials, vol. 24, No. 20, Feb. 10, 2014, pp. 3082-3093.

* cited by examiner

*Primary Examiner* — Kyle A Purdy
(74) *Attorney, Agent, or Firm* — Quarles & Brady, LLP

(57) ABSTRACT

Disclosed are compositions and methods for pluripotent stem cell culture. Compositions include mineral coated microparticles having a core and a mineral coating, wherein the mineral coating includes fibroblast growth factor. Also disclosed are methods for pluripotent stem cell culture methods using mineral coated microparticles including fibroblast growth factor.

8 Claims, 42 Drawing Sheets

| MCM : bFGF Binding Solutions | | |
|---|---|---|
| Level | [MCM] (mg/mL) | [bFGF] (µg/mL) |
| a | 0.38 | 0.38 |
| -1 | 0.50 | 0.50 |
| 0 | 1.00 | 1.00 |
| +1 | 2.00 | 2.00 |
| A | 2.67 | 2.67 |

FIG. 14A
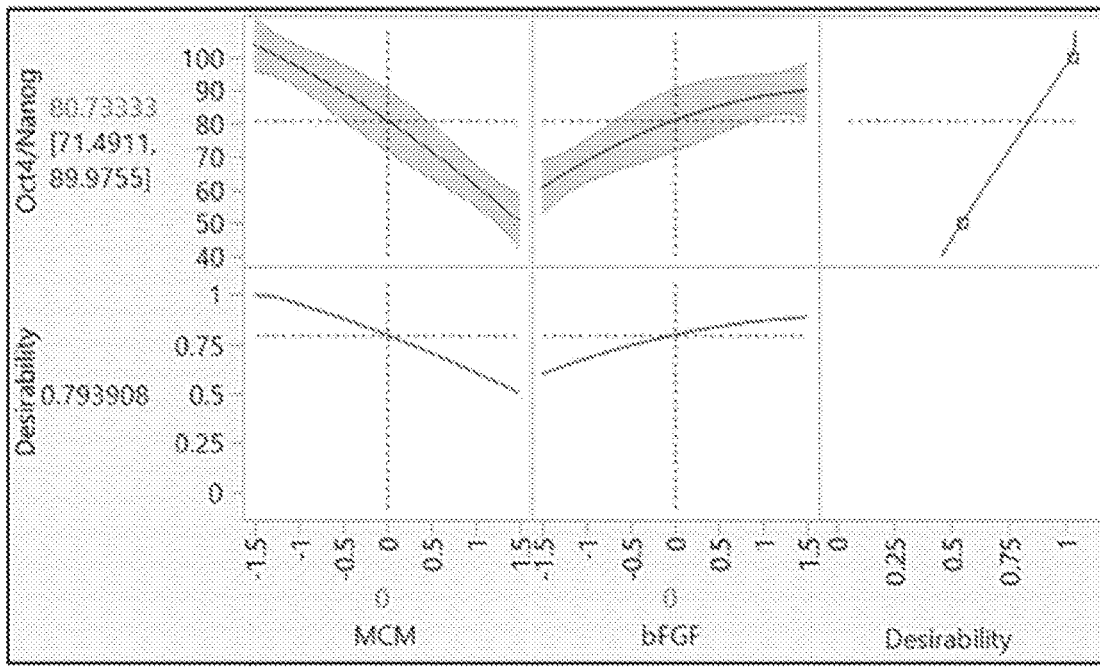
FIG. 14B
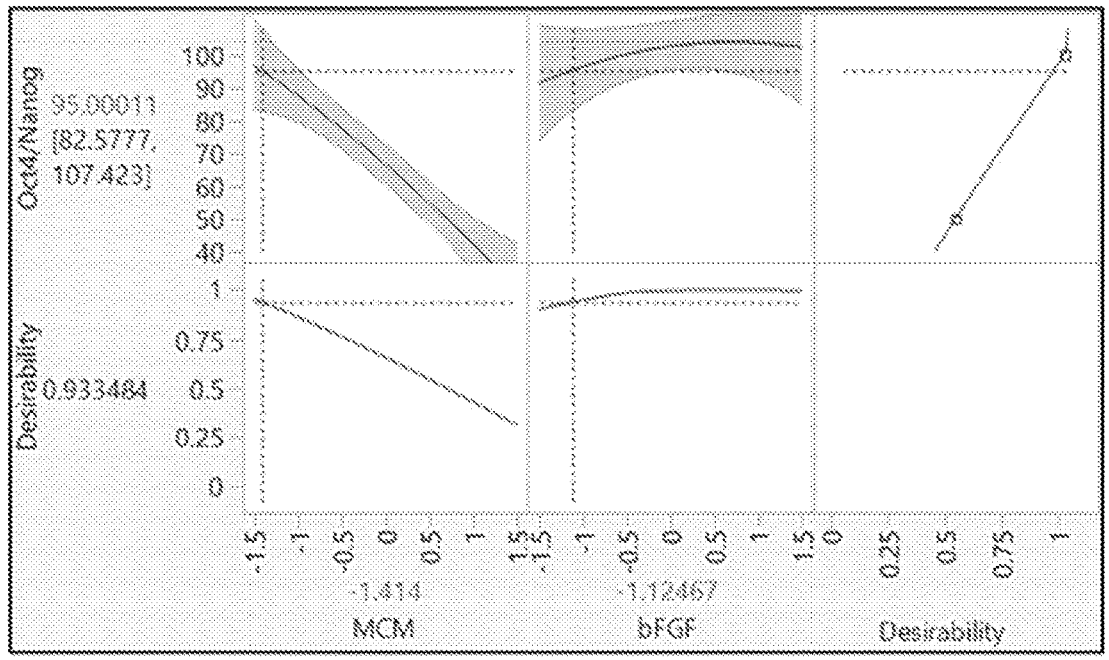
FIG. 14C
| Source | Nparm | DF | Sum of Squares | F Ratio | Prob > F |
|---|---|---|---|---|---|
| MCM | 1 | 1 | 7498.7055 | 126.5549 | <.0001* |
| bFGF | 1 | 1 | 2288.4351 | 38.6217 | <.0001* |
| MCM*bFGF | 1 | 1 | 226.2008 | 3.8176 | 0.0642 |
| MCM*MCM | 1 | 1 | 26.0319 | 0.4393 | 0.5147 |
| bFGF*bFGF | 1 | 1 | 55.7337 | 0.9406 | 0.3432 |

STRUCTURED NANOCOATINGS FOR THE STABILIZATION OF PLURIPOTENT STEM CELL MEDIA COMPONENTS

CROSS-REFERENCE TO RELATED APPLICATIONS

This application claims priority to International Patent Application No. PCT/US2019/026086 (published as WO 2019/195748), filed Apr. 5, 2019, which claims priority to U.S. Provisional Application Ser. No. 62/653,847 filed Apr. 6, 2018, both of which are hereby incorporated by reference in their entireties.

STATEMENT REGARDING FEDERALLY SPONSORED RESEARCH OR DEVELOPMENT

This invention was made with government support under HL093282 and EB019558 awarded by the National Institutes of Health. The government has certain rights in the invention.

BACKGROUND

The present disclosure is directed to compositions, methods of cell culture, and kits including reagents for cell culture. Compositions include mineral coated microparticles ("MCMs") having a core and a mineral coating that includes fibroblast growth factor. Also disclosed are cell culture methods for sustained delivery of fibroblast growth factor. The compositions and methods described provide a reduction in the dosage of growth factors needed for maintaining pluripotency of stem cells in culture.

Stem cells such as human pluripotent stem cells (hPSCs) hold immense potential in the fields of tissue engineering and regenerative medicine. The maintenance of hPSCs in an undifferentiated and proliferative state in vitro is dependent on essential soluble factors provided in the culture medium. At least one component for hPSC maintenance is basic fibroblast growth factor (bFGF). In hPSCs, bFGF is critical for cell survival, cell cycle regulation and regulation of the pluripotency gene network. However, at physiological temperatures, bFGF is thermally unstable and has a short mean half-life (see FIG. 1). As a result, standard hPSC culture media such as Essential 8 (E8) require high concentrations of bFGF and daily media changes to maintain sufficient levels of biologically active growth factor. With nearly 50% of the costs of stem cell-derived therapy attributed to growth factor-containing medium, the thermal instability of bFGF is a limiting factor for large-scale biomanufacturing of hPSCs.

Previous studies have attempted to circumvent this thermal instability via the use of alternative, more stable FGF isoforms as well as mutant isoforms that improve the growth factor's thermal stability. However, the complete mechanism of how bFGF promotes pluripotency is not known; therefore, changes in established media culture methods towards using alternate isoforms or mutant proteins may result in untoward effects and generation of new latent variables in hPSC use.

Sustained release of bFGF from beads of the co-polymer poly(lactic-co-glycolic acid) (PLGA) has been successfully employed as an alternative strategy to reduce the amount of media changes required and thus the amount of media consumed in hPSC culture. This approach has the benefit that the wild-type bFGF already in widespread use for hPSC culture does not have to be modified. Additionally, the results of the sustained release of bFGF culture methods suggest that there may be a benefit from the more constant concentration of bFGF as opposed to oscillating concentrations from extremely high (100 ng/mL) to essentially no remaining active bFGF after 24 hours. However, the method involves the encapsulation of bFGF within the PLGA beads via water/oil/water emulsion with the bFGF in water and the PLGA in the organic solvents dichloromethane and polyvinyl alcohol. This emulsion technique has been shown to result in poor loading and release efficiency of active bFGF due to the exposure of bFGF to denaturing organic solvents, formation of protein agglomerates in the PLGA, and poor fractional release from the bulk material. As a result, despite the reduction in media changes, the amount of bFGF activity lost in the bead loading and release may not afford a substantial reduction in total growth factor consumption.

Accordingly, there exists a need for stabilizing growth factors (e.g., maintaining a growth factor such as bFGF in an active state) and alternative culture methods that can reduce the required concentrations of growth factors while maintaining pluripotency.

BRIEF DESCRIPTION

In one aspect, the present disclosure is directed to a mineral coated microparticle for binding and stabilizing fibroblast growth factor comprising: a core; and a mineral coating, the mineral coating comprising fibroblast growth factor.

In one aspect, the present disclosure is directed to a kit for releasing fibroblast growth factor comprising: a container comprising a mineral coated microparticle that comprises a core; and a mineral coating, the mineral coating comprising fibroblast growth factor.

In one aspect, the present disclosure is directed to a pluripotent stem cell culture method for maintaining stem cell pluripotency, the method comprising: contacting a pluripotent stem cell with a mineral coated microparticle, the mineral coated microparticle comprising a core and a mineral coating that comprises fibroblast growth factor.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein:

FIG. 1A depicts phase micrographs showing greater spontaneous differentiation of hESCs cultured in E7 than E7 with increasing concentrations of TC MCMs+bFGF. Scale bar=500 µm. FIG. 1B depicts the percentage of Oct4$^+$/Nanog$^+$ cells from E8, E7, and E7+1 mg MCMs+bFGF for 3 passages and 12 days of TC culture. N=3 *,,* represent statistically different groups p<0.05 by one-way ANOVA with Tukey's post hoc analysis. FIG. 1C depicts the percentage of Oct4$^+$/Nanog$^+$ cells from increasing MCMs+bFGF per transwell after 12 days of culture. N=3 a,b,c,d,e represent statistically different groups p<0.05 by one-way ANOVA with Tukey's post hoc analysis.

FIG. 2A depicts phase micrographs showing greater spontaneous differentiation of hESCs cultured in E7 than E7 with increasing concentrations of DC MCMs+bFGF. Scale bar=500 µm. FIG. 2B depicts the percentage of Oct4$^+$/Nanog$^+$ cells from E8, E7, and E7+0.15 mg MCMs+bFGF after 2 passages and 9 days of TC culture. N=3 *,,* represent statistically different groups p<0.05 by one-way ANOVA with Tukey's post hoc analysis. FIG. 2C depicts the percentage of Oct4+/Nanog+ cells from increasing MCMs+bFGF per well after 9 days of culture. N=3 a,b,c represent statistically different groups p<0.05 by one-way ANOVA with Tukey's post hoc analysis.

FIG. 3A depicts a schematic (left) and levels (right) of surface response design, centered around 1 mg/mL MCM and 1 μg/mL bFGF in the loading solution, with axial positions. FIG. 3B (left panel) depicts the percentage of Oct4+/Nanog+ cells from E8 and DOE MCMs+bFGF conditions for 3 passages and 12 days of TC culture. N=3 *, represent groups statistically different than E8 condition p<0.05 by one-way ANOVA with Dunnett's post hoc analysis and (right panel) the percentage of Oct4+/Nanog+ cells from E8 and E8-equivalent DOE MCMs+bFGF conditions with bFGF consumption plotted on the right axis. FIG. 3C depicts phase micrographs showing normal colony morphology and lack of spontaneous differentiation in MCMs+bFGF DOE conditions that were equivalent to E8 in Oct4+/Nanog+ population percentage.

FIG. 4A depicts model fit (top left) and leverages of MCM factor (top right), bFGF factor (bottom left), and interactions between the MCM and bFGF factors (bottom right). FIG. 4B depicts factor profiler and desirability matrix showing optimum levels for MCM and bFGF concentrations in bFGF-loaded MCM generation in order to maximize Oct4+/Nanog+ population percentage.

FIG. 5A depicts bFGF loading solutions (a -) and potential second condition evaluated (- 3). FIG. 5B depicts dilution of (- 3) MCMs+bFGF from 1.0 to 0.25 mg/transwell in TC culture. N=3 *, represent groups statistically different than E8 condition p<0.05 by one-way ANOVA with Dunnet's post hoc analysis. FIG. 5C depicts dilution of (a -) MCMs+bFGF from 1.0 to 0.25 mg/transwell in TC culture. N=3 *, represent groups statistically different than E8 condition p<0.05 by one-way ANOVA with Dunnet's post hoc analysis. FIG. 5D depicts dilution of (a -) MCMs+bFGF from 0.245 to 0.061 mg/well in DC culture. N=3 *, represent groups statistically different than E8 condition p<0.05 by one-way ANOVA with Dunnett's post hoc analysis. FIG. 5E depicts percentage of Oct4+/Nanog+ cells from E8 and E8-equivalent optimum DOE MCMs+bFGF dilution conditions with bFGF consumption plotted on the right axis. FIG. 5F depicts phase micrographs of showing normal colony morphology and lack of spontaneous differentiation in MCMs+bFGF that were equivalent to E8 in Oct4+/Nanog+ population percentage.

FIG. 7A is a schematic of experimental setup for direct in-plate bFGF ELISA as used in Example 5. To detect bioactivity of bFGF released from MCMs in real-time, solutions containing bFGF-MCMs were added to wells of a Quantikine bFGF ELISA assay shown to detect only active bFGF. All following steps of the ELISA (binding, washes, detection) were carried out following the manufacturer's protocol. FIG. 7B shows that MCMs were confirmed not to interfere with bFGF Quantikine ELISA readouts. Assay controls demonstrated that signal produced in direct in-plate ELISA is due to i) released bFGF from MCMs, and not due to binding of detection antibody to blank MCMs in the ii) absence or iii) presence of capture antibody, or iv) insufficient removal of bFGF-MCMs during washes and binding of detection antibody to remaining bFGF-MCMs. **** p<0.0001 (one-way ANOVA with Tukey's post-hoc).

FIG. 8A depicts scanning electron microscopy of MCMs used for bFGF delivery. Scale bar=10 μm (left) and 1 μm (middle and right). FIG. 8B depicts cumulative calcium release from MCMs based on dissolution of the mineral coating. FIG. 8C depicts the efficiency of bFGF binding by MCMs, as measured by Quantikine bFGF ELISA.

FIG. 9A is a schematic for binding of bFGF to mineral-coated microparticles (MCMs) in solution. FIG. 9B is a proposed model for presentation and presence of active bFGF over time in (top) conventional chemically-defined hPSC culture or (bottom) culture with bFGF-loaded MCMs (bFGF-MCMs). bFGF loses activity over time when delivered as soluble protein via daily media changes in culture, while MCMs stabilize and allow sustained release of active bFGF. FIG. 9C is a schematic representation of two culture formats employed in this study: Transwell culture, in which MCMs release bFGF from Transwells, and direct culture, in which MCMs releasing bFGF are added directly to cells. FIG. 9D depicts photographs and scanning electron micrographs of bFGF-MCMs in (top) 12-well Transwell format and (bottom) direct culture format with hPSCs. Scale bar=10 μm.

FIG. 10A depicts representative images of H1 hPSCs at passage 3 (day 12) of culture in E8 (control) or E7 with varying doses of bFGF-MCMs (scale bar=250 μm). Colonies with normal stem cell morphology were observed in the E8 control and E7+high bFGF-MCM conditions, while varying degrees of spontaneous differentiation were seen in the E7, E7+low bFGF-MCM, and E7+med bFGF-MCM conditions (white arrows). FIG. 10B depicts quantification of Oct4/Nanog expression in hPSCs grown with or without bFGF-MCMs in Transwell culture for 3 passages (n=3, error bars=s.d.), as assessed by flow cytometry. n=3, error bars=s.d. FIG. 10C depicts representative flow cytometry plots of hPSCs after Transwell culture with E7 containing low, medium, or high doses of bFGF-MCMs for 3 passages. bFGF utilization as denoted on the right y-axis was calculated based on amount of bFGF used to maintain a single well of hPSCs in a 12-well plate format (1 mL media/well) for three passages, relative to E8 control (100%).

FIG. 13A depicts representation of DOE experimental space. The concentrations of bFGF and MCMs in the binding solution were varied while the total amount of bFGF-MCMs used in Transwell culture was held constant. % Oct4+/Nanog+ hPSCs at passage 3 was measured as the response variable. FIG. 13B depicts flow cytometry quantification of % Oct4+/Nanog+ hPSCs cultured with bFGF-MCMs from each DOE condition for 3 passages. n=3, error bars=s.d. FIG. 13C depicts representative images of hPSCs in E8 medium, E7 medium, and the a0 DOE condition in E7. FIG. 13D shows results of the DOE-generated model. The model allowed for identification of an optimized binding solution that minimizes bFGF utilization with a predicted 95% Oct4+/Nanog+ cell population at passage 3 of Transwell culture. FIG. 13E shows the comparison of the performance of DOE-optimized MCMs vs. non-optimized MCMs in maintaining hPSC pluripotency in Transwell (left) and direct (right) culture formats. For each culture format, four bFGF-MCM doses were tested, with total bFGF utilization matched between optimized and non-optimized MCMs for each respective dose. bFGF utilization as denoted on the x-axis was calculated based on amount of bFGF used to maintain a single well of hPSCs in a 12-well plate format (1 mL media/well) for three passages. n=3, error bars=s.d.; ** p<0.0001,  p<0.01; two-way ANOVA. "n·d." denotes a condition for which P3 flow cytometry data were not collected due to inability of the hPSCs to be effectively passaged at the corresponding dose of non-optimized bFGF-MCMs.

FIGS. 14A-14C depict results of DOE model for optimizing bFGF-MCM binding formulation. FIG. 14A is a prediction profile for non-optimized bFGF-MCMs, showing model prediction for % Oct4/Nanog vs. MCM and bFGF concentration in binding solution. FIG. 14B depicts a prediction profile for optimized bFGF-MCMs predicted to outperform non-optimized conditions, as indicated by the desirability function. X-axis for (FIG. 14A) and (FIG. 14B) is plotted on a log 2 scale. FIG. 14C is a summary table of effects tested in the DOE.

FIG. 15A is a comparison of colony morphology in H1 hESCs at passages 3 and 25 with bFGF-MCMs. FIG. 15B depicts hPSCs in direct culture with bFGF-MCMs can be transitioned back to E8/Matrigel with minimal MCM carryover within 2 passages, and display normal hPSC colony morphology. Scale bars=100 µm. FIG. 15C depicts hPSCs in direct culture with bFGF-MCMs for 25 passages maintain robust expression of pluripotency markers Oct4 and Nanog. Scale bar=100 µm. FIG. 15D shows G-banded karyotyping of hPSCs maintained in direct culture with optimized bFGF-MCMs for 25 passages. FIG. 15E depicts hPSCs in direct culture with bFGF-MCMs retain the potential to spontaneously differentiate into derivatives of the three primary germ layers. EBs were formed, allowed to spontaneously differentiate and adhere to Matrigel-coated dishes, and stained for markers of i) ectoderm (beta-III tubulin), ii) mesoderm (alpha smooth muscle actin), and iii) endoderm (alpha-fetoprotein) lineages. Scale bars=50 µm. FIG. 15F is a histological analysis of teratomas generated from hPSCs after long-term (25 passages) direct culture with bFGF-MCMs. Differentiation into all three germ layers is shown: (i) ectoderm (neuroepithelium, pigmented retinal tissue), (ii) mesoderm (cartilage) and endoderm (liver). Images shown in (FIG. 15E) and (FIG. 15F) are for H1 hESCs.

FIG. 20A depicts % Oct4/Nanog expression of hPSCs cultured with the same amount of optimized bFGF-MCMs in either Transwell or direct culture. In Example 5, fresh MCMs were replaced at each passage (i.e., every 4 days) in both Transwell and direct culture formats. n=3, error bars=s.d.; **** p<0.0001, two-way ANOVA. FIG. 20B shows that local delivery (i.e., direct culture with bFGF-MCMs) amplifies growth factor activity at the culture surface, as measured in a cell-free bFGF bioactivity assay using the Quantikine bFGF ELISA kit. n=3, error bars=s.d.; * p<0.05, t-test.

FIG. 21A shows that ERK phosphorylation correlates with the amount of active bFGF. hPSCs were starved of bFGF (in E7) for 24 hrs, followed by 2 hr restimulation with E7 containing different concentrations of fresh bFGF in solution (created by mixing E8 and E7 media at different ratios). Soluble bFGF restimulated early ERK phosphorylation in a dose-dependent manner Error bars=s.d., n=3 independent biological replicates. FIG. 21B shows that quantikine bFGF ELISA correlates with the amount of active bFGF. E8 and E7 were combined at different ratios to produce media containing different concentrations of bFGF, and each media formulation was analyzed by Quantikine ELISA. Error bars=s.d., n=2 independent biological replicates. FIG. 21C depict bFGF thermal instability reflected by the decreased capacity of bFGF-containing E8 media to induce ERK phosphorylation after pre-incubation at 37° C. and 65° C. Error bars=s.d., n=2 independent biological replicates. FIG. 21D depict the loss of bFGF bioactivity after pre-incubation at 37° C. and 65° C. is recapitulated in Quantikine bFGF ELISA. Error bars=s.d., n=2 independent biological replicates.

FIG. 22A shows bFGF bound to and released from MCMs maintains hPSC pluripotency marker expression more effectively than a matched amount of soluble bFGF ("Bolus"). "4D" denotes media changes every 4 days (i.e., only at the time of passaging). FIG. 22B shows bFGF bound to MCMs is stabilized against activity loss during incubation at physiological temperatures, as measured by Quantikine bFGF ELISA. "% activity remaining" is expressed relative to 4° C. storage of each respective condition. FIG. 22C is a comparison of total bFGF protein release from bFGF-MCMs vs. PLGA microspheres at 37° C. FIG. 22D is a comparison of active bFGF protein release from bFGF-MCMs vs. PLGA microspheres. Values for cumulative daily release were extrapolated based on 2 hr release in the Quantikine bFGF ELISA for each time point assessed. Asterisks indicate statistically significant difference compared to (FIG. 22A) E8 control, (FIG. 22B) E7+soluble bFGF, (FIGS. 22C & 22D) PLGA microspheres. n=3, error bars=s.d.; p<0.05 (*), 0.01 (), 0.001 (), or 0.0001 (****), two-way ANOVA.

DETAILED DESCRIPTION

Figure 1A:
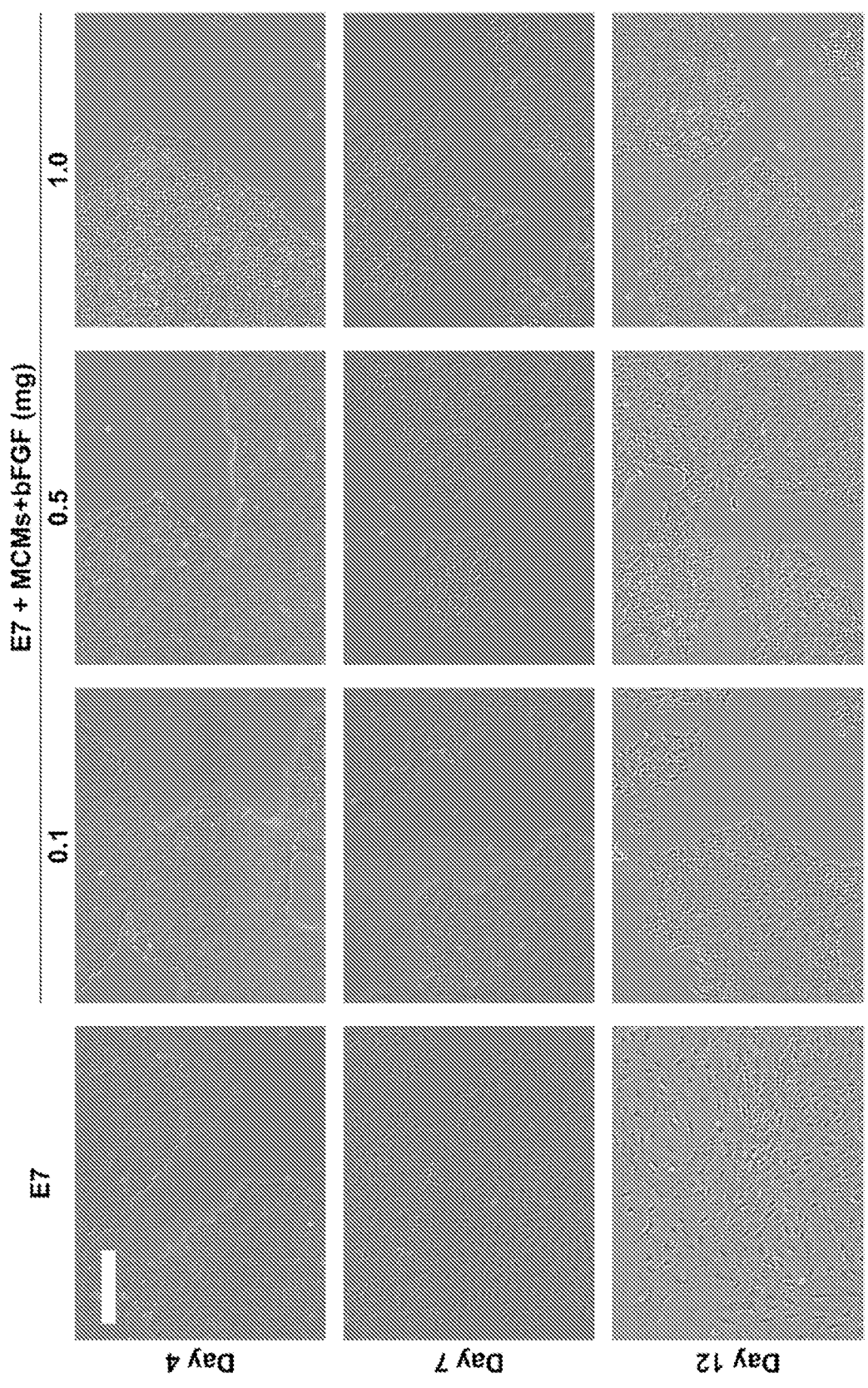
FIGS. 1A-1C depict the maintenance of hESCs in TC culture with E7 media for 12 days.

The present disclosure is directed to compositions and methods for providing fibroblast growth factor in pluripotent stem cell cultures. In some embodiments, compositions include mineral coated microparticles comprising a core and a mineral coating that includes fibroblast growth factor. Fibroblast growth factor included in the mineral coating provides a sustained delivery of fibroblast growth factor as the mineral coating degrades. Also disclosed are methods for pluripotent stem cell culture in which stem cells are cultured in the presence of mineral coated microparticles containing fibroblast growth factor. Mineral coated microparticles provide sustained delivery of fibroblast growth factor as the mineral coating degrades, which maintains pluripotency of stem cells during culture. Delivery of fibroblast growth factor using mineral coated microparticles advantageously reduces the amount and cost of fibroblast growth factor required to maintain stem cell pluripotency during cell passages.

In one aspect, the present disclosure is directed to a mineral coated microparticle. The mineral coated microparticle includes a core; and a mineral coating. The mineral coating includes fibroblast growth factor.

Suitable fibroblast growth factor includes purified growth factor, recombinant growth factor, and combinations thereof. Particularly suitable fibroblast growth factor is basic fibroblast growth factor. The amount of fibroblast growth factor contained by the mineral coating ranges from about 0.1 ng fibroblast growth factor per mg mineral coated microparticle to about 10,000 ng fibroblast growth factor per mg mineral coated microparticle.

In another aspect, mineral coated microparticles having fibroblast growth factor can be prepared to include other growth factors for use in stem cell culture. Other growth factors can be adsorbed to the mineral coating and/or within the mineral coating as described herein for fibroblast growth factor. Contemplated embodiments further include 3, 4, 5 or more different other growth factors adsorbed to the mineral coating and/or incorporated within the mineral coating.

Mineral coated microparticles can be provided in dried (microparticle) form that is subsequently resuspended with any desired solution and added to the culture medium. Mineral coated microparticles can be provided in solution. Any solution suitable for cell culture can be used to resuspend dried mineral coated microparticles and/or for providing mineral coated microparticles in solution form. Mineral coated microparticles preferably are provided in dried form to reduce degradation of the mineral coating while not in use. While less desirable, dried mineral coated microparticles can be added directly to cultures.

Suitable solutions include water, saline, isotonic saline, phosphate buffered saline, Ringer's lactate, culture medium, and the like.

Other components such as surfactants, preservatives, and excipients can be used with the mineral coated microparticles. Surfactants can reduce or prevent surface-induced aggregation of mineral coated microparticles. Various conventional surfactants can be employed, such as polyoxyethylene fatty acid esters and alcohols, and polyoxyethylene sorbitol fatty acid esters. Amounts will generally range from about 0.001% and about 4% by weight of the formulation. Suitable preservatives include, for example, phenol, o-cresol, m-cresol, p-cresol, methyl p-hydroxybenzoate, propyl p-hydroxybenzoate, 2-phenoxyethanol, butyl p-hydroxybenzoate, 2-phenylethanol, benzyl alcohol, chlorobutanol, and thiomerosal, bronopol, benzoic acid, imidurea, chlorohexidine, sodium dehydroacetate, chlorocresol, ethyl p-hydroxybenzoate, benzethonium chloride, chlorphenesine (3p-chlorphenoxypropane-1,2-diol) and mixtures thereof. The preservative can be present in concentrations ranging from about 0.1 mg/ml to about 20 mg/ml, including from about 0.1 mg/ml to about 10 mg/ml. For convenience reference is made to Remington: The Science and Practice of Pharmacy, 19th edition, 1995. Formulations can include suitable buffers such as sodium acetate, glycylglycine, HEPES (4-(2-hydroxyethyl)-1-piperazineethanesulfonic acid) and sodium phosphate. Excipients include commonly used components for tonicity adjustment, antioxidants, and stabilizers. Other inactive ingredients include, for example, L-histidine, L-histidine monohydrochloride monohydrate, sorbitol, polysorbate 80, sodium citrate, sodium chloride, and EDTA disodium.

The mineral coating includes calcium, phosphate, carbonate, and combinations thereof. To prepare a mineral coated microparticle, a core material is incubated in a modified simulated body fluid. The modified simulated body fluid includes calcium and phosphate, which form the mineral coating on the surface of the core, which results in the mineral coated microparticle. Different mineral coating morphologies can be achieved by varying the amounts and ratios of calcium, phosphate, and carbonate. Different mineral coating morphologies include, for example, plate-like structures and/or spherulite-like structures. High carbonate concentration results in a mineral coating having a plate-like structure. Low carbonate concentration results in a mineral coating having a spherulite-like structure. The mineral coating morphology also affects adsorption of the active agent.

Any suitable material can be used as the core upon which the mineral coating is formed. Particularly suitable core materials are those materials known to be non-toxic to humans and animals. Particularly suitable core materials also include those materials known to degrade and/or dissolve in humans and animals. Suitable core materials on which the mineral coating is formed include polymers, ceramics, metals, glass and combinations thereof in the form of particles. Suitable particles can be, for example, agarose beads, latex beads, magnetic beads, polymer beads, ceramic beads, metal beads (including magnetic metal beads), glass beads and combinations thereof. The core materials include ceramics (e.g., hydroxyapatite, beta-tricalcium phosphate (beta-TCP, β-TCP), magnetite, neodymium), plastics (e.g., polystyrene, poly-caprolactone, PLGA), hydrogels (e.g., polyethylene glycol; poly(lactic-co-glycolic acid), and the like, and combinations thereof. Particularly suitable core materials are those that dissolve such as, for example, beta-tricalcium phosphate (beta-TCP, β-TCP). In other embodiments, the core material can be dissolved following mineral coating formation. In other embodiments, the core material is non-degradable.

The core substrates can initially be coated with a poly(α-hydroxy ester) film, for example. Particularly suitable poly (α-hydroxy esters) may be, for example, poly(L-lactide), poly(lactide-co-glycolide), poly(ε-caprolactone), and combinations thereof. It should be understood that when making any combinations of the above films, the films are typically mixed in suitable organic solvents as known in the art. Further, differences in molecular weights, crystallization rates, glass transition temperatures, viscosities, and the like should be taken into consideration as well as understood in the art to prevent phase separation and lack of uniformity in the final substrates. Phase separation and lack of uniformity can further be avoided by altering the mixing ratio of the films used in the substrate.

After preparing a poly(α-hydroxy ester) film on the substrate, the surface of the film coating is hydrolyzed under alkaline conditions to create a surface having COOH and OH groups. After surface hydrolyzing, the substrate is incubated in a simulated body fluid containing a suitable mineral-forming material to form a mineral coating. Suitable mineral-forming materials may be, for example, calcium, phosphate, carbonate, and combinations thereof.

The simulated body fluid (SBF) for use in the methods of the present disclosure typically includes from about 5 mM to about 12.5 mM calcium ions, including from about 7 mM to about 10 mM calcium ions, and including about 8.75 mM calcium ions; from about 2 mM to about 12.5 mM phosphate ions, including from about 2.5 mM to about 7 mM phosphate ions, and including from about 3.5 mM to about 5 mM phosphate ions; and from about 4 mM to about 100 mM carbonate ions.

In some embodiments, the SBF can further include about 145 mM sodium ions, from about 6 mM to about 9 mM potassium ions, about 1.5 mM magnesium ions, from about 150 mM to about 175 mM chloride ions, about 4 mM $HCO_3^-$, and about 0.5 mM $SO_4^{2-}$ ions.

The pH of the SBF can typically range from about 4 to about 7.5, including from about 5.3 to about 6.8, including from about 5.7 to about 6.2, and including from about 5.8 to about 6.1.

Suitable SBF can include, for example: about 145 mM sodium ions, about 6 mM to about 9 mM potassium ions, about 5 mM to about 12.5 mM calcium ions, about 1.5 mM magnesium ions, about 150 mM to about 175 mM chloride ions, about 4.2 mM $HCO_3^-$, about 2 mM to about 5 mM $HPO_4^{2-}$ ions, and about 0.5 mM $SO_4^{2-}$ ions. The pH of the simulated body fluid may be from about 5.3 to about 7.5, including from about 6 to about 6.8.

In one embodiment, the SBF may include, for example: about 145 mM sodium ions, about 6 mM to about 17 mM potassium ions, about 5 mM to about 12.5 mM calcium ions, about 1.5 mM magnesium ions, about 150 mM to about 175 mM chloride ions, about 4.2 mM to about 100 mM $HCO_3^-$, about 2 mM to about 12.5 mM phosphate ions, and about 0.5 mM $SO_4^{2-}$ ions. The pH of the simulated body fluid may be from about 5.3 to about 7.5, including from about 5.3 to about 6.8.

In another embodiment, the SBF includes: about 145 mM sodium ions, about 6 mM to about 9 mM potassium ions, from about 5 mM to about 12.5 mM calcium ions, about 1.5 mM magnesium ions, about 60 mM to about 175 mM chloride ions, about 4.2 mM to about 100 mM $HCO_3^-$, about 2 mM to about 5 phosphate ions, about 0.5 mM $SO_4^{2-}$ ions, and a pH of from about 5.8 to about 6.8, including from about 6.2 to about 6.8.

In yet another embodiment, the SBF includes: about 145 mM sodium ions, about 9 mM potassium ions, about 12.5 mM calcium ions, about 1.5 mM magnesium ions, about 172 mM chloride ions, about 4.2 mM $HCO_3^-$, about 5 mM to about 12.5 mM phosphate ions, about 0.5 mM $SO_4^{2-}$ ions, from about 4 mM to about 100 mM $CO_3^{2-}$, and a pH of from about 5.3 to about 6.0.

In embodiments that include a layered mineral coating, a core is incubated in a formulation of modified simulated body fluid. The layer of mineral coating forms on the core during the incubation period of minutes to days. After the initial layer of mineral coating is formed on the core, the mineral coated microparticle can be removed from the modified simulated body fluid and washed. To form a plurality of layers of mineral coating a mineral coated microparticle is incubated in a second, third, fourth, etc. modified simulated body fluid until the desired number of layers of mineral coating is achieved. During each incubation period a new layer of mineral coating forms on the previous layer. These steps are repeated until the desired number of layers of mineral coating is achieved.

During mineral formation fibroblast growth factor can be included in the modified simulated body fluid to incorporate fibroblast growth factor within the layer of mineral coating during mineral formation. Following formation of each layer of mineral, the mineral coated microparticle can then be incubated in a carrier comprising fibroblast growth factor to adsorb the fibroblast growth factor to the layer of mineral coating. After incorporating fibroblast growth factor within a layer of mineral coating and/or adsorbing fibroblast growth factor to a layer of mineral coating, another layer of mineral coating can be formed by incubating the microparticle in another formulation of modified simulated body fluid. If desired, layers of mineral coating can incorporate fibroblast growth factor in the mineral, layers can have fibroblast growth factor adsorbed to the layer of mineral, the layer of mineral coating can be formed without incorporating fibroblast growth factor or adsorbing fibroblast growth factor, and combinations thereof. Mineral coated microparticles having different layers of mineral coating can be prepared by forming a layer of mineral using one formulation of modified simulated body fluid, then incubating the mineral coated microparticle in a different formulation of modified simulated body fluid. Thus, mineral coated microparticles can be prepared to have a plurality of layers of mineral coating wherein each layer is different. Embodiments are also contemplated that include two or more layers of mineral coating that are the same combined with one or more layers of mineral coating that are the different.

To incorporate the fibroblast growth factor within the mineral coated microparticle, fibroblast growth factor is included in the simulated body fluid during the mineral coating process.

To adsorb fibroblast growth factor in and/or on different layers of the mineral coated microparticle, mineral coated microparticles are incubated in a solution containing the fibroblast growth factor after the formation of each layer. Some layers may have no fibroblast growth factor.

To adsorb the fibroblast growth factor to the mineral coated microparticle, the mineral coated microparticles are contacted with a solution containing the fibroblast growth factor. The fibroblast growth factor can be contacted with the mineral coated microparticle using any method known in the art. For example, a solution of the fibroblast growth factor can be pipetted, poured, or sprayed onto the mineral coated microparticle. Alternatively the mineral coated microparticle can be dipped in a solution including fibroblast growth factor. The fibroblast growth factor adsorbs to the mineral coating by an electrostatic interaction between fibroblast growth factor and the mineral coating of the mineral coated microparticle.

Adsorption of fibroblast growth factor to the mineral coated microparticles can be tailored by changing the mineral constituents in the modified simulated body fluid (e.g., high carbonate and low carbonate), by changing the amount of mineral coated microparticles incubated with fibroblast growth factor, by changing the concentration of fibroblast growth factor in the incubation solution, and combinations thereof.

Tailoring the composition of the mineral coating in the different layers advantageously allows for tailored release kinetics of the fibroblast growth factor or fibroblast growth factor from each layer of the mineral coating.

In yet other embodiments, magnetic materials, including magnetite, magnetite-doped plastics, and neodymium, can be used for the microparticle core material. Including magnetic materials results in the formation of MCM for which location and/or movement/positioning of the MCM by application of a magnetic force is enabled. The alternate use of magnetic microparticle core materials allows for spatial control of where fibroblast growth factor delivery occurs in culture systems, for example, while analyzing fibroblast growth factor effect on cells.

In other embodiments, magnetic material can be incorporated into mineral coatings. For example, superparamagnetic iron oxide linked to bovine serum albumin can be incorporated into mineral coatings. Linked proteins (e.g., bovine serum albumin) can adsorb onto the mineral coating to incorporate the magnetic material with the mineral coating.

The mineral coatings may be formed by incubating the substrate with the SBF at a temperature of about 37° C. for a period of time ranging from about 3 days to about 10 days.

After completing the mineral coating preparation, the mineral coatings can be analyzed to determine the morphology and composition of the mineral coatings. The composition of the mineral coatings can be analyzed by energy dispersive X-ray spectroscopy, Fourier transform infrared spectrometry, X-ray diffractometry, and combinations thereof. Suitable X-ray diffractometry peaks can be, for example, at 26° and 31°, which correspond to the (0 0 2) plane, the (2 1 1) plane, the (1 1 2) plane, and the (2 0 2) plane for the hydroxyapatite mineral phase. Particularly suitable X-ray diffractometry peaks can be, for example, at 26° and 31°, which correspond to the (0 0 2) plane, the (1 1 2) plane, and the (3 0 0) plane for carbonate-substituted hydroxyapatite. Other suitable X-ray diffractometry peaks can be, for example, at 16°, 24°, and 33°, which correspond to the octacalcium phosphate mineral phase. Suitable spectra obtained by Fourier transform infrared spectrometry analysis can be, for example, a peak at 450-600 $cm^{-1}$, which corresponds to O—P—O bending, and a peak at 900-1200 $cm^{-1}$, which corresponds to asymmetric P—O stretch of the $PO_4^{3-}$ group of hydroxyapatite. Particularly suitable spectra peaks obtained by Fourier transform infrared spectrometry analysis can be, for example, peaks at 876 $cm^{-1}$, 1427 $cm^{-1}$, and 1483 $cm^{-1}$, which correspond to the carbonate ($CO_3^{2-}$) group. The peak for $HPO_4^{2-}$ can be influenced by adjusting the calcium and phosphate ion concentrations of the SBF used to prepare the mineral coating. For example, the $HPO_4^{2-}$ peak can be increased by increasing the calcium and phosphate concentrations of the SBF. Alternatively, the $HPO_4^{2-}$ peak can be decreased by decreasing the calcium and phosphate concentrations of the SBF. Another suitable peak obtained by Fourier transform infrared spectrometry analysis can be, for example, a peak obtained for the octacalcium phosphate mineral phase at 1075 $cm^{-1}$, which can be influenced by adjusting the calcium and phosphate ion concentrations in the simulated body fluid used to prepare the mineral coating. For example, the 1075 $cm^{-1}$ peak can be made more distinct by increasing the calcium and phosphate ion concentrations in the simulated body fluid used to prepare the mineral coating. Alternatively, the 1075 $cm^{-1}$ peak can be made less distinct by decreasing the calcium and phosphate ion concentrations in the simulated body fluid used to prepare the mineral coating.

Energy dispersive X-ray spectroscopy analysis can also be used to determine the calcium/phosphate ratio of the mineral coating. For example, the calcium/phosphate ratio can be increased by decreasing the calcium and phosphate ion concentrations in the SBF. Alternatively, the calcium/phosphate ratio may be decreased by increasing the calcium and phosphate ion concentrations in the SBF. Analysis of the mineral coatings by energy dispersive X-ray spectroscopy allows for determining the level of carbonate ($CO_3^{2-}$) substitution for $PO_4^{3-}$ and incorporation of $HPO_4^{2-}$ into the mineral coatings. Typically, the SBF includes calcium and phosphate ions in a ratio ranging from about 10:1 to about 0.2:1, including from about 2.5:1 to about 1:1.

Further, the morphology of the mineral coatings can be analyzed by scanning electron microscopy, for example. Scanning electron microscopy can be used to visualize the morphology of the resulting mineral coatings. The morphology of the resulting mineral coatings can be, for example, a spherulitic microstructure, a plate-like microstructure, and/or a net-like microstructure. Suitable average diameters of the spherulites of a spherulitic microstructure can range, for example, from about 2 μm to about 42 μm. Particularly suitable average diameters of the spherulites of a spherulitic microstructure can range, for example, from about 2 μm to about 4 μm. In another embodiment, particularly suitable average diameters of the spherulites of a spherulitic microstructure can range, for example, from about 2.5 μm to about 4.5 μm. In another embodiment, particularly suitable average diameters of the spherulites of a spherulitic microstructure can range, for example, from about 16 μm to about 42 μm.

Mineral coated microparticles can be stored for later use, washed and stored for later use, washed and immediately used for the adsorption step, or immediately used for the adsorption step without washing.

Suitable microparticle sizes can range from about 1 μm to about 100 μm in diameter. Microparticle diameter can be measured by methods known to those skilled in the art such as, for example, measurements taken from microscopic images (including light and electron microscopic images), filtration through a size-selection substrate, and the like.

The fibroblast growth factor of the mineral coated microparticle is released as the mineral coating degrades. Mineral degradation can be controlled such that the mineral coating can degrade rapidly or slowly. Mineral coating dissolution rates can be controlled by altering the mineral coating composition. For example, mineral coatings that possess higher carbonate substitution degrade more rapidly. Mineral coatings that possess lower carbonate substitution degrade more slowly. Incorporation of dopants, such as fluoride ions, may also alter dissolution kinetics. Alterations in mineral coating composition can be achieved by altering ion concentrations in the modified simulated body fluid during coating formation. Modified simulated body fluid with higher concentrations of carbonate, 100 mM carbonate for example, results in coatings that degrade more rapidly than coatings formed in modified simulated body fluid with physiological carbonate concentrations (4.2 mM carbonate).

In another aspect, the present disclosure is directed to a kit for providing fibroblast growth factor. The kit includes a mineral coated microparticle containing fibroblast growth factor. As described herein, the mineral coated microparticle includes a core and a mineral coating. As described herein, the mineral coating includes fibroblast growth factor. Mineral coated microparticles are contained in any suitable packaging such as, for example, containers including Eppendorf tubes, screw cap tubes, envelopes, and the like. Mineral coated microparticles can be provided in dried form or in solution as described herein. When provided in dried form, kits can further include solution for resuspending dried mineral coated microparticles.

Kits can include other components such as, for example, culture media suitable for stem cell culture, culture reagents suitable for stem cell culture, instructions describing use of mineral coated microparticles for stem cell culture, and combinations thereof. In one embodiment, the culture media can be E8, and the kit can include the components: DMEM/F12(DF12), NaHCO$_3$, L-ascorbic acid, selenium, transferrin, insulin, FGF2, and TGF-β.

In another aspect, the present disclosure is directed to a pluripotent stem cell culture method for maintaining stem cell pluripotency, the method comprising: contacting a pluripotent stem cell with a mineral coated microparticle, the mineral coated microparticle comprising a core and a mineral coating that includes fibroblast growth factor.

The fibroblast growth factor is chosen from purified fibroblast growth factor, recombinant fibroblast growth factor, and combinations thereof, as described herein.

The cultured pluripotent stem cell is contacted with a mineral coated microparticle using at least one of a cell culture insert and directly contacted. Suitable cell culture inserts include commercially available TRANSWELL® cell culture inserts. Additionally or alternatively, mineral coated microparticles can be directly contacted with the pluripotent stem cell culture. As used herein, "directly contacted" refers to adding mineral coated microparticles to the cell culture media. Directly contacted also refers to adding mineral coated microparticles (from either dried form or resuspended form) to culture media that is then added to cells. Directly contacted also refers to adding mineral coated microparticles (from either dried form or resuspended form) to culture media after culture media is added to cells.

The method can further include analyzing cells to determine pluripotency. Cells can be analyzed by detecting pluripotency markers such as, for example, Oct4 (octamer-binding transcription factor 4), Nanog, and combinations thereof. Other suitable markers include, for example, Sox2, SSEA-4, TRA-1-60, TRA-1-81, and combinations thereof.

The culture method provides sustained delivery of fibroblast growth factor to obtain release values that mimic established levels to maintain pluripotency of stem cells. The mass of mineral coated microparticles (with fibroblast growth factors) required to deliver a desired concentration of fibroblast growth factor over a period of time can be calculated beforehand. For example, fibroblast growth factor to be delivered in a sustained manner to maintain pluripotency can be obtained from release values of amounts of fibroblast growth factor released from the mineral coated microparticles over time. Then, the mass of mineral coated microparticles needed to deliver fibroblast growth factor to maintain pluripotency for a desired period of time can be calculated. The sustained delivery platform offers the benefit of sustained and continuous release of fibroblast growth factor during stem cell culture as the mineral coating degrades. Delivery of fibroblast growth factor using mineral coated microparticles also maintains stability, and thus, activity, of fibroblast growth factor during stem cell culture.

EXAMPLES

Materials and Methods for Examples 1-4

Figure 6:
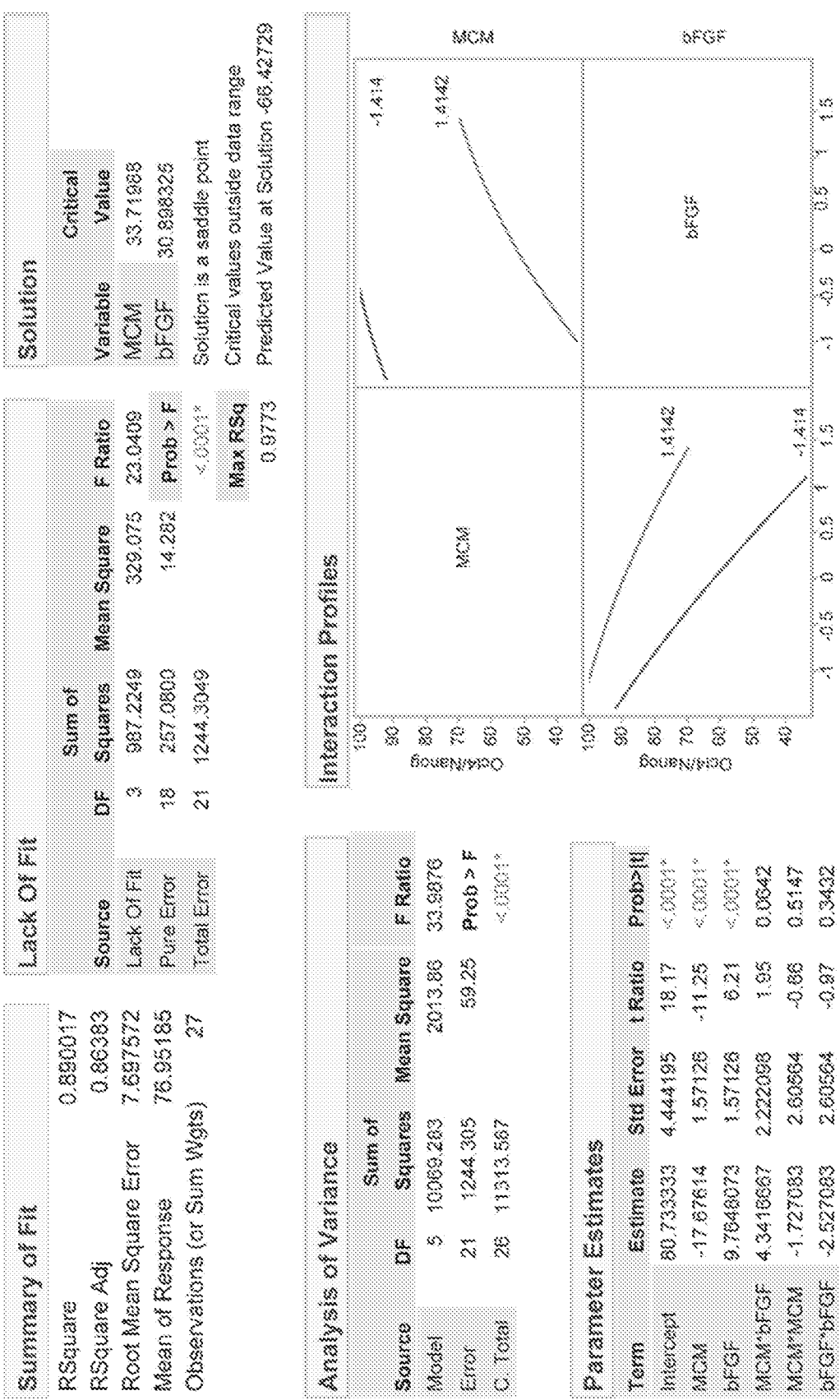
FIG. 6 summarizes analysis parameters for DOE modeling. Summary of goodness of fit, and lack of it, as well as the critical points and solution are provided. Solution critical points are outside of the model and lack predictive value. Analysis of variance and parameter estimates for each contributing factor are listed. Plots of interactions between factors are listed.

Fabrication of MCMs: Hydroxyapatite powder (Plasma Biotal Limited) was used as the microparticle core material. The core material was suspended at concentrations of 1 mg/mL in mSBF formulated as shown in FIG. 6. The suspension was rotated at 37° C. for 24 hours, at which point the microparticles were centrifuged at 2,000 g for 2 minutes, and the supernatant decanted and replaced with freshly made mSBF. This process was repeated daily for 5 days, at which point the MCMs were washed three times with 50 mL deionized water, filtered through a 40 μm pore cell strainer, suspended in 15 mL distilled water, frozen in liquid nitrogen, and lyophilized for 48 hours. The lyophilized MCMs were then analyzed for nanotopography and calcium release.

General culture of hESCs: hESCs were cultured on Matrigel (Corning)-coated tissue culture polystyrene in essential 8 (E8) (Life Technologies) media or E7 (Essential 6 media (LifeTechnologies)+1.76 ng/mL human transforming growth factor beta 1-carrier free (R&D Systems) at 37° C. and 5% CO$_2$ in a humidified incubator and with both media being changed daily. The cells were passaged via dissociation in versene (Life Technologies) when individual colonies began to grow together (approximately every 3-4 days). Briefly, the existing media were aspirated and the cells were washed with versene. The versene was aspirated and replaced with fresh versene then incubated at 37° C. for 3 to 4 minutes until the edges of the colonies began to detach. The versene was aspirated and cells were detached by gentle pipetting in fresh media.

Generation of bFGF-loaded MCMs: Recombinant human bFGF (R&D) was suspended at 1 μg/mL in sterile PBS, unless otherwise specified. MCMs were spread onto a flat surface and sterilized via UV irradiation for 30 minutes. The sterilized MCMs were then added to the bFGF solution at a concentration of 1 mg/mL unless otherwise specified. The MCM–bFGF solution was incubated at 37° C. under constant rotation. The suspension was then centrifuged at 2000 g for 2 minutes to pellet the MCMs. The MCMs were then resuspsended in E7 media and used directly. MCMs+FGF were prepared fresh for each new transwell study and for each passage in the direct culture studies.

Quantification of Oct4/Nanog populations: Briefly, hPSCs were collected, washed with PBS, and incubated with 0.25% trypsin/EDTA for 8-10 minutes at 37° C. followed by pipetting to dissociate. Trypsin activity was quenched by adding 2× volume of 20% FBS in RPMI supplemented with 5 µM Y-27632. Samples were centrifuged at 200 g for 5 minutes and pelleted samples were fixed with 1% paraformaldehyde for 20 minutes at room temperature, permeabilized with ice-cold 90% methanol for 15 minutes at 4° C., and stored at −20° C. until processing. Samples were washed twice with Flow Buffer 1 (PBS containing 0.5% BSA) to remove residual methanol, incubated for 1 hour at room temperature with primary antibodies in Flow Buffer 2 (PBS containing 0.5% BSA and 0.1% Triton X-100), washed with Flow Buffer 2, and incubated in the dark for 30 minutes at room temperature with secondary antibodies in Flow Buffer 2. Samples were washed twice with FlowBuffer 2, resuspended in Flow Buffer 1, and stored on ice prior to data collection. Data were collected on a FACSCalibur flow cytometer and analyzed using FlowJo software. Positive expression was gated by <1% unstained hESCs. Primary antibodies and dilutions used were mouse anti-human Oct3/4 (Santa Cruz Biotechnology, sc-5279, 1:400), rabbit anti-human Nanog (Cell Signaling Technology, 4903S, 1:200). Secondary antibodies and dilutions were goat-anti-mouse Alexafluor 488 and goat-anti-rabbit Alexafluor 647 (both Invitrogen 1:1000).

DOE design and modeling: Surface-response design of experiments was performed using JMP software. The design was rotatable around a single center point with axial positions for two factors, bFGF and MCM concentrations during bFGF-loaded MCM generation. The factor level was set at $log_2$ step sizes away from the center point concentrations of 1 µg bFGF and 1 mg MCMs per mL of −/+1 for the surfaces and −/+1.41 for the axial positions. The DOE was carried out in triplicate and Oct4$^+$/Nanog$^+$ was input as the response for all conditions. The model was generated with least squares fitting of linear and squared dependences for bFGF and MCM (bFGF, MCM, bFGF$^2$, and MCM$^2$) and crossed dependences bFGF and MCM (bFGF*MCM) as factors for the Oct4$^+$/Nanog$^+$ response. The factor profiler in JMP was used to select the DOE-optimized MCM loading conditions using the desirability plot while minimizing bFGF.

Statistics: Statistics between Oct4$^+$/Nanog$^+$ population percentages were done in GraphPad Prism via one-way ANOVA with Dunnett's Post Hoc analysis to compare each group to the E8 group for statistical significance. The degree of significance for each comparison is denoted in each FIG.

Example 1

In this Example, sequestration and sustained release of bFGF (FIG. 2A) in two culture strategies for hPSCs was determined.

Figure 2A:
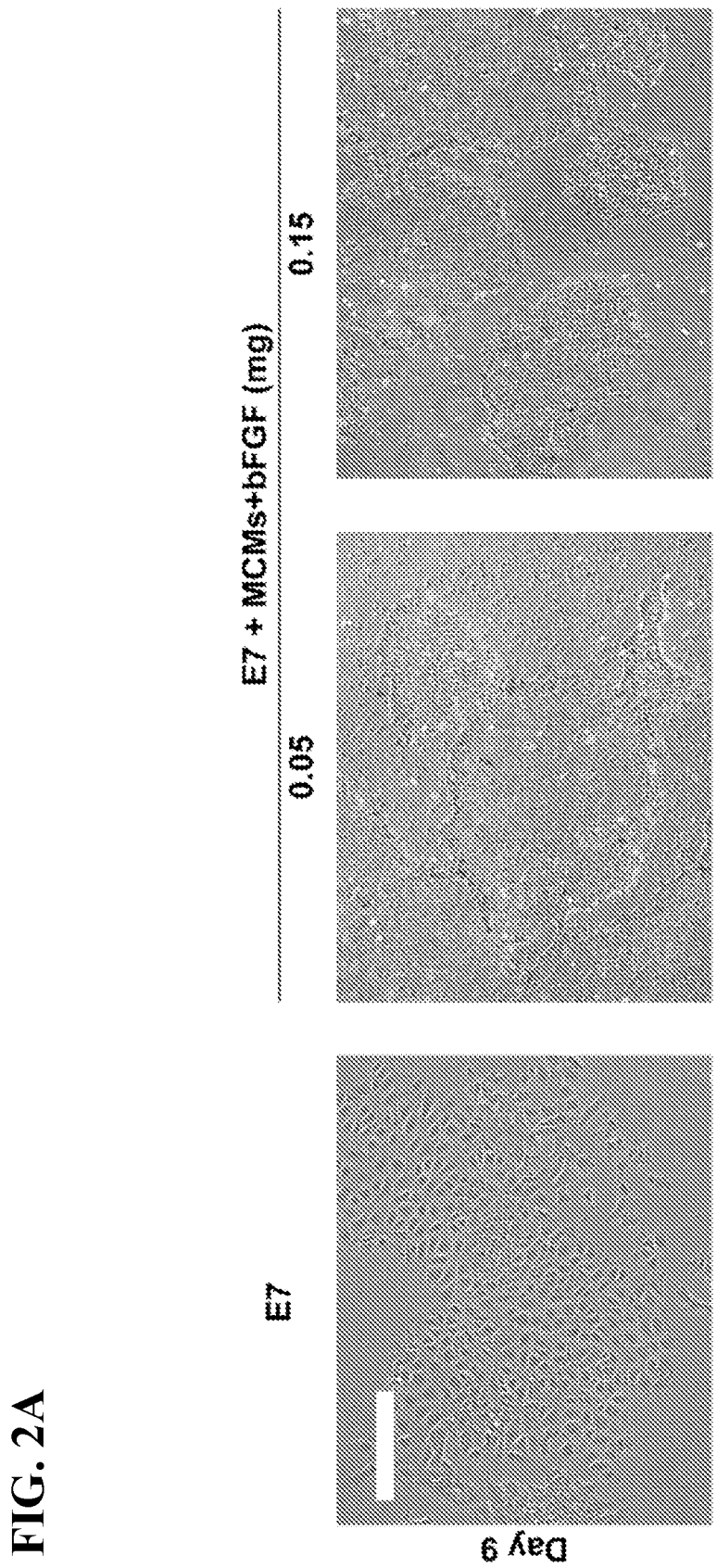
FIGS. 2A-2C depict maintenance of hESCs in DC culture with E7 media for 9 days using MCMs+bFGF.
Figure 2B:
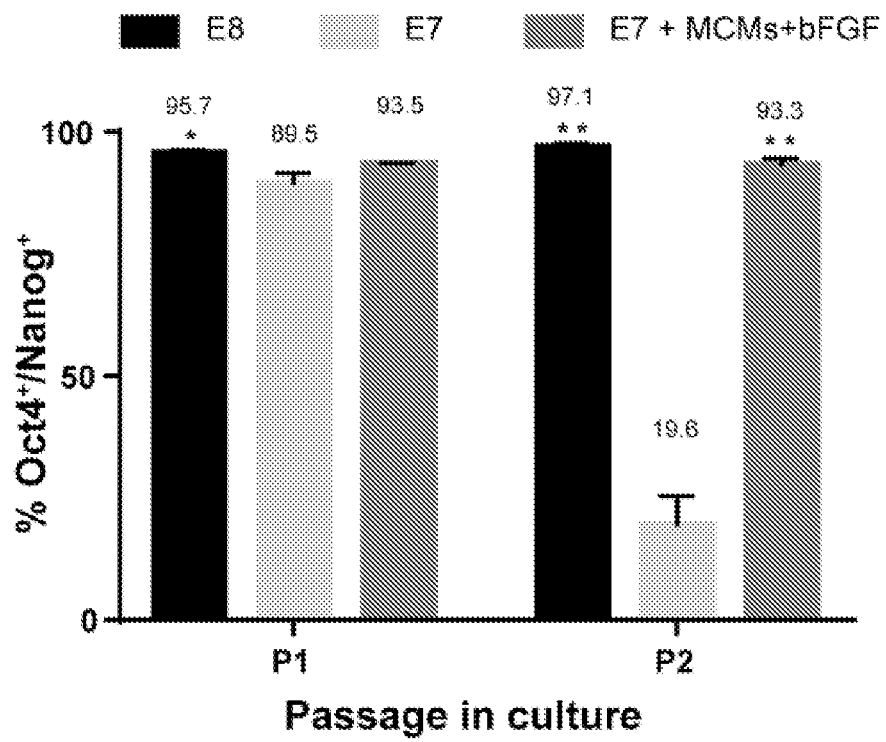

Specifically, hPSC were either placed with MCMs+bFGF in a transwell culture (TC) system or in a direct culture (DC) system (FIG. 2B).

Figure 1B:
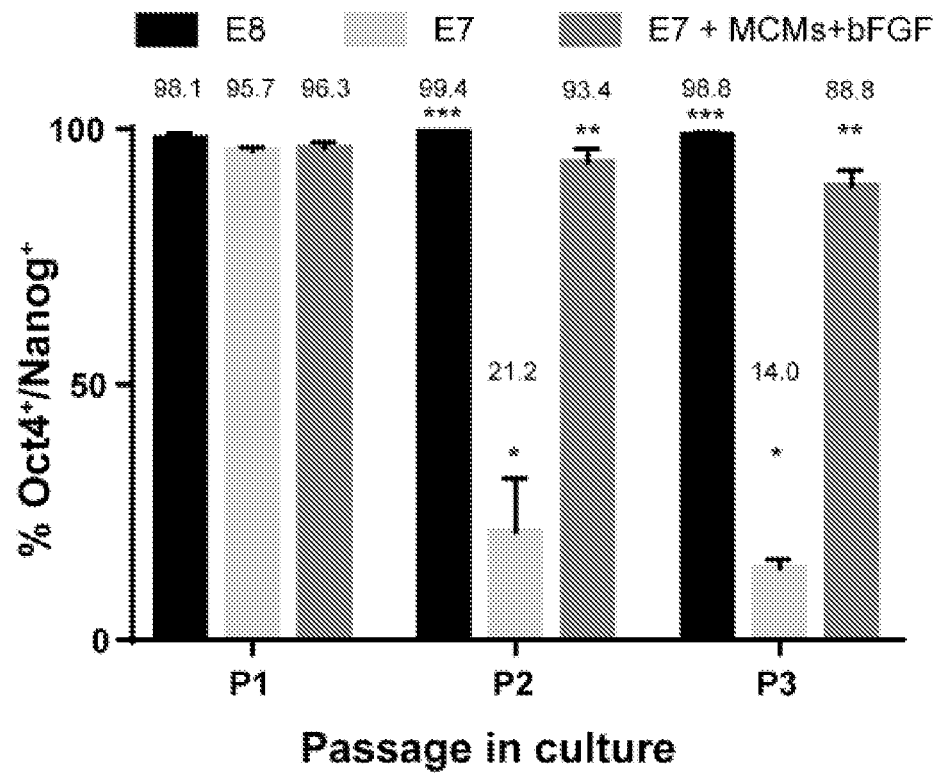
Figure 1C:
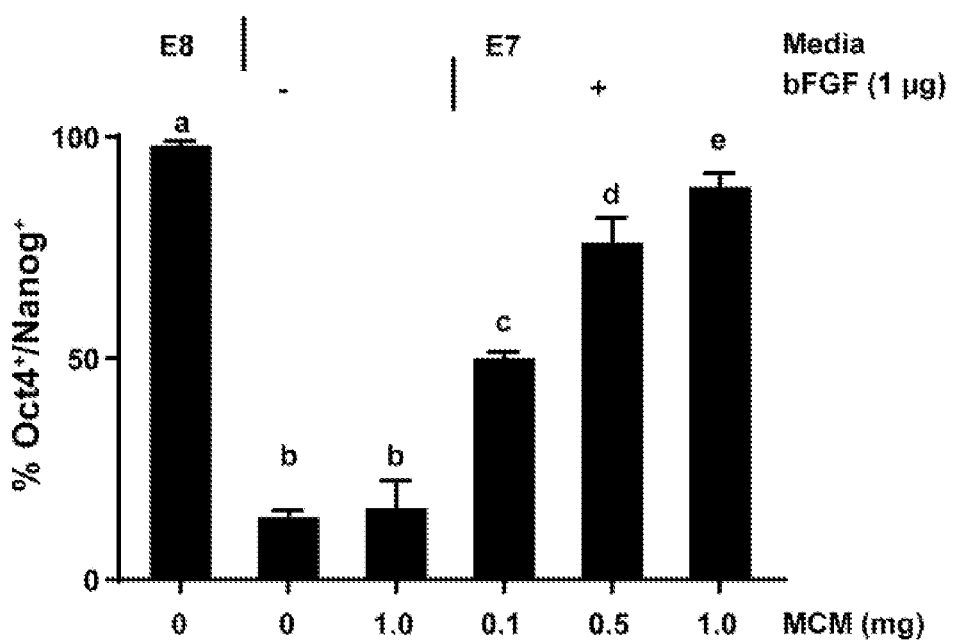

For the TC system, MCMs+bFGF were prepared as described above and added to the upper chamber of 0.4 µm pore size polystyrene transwells designed for 12-well culture plates (Corning). Cells were cultured in 12-well culture plates on Matrigel as described above in either E8 or E7 as indicated in each FIG. Daily, the transwell inserts were removed, while the cells were imaged via phase microscopy and the media exchanged. After imaging and media exchange, the transwell inserts were placed back into the culture dish. For passaging, the transwell inserts were removed and set aside in E7 media while the cells were passaged as described in the general hESC culture method section. The cells were allowed to adhere for 30 minutes prior to returning the transwell inserts to the culture wells. After the first passage and 7 days of culture, differentiated cells, as evidenced as a shift from colony-forming epithelial-like morphology to single cell, mesenchymal-like morphology, were observed via phase microscopy in the E7 alone condition only (FIGS. 1A & 1B). At day 7, cultures in E7 with all concentrations of MCMs+bFGF appeared as normal hPSC cell colonies. After 12 days of culture, widespread differentiation was observed in the E7 alone condition and within small areas of colonies in the 0.1 and 0.5 mg of MCMs+bFGF conditions (FIG. 1A). By phase microscopy, no differentiation was observed in the 1.0 mg condition after 12 days. Despite no differentiation observed by phase microscopy, the Oct4$^+$/Nanog$^+$ cell population in 1.0 mg condition was 10% lower than the E8 control as measured by flow cytometry (FIG. 1B). In a dose-dependent manner, the 0.1 and 0.5 mg MCMs+bFGF conditions resulted in reduced Oct4$^+$/Nanog$^+$ cell populations relative the E8 control by 49% and 23%, respectively (FIG. 1C). No differences were observed in colony morphology or in Oct4$^+$/Nanog$^+$ cell population for hESC cultured in E8 plus TC MCMs, relative to E8 alone, for 30 days (FIG. 6). Transwell culture (TC) of hESCs in E7 media with non-optimized MCMs+bFGF resulted in an 88.8% Oct4$^+$/Nanog$^+$ cell population after 12 days of culture (FIGS. 1A & 1B) utilizing 17% less bFGF than standard E8 culture.

Figure 2C:
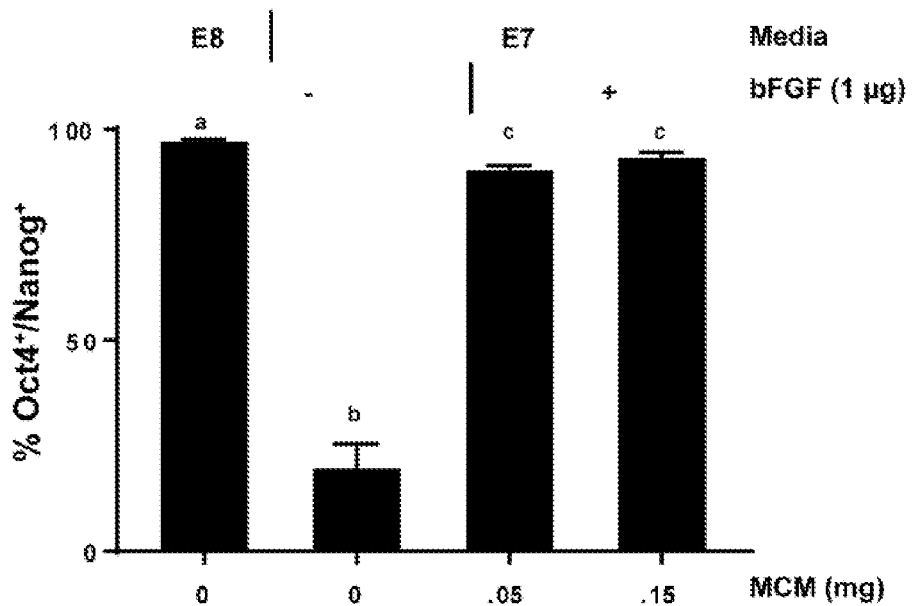

For the DC system, MCMs+bFGF were prepared as described above and directly to cells in culture. Cells were cultured in 12-well culture plates on Matrigel as described above in either E8 or E7 as indicated in each FIG. The media was changed daily and the cells were imaged via phase microscopy. For passaging, the cells were treated with versene as described in the general hESC culture method section, except that the versene incubation was extended from between 5-6 minutes of total incubation. Again, the length of incubation was determined by when the edges of the colonies began to detach. Prior to passaging, fresh MCMs+bFGF were prepared and placed directly into the new wells 30 minutes after the cells were seeded. Differentiation was observed in E7 media without MCMs+bFGF after the first passage; however, no differentiation was observed in either of the DC MCMs+bFGF conditions (FIG. 2A). Despite no observed differentiation in phase microscopy, the 0.05 and 0.15 mg MCMs+bFGF DC conditions resulted reduced Oct4$^+$/Nanog$^+$ cell populations relative to the E8 control by 7% and 4%, respectively (FIGS. 2B and 2C). No significant dose-dependent relationship was observed between MCMs+bFGF and maintenance of Oct4/Nanog expression in the DC method, despite the substantial difference in bFGF delivered (1068 ng vs 804 ng). Direct culture (DC) of hESCs in E7 media with non-optimized MCMs+bFGF resulted in an 93.3% Oct4$^+$/Nanog$^+$ cell population after 9 days of culture (FIGS. 2A and 2B).

Example 2

In this Example, Design of Experiments (DOE) was conducted to determine an experimental framework for a multi-dimensional experimental space.

Figure 3A:
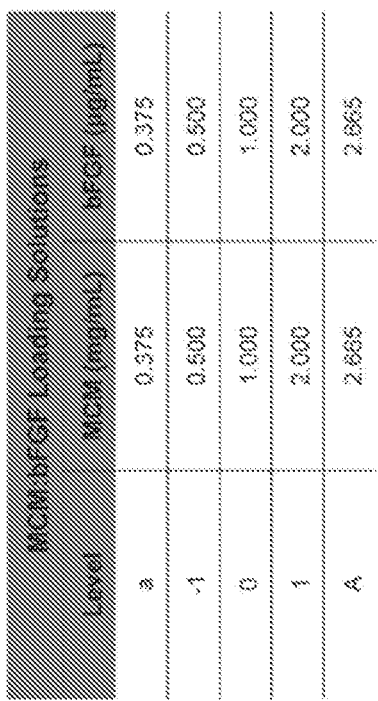
FIGS. 3A-3C depict DOE for bFGF-loaded MCM generated 4 TC MCMs+bFGF conditions that maintained hESCs in E7 equivalently to E8.
Figure 3A:
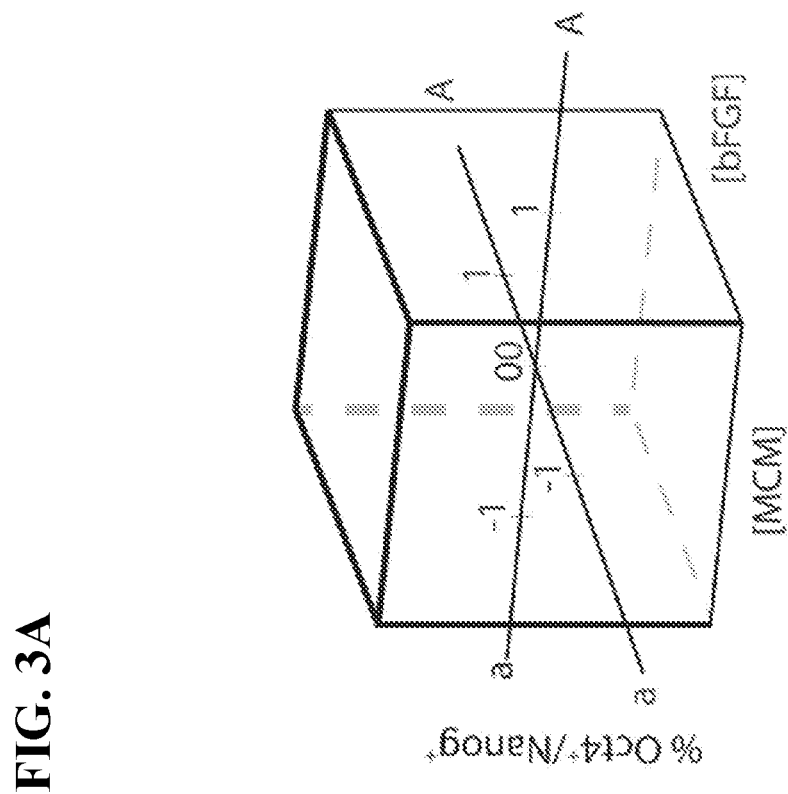
Figure 3B:
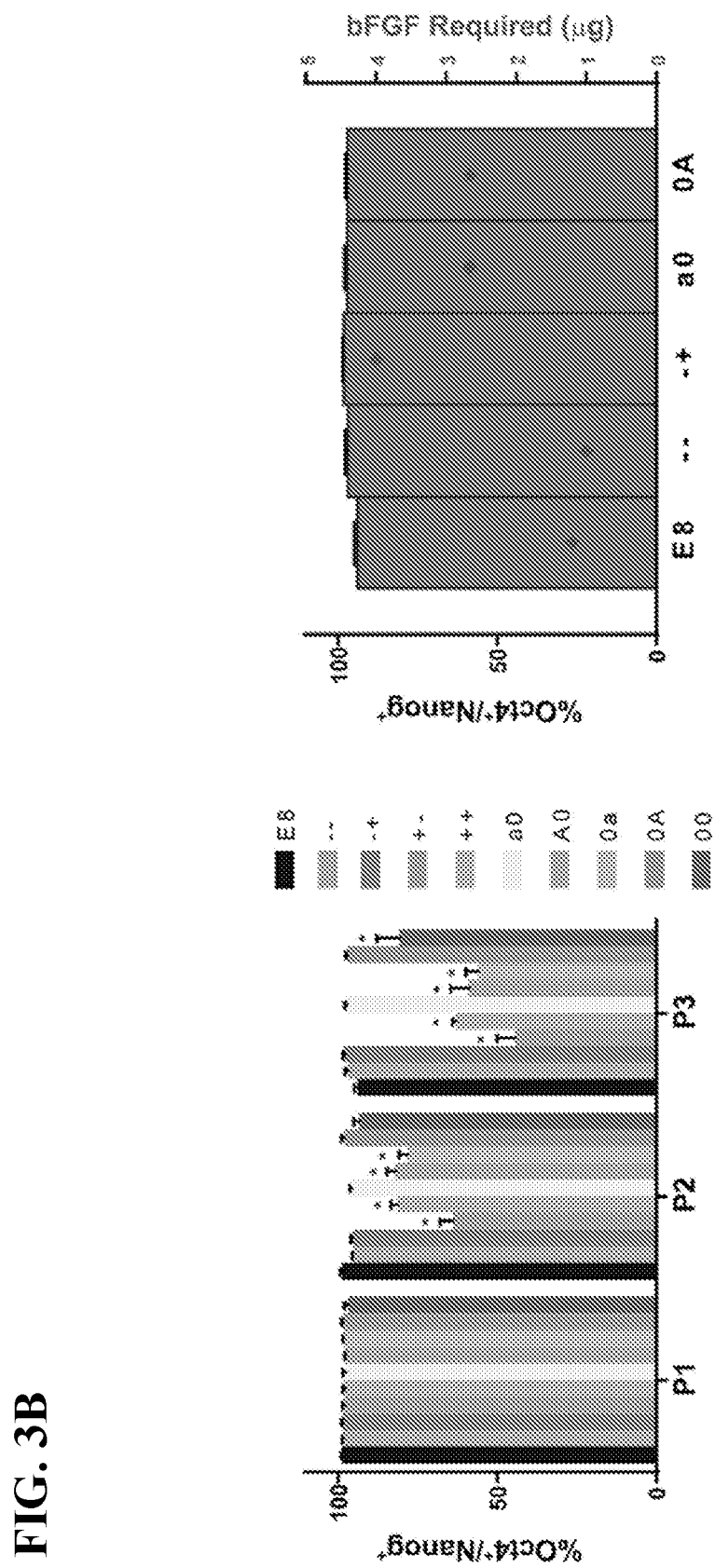
Figure 3C:
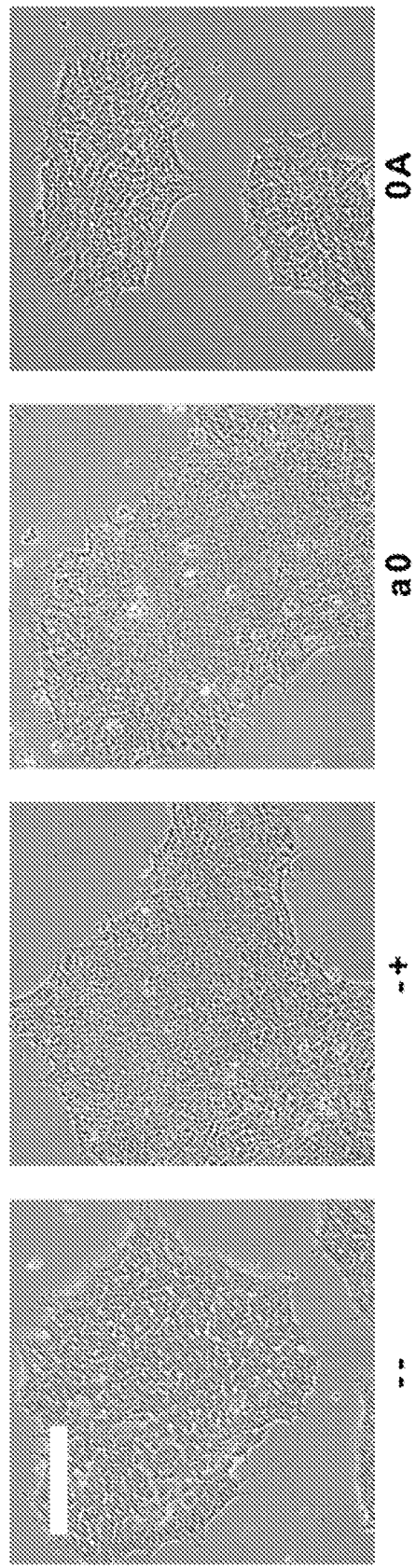

The DOE featured a surface-response design with $log_2$ steps in levels of MCM and bFGF concentrations for the MCM loading protocol. The surface was centered around 1.0 mg/mL and 1.0 µg/mL for the MCMs and bFGF, respectively (FIGS. 3A and 3B). After one passage, decreased Oct4$^+$/Nanog$^+$ cell populations relative to the E8 control were observed in all but five conditions of the DOE. After 3 passages and 12 days of culture, the −−, −+, a0, and 0A (MCM/bFGF levels) conditions resulted in equivalent Oct4$^+$/Nanog$^+$ cell populations to the E8 control (FIGS. 3B and 3C). For these conditions with Oct4$^+$/Nanog$^+$ cell population equivalent to E8, only the −− condition required less bFGF than the E8 control at 17% less bFGF (FIG. 3B). In all conditions, no differentiation was observed via phase microscopy after 12 days of culture.

Design of Experiments (DOE) resulted in 4 conditions that yielded Oct4$^+$/Nanog$^+$ cell populations that were equivalent to E8 culture over 12 days of TC culture.

Example 3

In this Example, modeling of the DOE data was conducted.

Figure 4A:
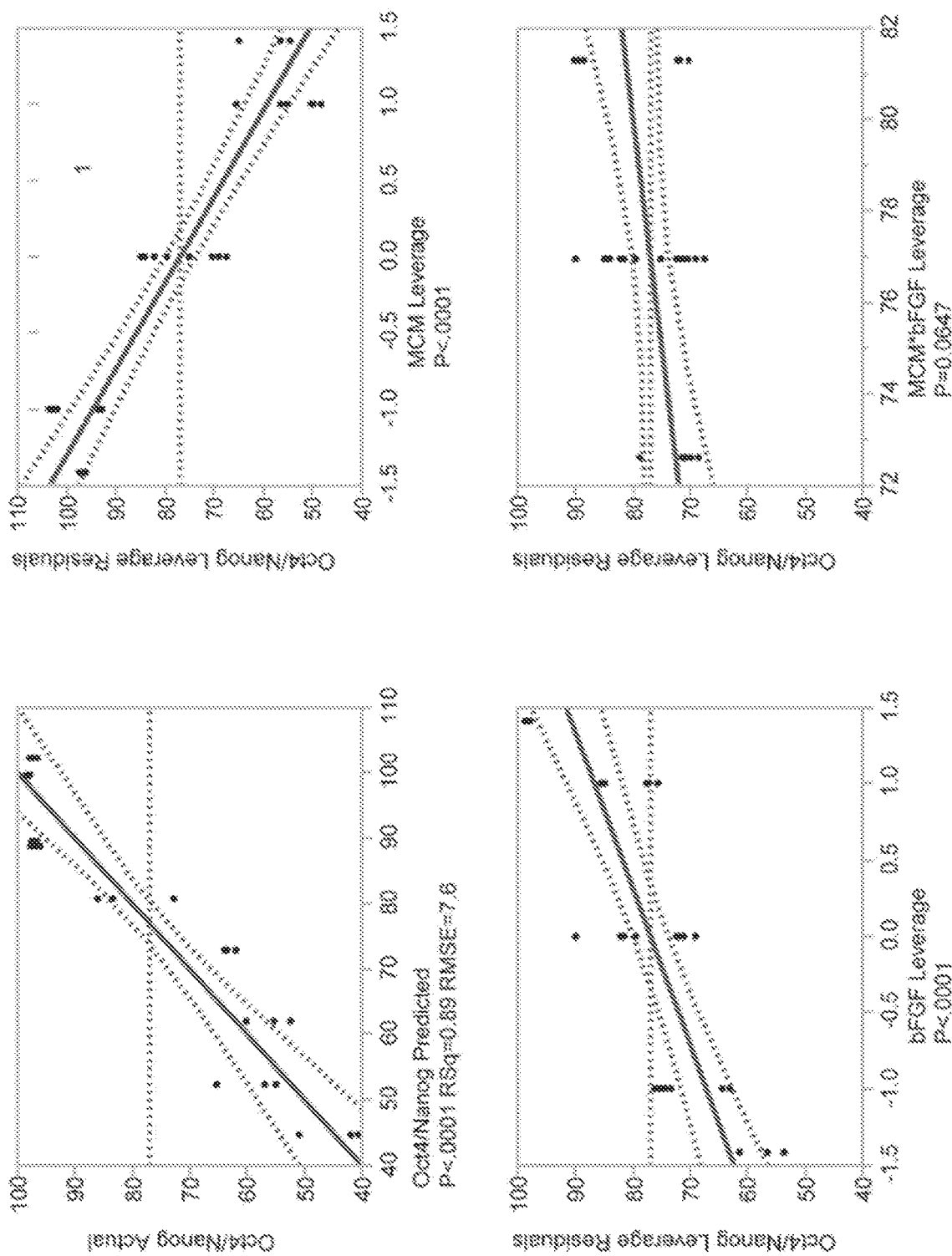
FIGS. 4A and 4B are graphs depicting the model of DOE conditions that show Oct4+/Nanog+ population dependence on both MCM and bFGF concentration in bFGF-loaded MCM generation.
Figure 4B:
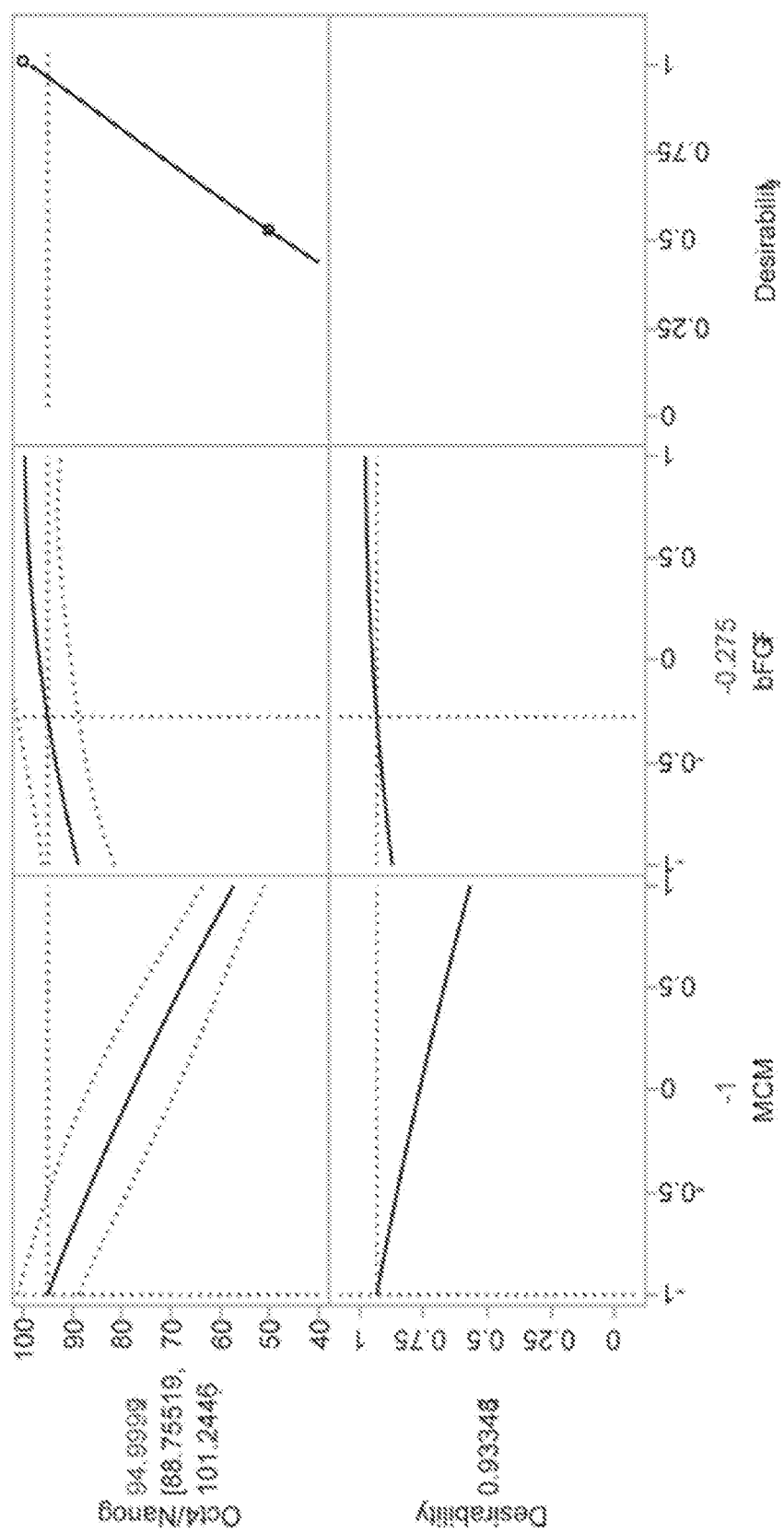

Modeling of the DOE data resulted in trends established for the MCMs+bFGF loading protocol that maintained equivalent levels of Oct4$^+$/Nanog$^+$ cell populations to the E8 control (FIG. 4A). The model showed an inverse relationship with MCM concentration and a positive relationship with bFGF concentration in the loading solution. Significant non-linear effects or interactions between these two parameters were observed in this model (FIG. 4A). Simultaneous profiling for both MCM and bFGF concentration in the loading solution yielded non-linear optimization curves (FIG. 4B), with the solution for both being a saddle point. However, the model lacked the requisite data to determine this saddle point, and thus accurate calculation of the critical points for both parameters could not be determined (FIG. 6). Using these profiles, a maximum desirability was used to establish MCM loading conditions for maintaining a 95% Oct4$^+$/Nanog$^+$ cell population while minimizing bFGF usage.

Multivariate analysis and modeling generated an optimum loading condition to maximize desirability, defined as maximizing Oct4$^+$/Nanog$^+$ cell populations while minimizing required bFGF.

Example 4

In this Example, modeling of the DOE data was conducted.

Figures 5A, 5B:
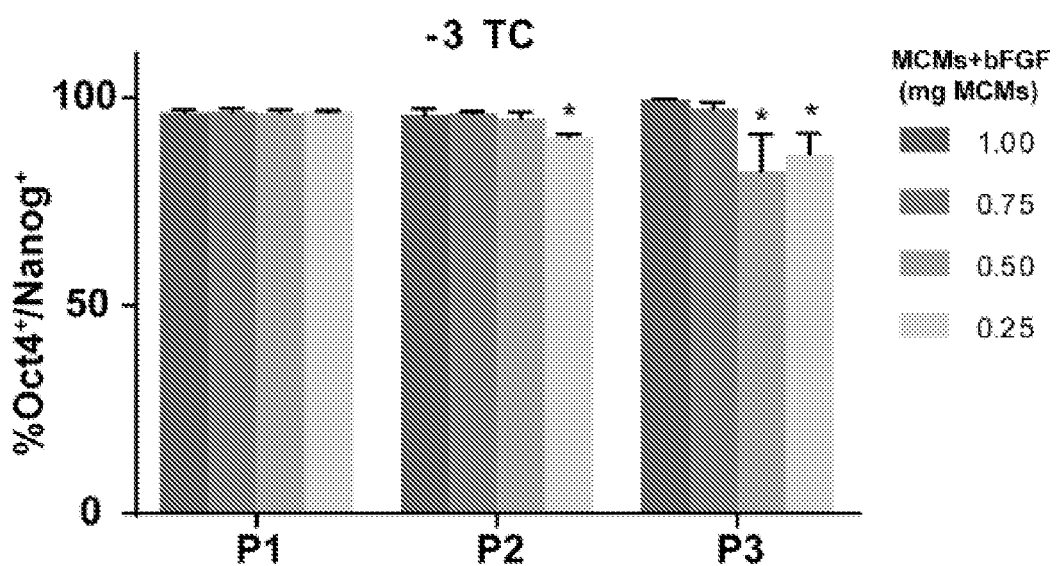
FIGS. 5A-5F depict DOE conditions resulting in hESC maintenance equivalent to E8 while reducing bFGF consumption.
Figure 5C:
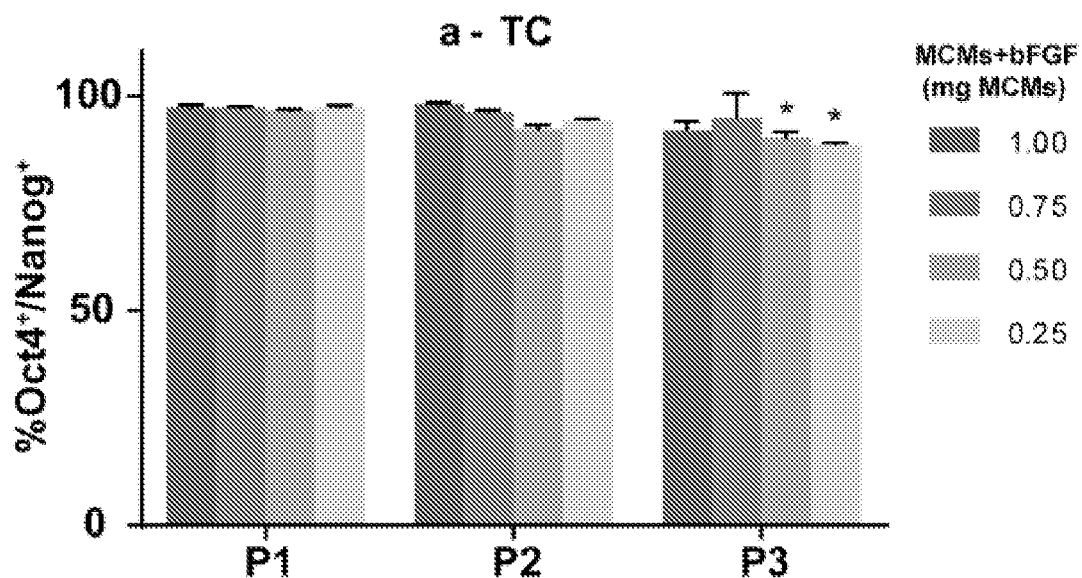
Figure 5D:
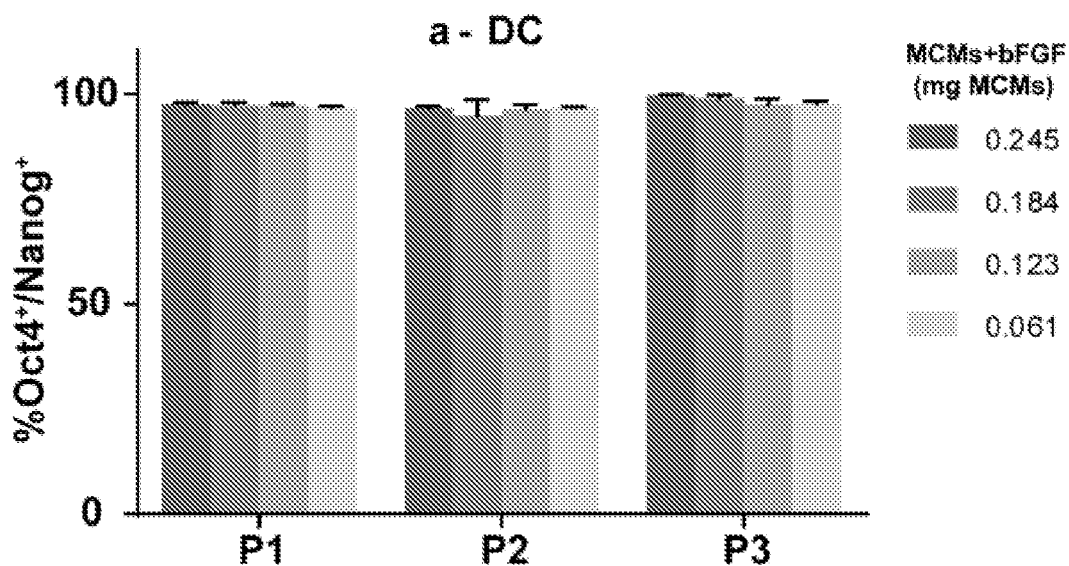
Figure 5E:
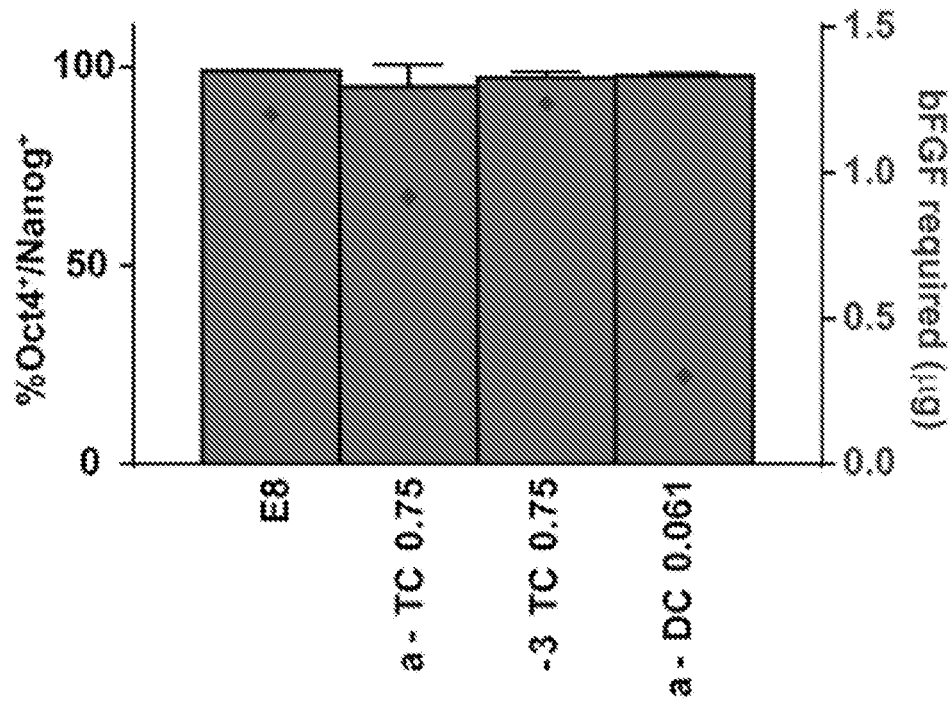
Figure 5F:
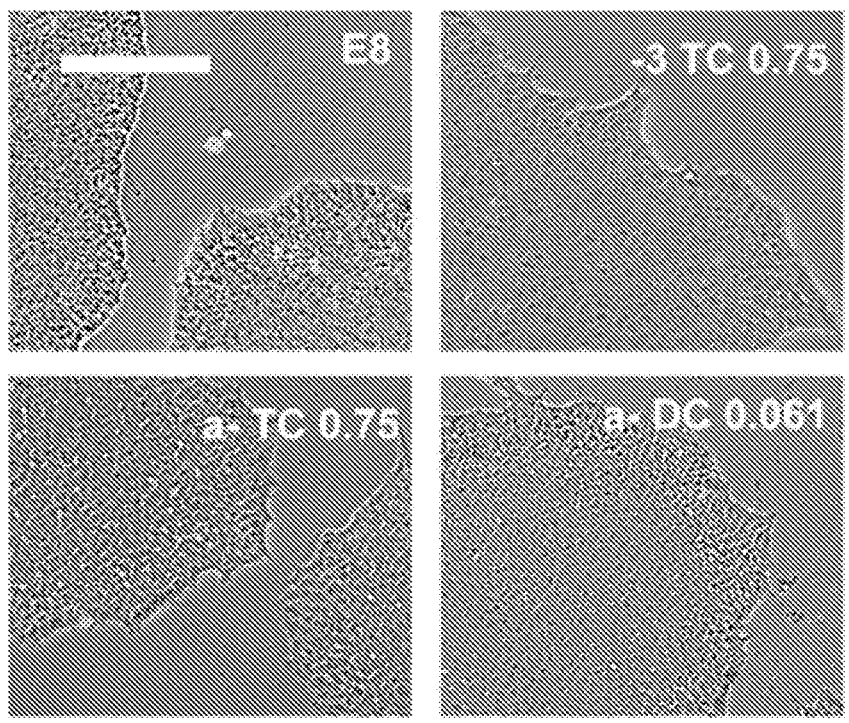

An optimized (a−) and secondary condition (−3) were selected from the DOE optimization (FIG. 5A) and used in TC, while only the a− condition was used in DC. These conditions were serially diluted to minimize the amount of bFGF required for maintenance of a 95% Oct4$^+$/Nanog$^+$ cell population. After two passages, the −3 TC with 0.25 mg of MCMs+bFGF failed to maintain a 95% Oct4$^+$/Nanog$^+$ cell population, and after three passages, both the 0.25 and 0.5 mg MCMs+bFGF conditions had Oct4$^+$/Nanog$^+$ cell populations below 95% (FIG. 5B). For the a− TC, all conditions maintained the 95% Oct4$^+$/Nanog$^+$ cell population after two passages, but only the 1.0 and 0.75 mg MCMs+bFGF conditions maintained this for three passages (FIG. 5C). For the a− DC, all serial dilutions maintained a 95% Oct4$^+$/Nanog$^+$ cell population for three passages (FIG. 5D). Both conditions in TC and the optimized condition in DC resulted in maintenance of Oct4$^+$/Nanog$^+$ cell populations that were equivalent to E8 at serial dilutions of MCMs+bFGF lower than the original DOE condition of 1.0 mg. Only the optimized condition resulted in serial dilutions that maintained this population while reducing the bFGF required to do so. The required bFGF was reduced by 25% for the a− TC and 75% for a− DC (FIG. 5E). No differentiation or differences in colony morphology were observed in any of the TC or DC conditions that maintained Oct4$^+$/Nanog$^+$ cell populations at or above 95% (FIG. 5F).

DOE-optimized MCM loading conditions resulted in maintenance of an Oct4$^+$/Nanog$^+$ cell population equivalent to E8 culture in TC and DC for 12 days while reducing the required bFGF.

Two culture methods, TC and DC, maintained the Oct4/Nanog population of hPSCs equivalently to E8 culture over 12 days while reducing the required bFGF by 25% and 75%, respectively, illustrating their potential use in biomanufacturing of hPSC where use of recombinant growth factors is a substantial cost burden. While the DC method ultimately reduced the amount of required bFGF more than the TC method and eliminated the need for expensive transwells, the method required an hour-long loading of the MCM at each passage, thus increasing the amount of labor involved in hPSC culture.

As demonstrated herein, a sustained bFGF release system from mineral-coated micro particles for the reduction of bFGF consumption in hPSC culture is provided. Two culture methods were developed where MCMs+bFGF either release bFGF from a transwell into hPSC culture media, or locally release bFGF with MCMs+bFGF in direct contact with hPSCs. Utilizing a DOE design, concentrations of both MCMs and bFGF in the MCM loading procedure influenced the outcome of Oct4$^+$/Nanog$^+$ populations in this culture strategy. Via multivariate analysis and modeling of the DOE experimental space, MCM loading conditions were generated which resulted in Oct4$^+$/Nanog$^+$ populations equivalent to 12 days of standard E8 culture while reducing the required amount of bFGF. This MCMs+bFGF hPSC culture strategy is highly relevant to the biomanufacturing of hPSCs, by reducing the high consumption of bFGF necessitated by the growth factor's poor thermal instability.

Example 5

In this Example, the use of mineral-coated microparticles (MCMs) that stabilize bFGF and sustain its delivery in order to reduce the amount of the growth factor needed for long-term expansion of hPSCs was analyzed.

Fabrication and characterization of MCMs: Hydroxyapatite powder (Plasma Biotal Limited) was used as the microparticle core material. The core material was suspended at concentrations of 1 mg/mL in modified simulated body fluid (mSBF) formulated as follows: 141 mM NaCl, 4.0 mM KCl, 0.5 mM MgSO$_4$, 1.0 mM MgCl$_2$, 100 mM NaHCO$_3$, 20.0 mM HEPES, 5.0 mM CaCl$_2$, and 2.0 mM KH$_2$PO$_4$ with the pH was adjusted to 6.80. The suspension was rotated at 37° C. for 24 hrs, at which point the microparticles were centrifuged at 2,000 g for 2 min, and the supernatant decanted and replaced with freshly made mSBF. This process was repeated daily for 5 days, at which point the MCMs were washed three times with 50 mL deionized water, filtered through a cell strainer (40 µm pore size), suspended in 15 mL distilled water, flash frozen in liquid nitrogen, and lyophilized for 48 hrs. The lyophilized MCMs were then analyzed by SEM and calcium release assays. MCMs were sputter-coated with gold and imaged on a LEO 1530 scanning electron microscope (Gemini) at 3 kv. Ca$^{2+}$ release was measured by incubating MCMs in 0.02 M Tris base buffer (pH 7.4) with gentle rotation, and centrifuging MCMs, collecting supernatant, and replacing with fresh buffer daily. The supernatant Ca$^{2+}$ concentration was measured by mixing 50 µL of supernatant with 150 µL of assay working solution containing 0.4 mM Arsenazo III (MP Biomedicals, Solon, OH). The absorbance of this solution was measured at 650 nm to determine $Ca^{2+}$ concentration using a standard curve.

Generation of bFGF-loaded MCMs: MCMs were spread onto a flat surface and sterilized via UV irradiation for 30 min, then aliquotted into sterile tubes and stored until use. For MCM loading, sterilized MCMs were suspended in sterile PBS to make a 1 mg/mL stock solution, and appropriate volumes of recombinant human basic fibroblast growth factor (bFGF, carrier-free; R&D Systems) and MCM stock solutions were combined to achieve the desired final concentration of each in the loading solution (e.g., 1.0 µg/mL bFGF, 1.0 mg/mL MCMs for non-optimized loading; 0.456 µg/mL bFGF, 0.375 mg/mL MCMs for optimized loading). The MCM–bFGF solution was incubated at 37° C. under constant rotation for 1 hr. The suspension was then centrifuged at 2000 g for 3 min to pellet the MCMs. For cell culture experiments, the MCMs were resuspended in E7 media and used immediately unless otherwise stated. bFGF-loaded MCMs were prepared fresh every three passages for Transwell culture studies (unless otherwise specified) and prepared fresh at each passage in the direct culture studies. Protein binding efficiency was determined indirectly by Quantikine bFGF ELISA, by measuring the amount of bFGF in original loading solution and subtracting the amount of bFGF in the supernatant after MCM loading.

General culture of hPSCs: H1 human embryonic stem cells (WA01-DL-12, WiCell) or WTc11 human induced pluripotent stem cells were maintained in Essential 8 medium in 6-well plates coated with Matrigel (8.7 µg/cm$^2$) at 37° C. and 5% $CO_2$ in a humidified incubator. Media were exchanged daily, and cells were passaged onto new Matrigel-coated plates every 3 to 4 days using Versene (Life Technologies). Media used in hPSC maintenance experiments were Essential 8 (E8, Life Technologies) and E7 (Essential 6 media (Life Technologies) supplemented with 1.76 ng/mL human transforming growth factor beta 1 (TGF-β1, carrier free; R&D Systems)).

Transwell culture method: MCMs or bFGF-MCMs were prepared as described above and added to polycarbonate Transwells (0.4 µm pore size) in 12-well culture plates (Corning). hPSCs were cultured on Matrigel as described above, in either E8 or E7 media as indicated in each FIG. The Transwell inserts were removed while the cells were imaged via phase microscopy and the base media (i.e., without bFGF-MCMs) were exchanged daily. At each passage, the Transwell inserts were removed while the cells were passaged with Versene as described above. The cells were allowed to adhere to new Matrigel-coated plates for 30 min prior to adding Transwell inserts to the culture wells. Unless otherwise stated, the same Transwells (containing original bFGF-MCMs) were used throughout the entirety of an experiment and transferred to new wells at each passage.

Direct culture method: MCMs or bFGF-MCMs were prepared as described above and added directly to hPSCs cultured in 12-well culture plates on Matrigel, in either E8 or E7 media as indicated in each FIG. The base media were exchanged daily (unless otherwise indicated) and the cells were imaged via phase microscopy. At each passage, the cells were passaged with Versene as described in the general hPSC culture method section. The cells were allowed to adhere to new Matrigel-coated plates for 30 min prior to adding fresh bFGF-loaded MCMs directly into the new wells.

DOE design and modeling: JMP software (SAS) was used to design the surface-response design of experiments (DOE). The design was rotatable around a single center point with axial positions for two factors: bFGF concentration and MCM concentration during MCM loading. The factor levels were set at $\log_2$ steps (step sizes of −/+1 for the surface positions and −/+1.41 for the axial positions) away from the center point concentrations of 1 µg bFGF and 1 mg MCMs per mL, as specified by JMP. The DOE was carried out in triplicate and % Oct4$^+$/Nanog$^+$ at passage 3 was used as the response variable for all conditions. The model was generated with least squares fitting of linear and squared dependences for bFGF and MCM (bFGF, MCM, bFGF$^2$, and MCM$^2$) and crossed dependences for bFGF and MCM (bFGF*MCM) as factors for the Oct4$^+$/Nanog$^+$ response. The Factor Profiler in JMP was used to select the DOE-optimized MCM loading conditions using the desirability plot to identify concentrations of bFGF and MCMs that achieved 95% Oct4$^+$/Nanog$^+$ while minimizing total bFGF.

Quantification of Oct4$^+$/Nanog$^+$ populations by flow cytometry: Briefly, hPSCs were collected, washed with PBS, and incubated with 0.25% trypsin/EDTA for 8-10 min at 37° C. followed by pipetting to dissociate. Trypsin activity was quenched by adding 2× volume of 20% FBS in RPMI supplemented with 5 µM Y-27632. Samples were centrifuged at 200 g for 5 min and pelleted samples were fixed with 1% paraformaldehyde for 20 min at room temperature, permeabilized with ice-cold 90% methanol for 15 min at 4° C., and stored at −20° C. until processing. Samples were washed twice with Flow Buffer 1 (0.5% BSA in PBS) to remove residual methanol, incubated for 1 hr at room temperature with primary antibodies in Flow Buffer 2 (0.5% BSA+0.1% Triton X-100 in PBS), washed with Flow Buffer 2, and incubated in the dark for 30 min at room temperature with secondary antibodies in Flow Buffer 2. Samples were washed twice with Flow Buffer 2, resuspended in Flow Buffer 1, and stored on ice prior to analysis. Data were collected on a MACSQUANT flow cytometer (Miltenyi Biotec) and analyzed using FlowJo software. Primary antibodies and dilutions used were mouse anti-human Oct3/4 (Santa Cruz Biotechnology, sc-5279, 1:400), rabbit anti-human Nanog (Cell Signaling Technology, 4903S, 1:200). Secondary antibodies and dilutions used were goat anti-mouse AlexaFluor 488 and goat anti-rabbit AlexaFluor 647 (Thermo Fisher Scientific, 1:1000 each).

Immunocytochemistry: Samples were fixed with 10% neutral buffered formalin for 15 min, permeabilized with 0.2% Triton X-100 in PBS for 5 min, blocked with 1% BSA in PBS for 30 min, and stained with primary antibodies (dilutions made in 1% BSA in PBS) for 1 hr at room temperature. Samples were washed three times with 0.05% Tween-20 in PBS and stained with secondary antibodies (dilutions made in PBS) for 1 hr at room temperature or overnight at 4° C. Nuclei were counterstained with DAPI. Primary antibodies and dilutions used: mouse anti-human Oct3/4 (Santa Cruz Biotechnology, sc-5279, 1:100), rabbit anti-human Nanog (Cell Signaling Technology, 4903S, 1:100), mouse IgG2a anti-βIII tubulin (R&D, MAB1195, 1:200), mouse IgG2b anti-alpha fetoprotein (R&D, MAB1369, 1:200), rabbit anti-alpha smooth muscle actin (Abcam, ab124964, 1:200), mouse IgG1 anti-PECAM-1 (EMD Millipore, MAB2184, 1:50). Secondary antibodies and dilutions used were goat anti-mouse AlexaFluor 488, goat anti-mouse IgG2a AlexaFluor 488, goat anti-rabbit or anti-mouse AlexaFluor 568, and goat anti-mouse IgG2b AlexaFluor 647 (Thermo Fisher Scientific, 1:1000 for all secondaries).

Spontaneous differentiation of embryoid bodies (EBs): To form spontaneous EBs, hPSCs in standard E8 culture (6-well format) were washed with PBS and incubated in pre-warmed Dispase (Gibco, 1 U/mL) for 3 min at 37° C. Dispase was removed by aspiration and 2 mL PBS was added per well. Cells were dislodged from the culture surface using a cell scraper and the cell suspension was added to a tube and centrifuged for 200 g/5 min. The cell pellet from each individual well was resuspended in 2.5 mL of E8 supplemented with 5 µM Y-27632 and the cell suspension was added to a 6-well ultra-low adhesion culture plate (Corning). The time of initial seeding was designated as "day-3." EBs were subjected to spontaneous differentiation for 14 days. Briefly, EBs were transitioned from E8 to differentiation medium (DM) from day 0 to day 3; EBs were placed in 75:25 E8: DM at day 0, 50:50 E8: DM at day 1, 25:75 E8: DM at day 2, and 100% DM at day 3, and maintained in DM thereafter. DM consisted of 20% Knockout Serum Replacement in Knockout-DMEM with 0.1 mM β-mercaptoethanol, 1% non-essential amino acids, and 1% L-glutamine. At day 4, EBs were transferred to Matrigel-coated plates and allowed to form adherent outgrowths. Media was changed on adherent EBs every 2 days. Adherent EBs were fixed with 10% neutral buffered formalin at day 14 for analysis.

Directed differentiation toward ectoderm, mesoderm, and endoderm lineages: H1 hESCs and WTc11 hiPSCs were subjected to directed differentiation following established protocols. Neural progenitor differentiation (adapted from 58): Starting from 60% confluency, hPSCs were passaged via Accutase and seeded in SB medium (DF3S containing 10 µg/mL transferrin, 5 µg/mL insulin, and 10 µM SB431542) supplemented with 100 ng/mL basic fibroblast growth factor (bFGF) and 10 µM Y-27632 at a density of $5\times10^4$ cells/well in 12-well Matrigel-coated plates. DF3S medium consisted of DMEM/F-12, L-ascorbic acid-2-phosphate magnesium (64 µg/mL), sodium selenium (14 ng/mL), and NaHCO3 (543 µg/mL). The cells were transitioned to medium without Y-27632 the following day. The adherent cells were then transitioned to either SB medium for hindbrain specification or SBNog medium (SB medium containing 100 ng/mL Noggin) for forebrain specification and maintained in the respective media for 6 days with daily media exchange. On day 9, the cells were passaged with Accutase at a 1:6 ratio and seeded onto Matrigel-coated plates in Neural Expansion Medium (DF3S medium containing N-2 supplement, B-27 supplement, and 5 ng/mL bFGF). Neural Expansion Medium was changed every 2-3 days and the cells were passaged 1:6 with Accutase every 6-8 days. The cells were maintained in Neural Expansion Medium for a total of 24 days prior to fixing for immunocytochemistry.

Endothelial differentiation (adapted from 59): hPSCs at 80% confluency were dissociated with Accutase (Invitrogen) and passaged 1:4 onto Matrigel-coated plates. hPSCs were differentiated into mesoderm by culturing for 2 days in E8BAC medium (Essential 8 with 5 ng/mL bone morphogenetic protein (BMP)-4, 25 ng/mL Activin A, and 1 µM CHIR-99021), with 10 µM Y-27632 included in the media on the first day to improve cell survival. Mesoderm was then cultured for 4 days in E7Vi medium (Essential 6 with 100 ng/mL bFGF, 50 ng/mL vascular endothelial growth factor (VEGF)-A165, and 5 µM SB431542) before fixing for immunocytochemistry.

Hepatocyte differentiation (adapted from 60): One day before starting differentiation, hPSCs were dissociated with Accutase and seeded onto Matrigel-coated plates at $5\times10^4$ cells/cm$^2$ in E8 supplemented with 10 µM Y-27632. To initiate differentiation, media was changed to RPMI containing 1× B-27 minus insulin and 100 ng/mL Activin A on the day after seeding. Cells were maintained in this differentiation medium for a total of three days. Media was then changed to RPMI+B-27 minus insulin supplemented with 30 ng/mL FGF-4 and 20 ng/mL BMP-2 for five days. Finally, cells were maintained in RPMI+B-27 minus insulin supplemented with 20 ng/mL hepatocyte growth factor (HGF) for an additional five days, prior to fixing for immunocytochemistry.

Karyotyping and teratoma assays: Samples were provided to WiCell (Madison, WI) for teratoma formation assays and G-banded karyotyping with analysis and interpretation by the Cytogenetics Lab at WiCell. Histology from teratoma assays was analyzed and interpreted by the Comparative Pathology Laboratory of the University of Wisconsin—Madison.

Figure 7A:
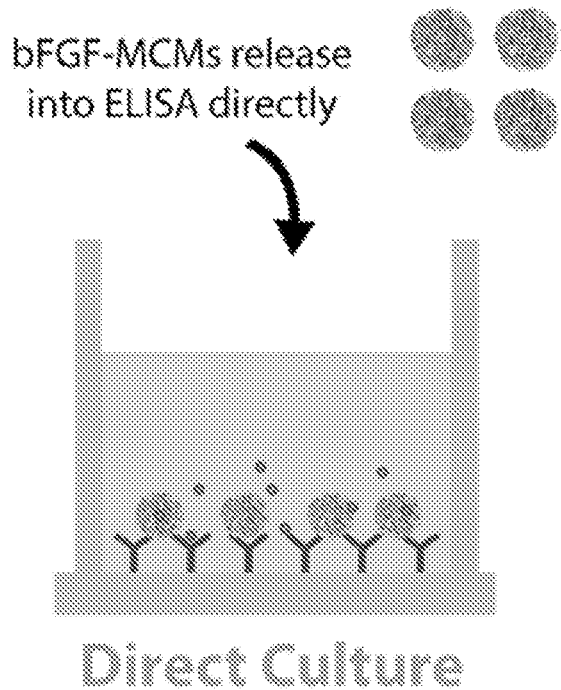
FIGS. 7A & 7B depict development of bFGF bioactivity ELISA for MCMs.
Figure 7B:
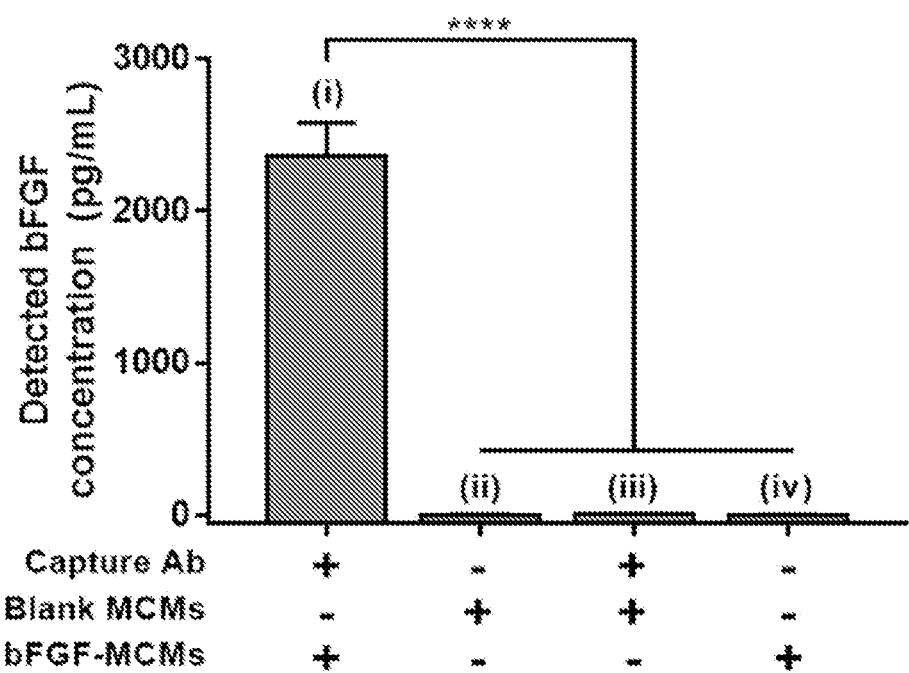

ELISAs: ELISAs for measuring bFGF (Quantikine basic FGF ELISA, R&D Systems, DFB50), phosphoERK and total ERK (Abcam, ab176660) were performed following the manufacturer's recommended protocol. MCMs were confirmed not to interfere with bFGF Quantikine ELISA readouts (FIG. 7B). For phosphoERK and total ERK assays, 10 µg total protein was loaded per well of the ELISA based on protein concentration of cell lysates as quantified by microBCA.

bFGF biological activity: For experiments correlating bFGF ELISA readout to ERK phosphorylation, hPSCs were starved of bFGF (in E7) for 24 hrs, followed by 2 hr restimulation with E7 containing different concentrations of fresh bFGF in solution (created by mixing E8 and E7 media at different ratios). For experiments correlating loss of bFGF bioactivity to ERK phosphorylation, E8 media was incubated for 1, 6, or 24 hr at 37° C. or 65° C. and allowed to cool before restimulating bFGF-starved hPSCs as described above. bFGF content in restimulation media was measured by Quantikine bFGF ELISA. Relative phosphoERK content in restimulated hPSCs was determined by phosphoERK and total ERK ELISAs on cell lysates. Briefly, cells were washed with PBS and resuspended in ice-cold RIPA buffer containing 1× Halt Protease/Phosphatase Inhibitor Cocktail. Samples were agitated for 15 min at 4° C. and spun at 12,000 g for 15 min at 4° C. The supernatants from samples were collected and total protein in lysates was quantified by microBCA assay (Thermo Fisher Scientific). For experiments comparing thermal stability of free bFGF vs. MCM-bound bFGF, solutions containing 100 ng/mL bFGF in E7 or 62 µg/mL optimized bFGF-MCMs in E7 (to match usage in cell culture experiments) were stored at 4° C. or incubated for different durations at 37° C. prior to assessing active bFGF content via Quantikine bFGF ELISA.

Comparison of bFGF-MCMs and PLGA microspheres: bFGF-releasing PLGA microspheres (STEMBEADS® FGF2) were purchased from StemCultures. For all comparison studies, bFGF-MCMs and PLGA microspheres were resuspended to concentrations equivalent to those used in cell culture experiments (62 µg/mL for optimized bFGF-MCMs; 8 µL/mL for PLGA microspheres, following manufacturer's recommendations).

Active and total bFGF release. bFGF-MCMs and PLGA microspheres were suspended in DF3S medium (Thermo Fisher Scientific), as TGF-β1 in E7 was found to contribute substantial background to the total protein measurement. The resulting solutions were incubated and rotated at 37° C. with daily collection of releasate over 4 days. To measure active bFGF release, a fraction of the homogeneous MCM and microsphere suspensions was first collected. To measure total bFGF release, the MCM or microsphere suspensions were then centrifuged at 22,000 g/2 min and the supernatant was collected and fresh DF3S medium replaced. The amount of active and total bFGF released were determined by Quantikine bFGF ELISA (R&D Systems) and NanoOrange Protein Quantitation kit (Thermo Fisher Scientific), respectively. Cumulative daily values of active bFGF release were extrapolated from bFGF content in releasates during the 2 hr sample incubation step of the bFGF Quantikine ELISA (FIG. 7A). Quantitation of total protein content by NanoOrange was performed after concentrating releasates with Amicon 3 kDa MWCO Centrifugal Filter Units (EMD Millipore).

Statistics: The DOE graphs and models were generated in JMP while all other graphs were generated in GraphPad Prism. Statistics between Oct4+/Nanog+ population percentages were done in GraphPad Prism. The degree of significance for each comparison is denoted in each figure/caption.

Results

Figure 8A:
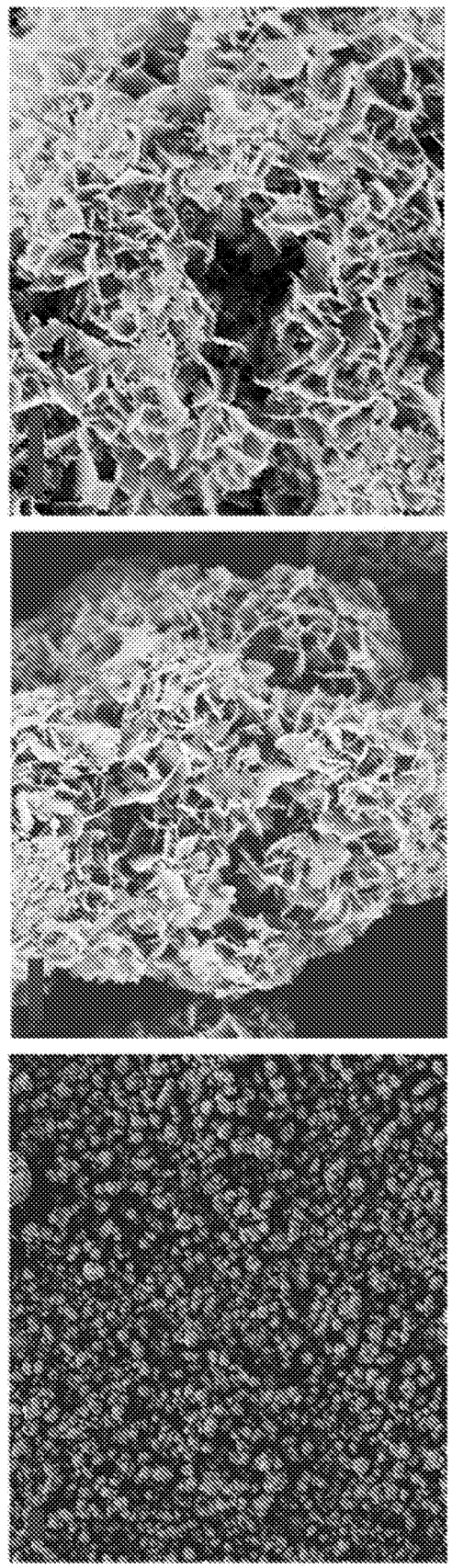
FIGS. 8A-8C depict characterization of MCMs for bFGF delivery.
Figure 8B:
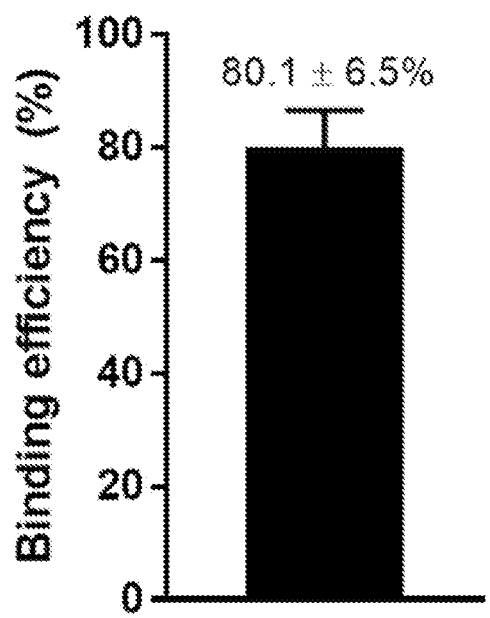
Figure 9A:
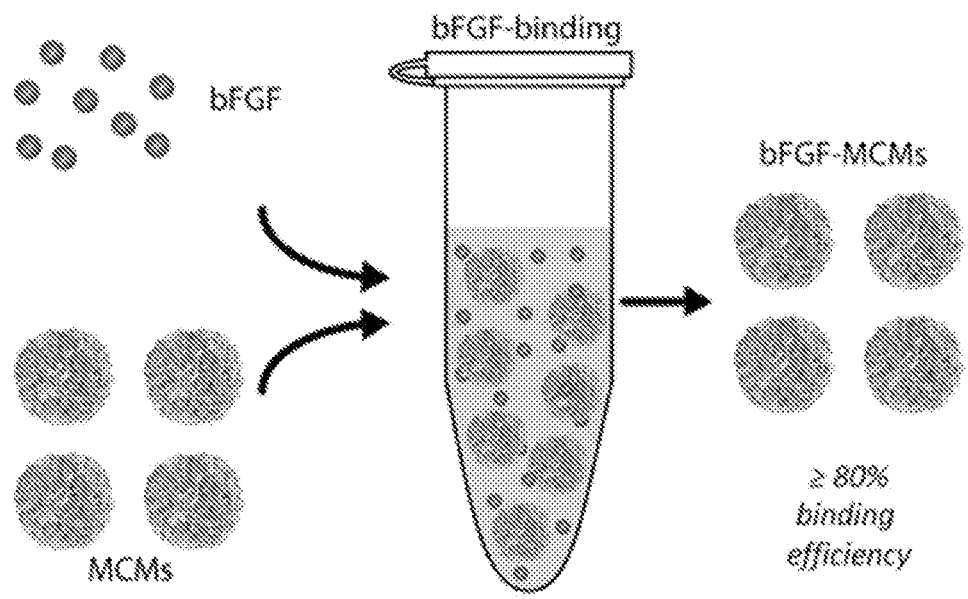
FIGS. 9A-9D show that MCMs bind and release bFGF for sustained bFGF presentation in hPSC culture.
Figure 10A:
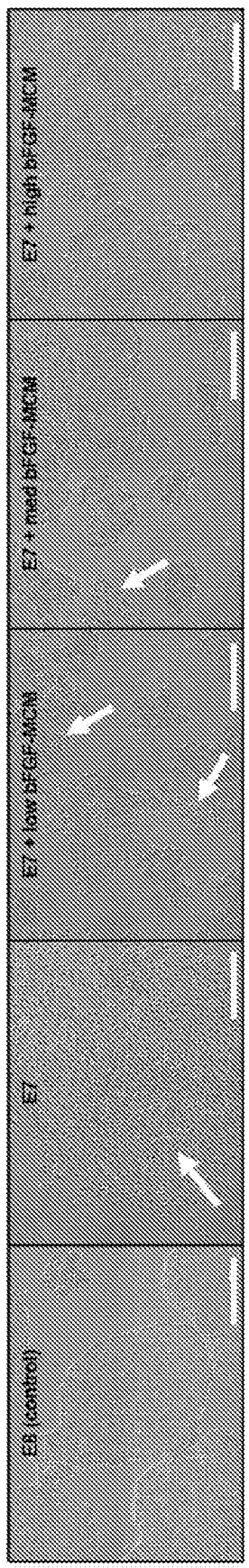
FIGS. 10A-10C depict bFGF-loaded MCMs (bFGF-MCMs) in Transwell culture have a dose-dependent effect on the percentage of hPSCs expressing Oct4 and Nanog.
Figure 10B:
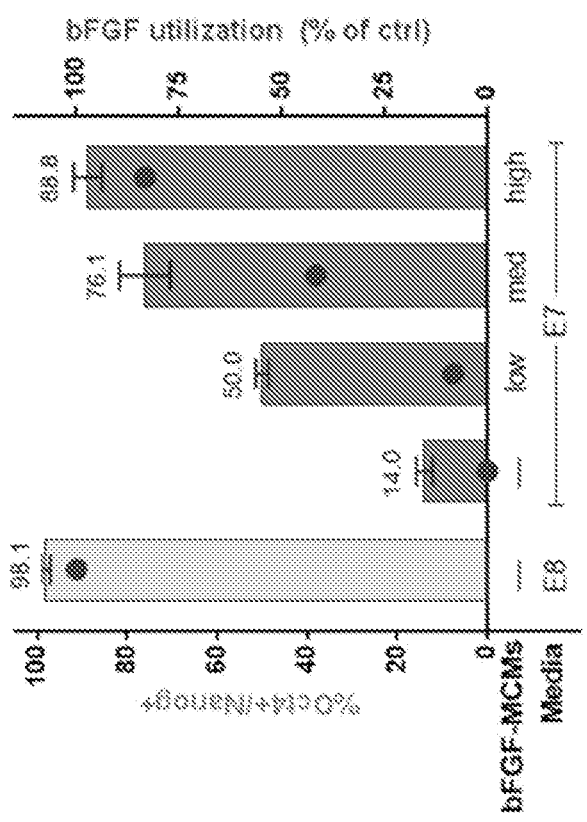
Figure 10C:
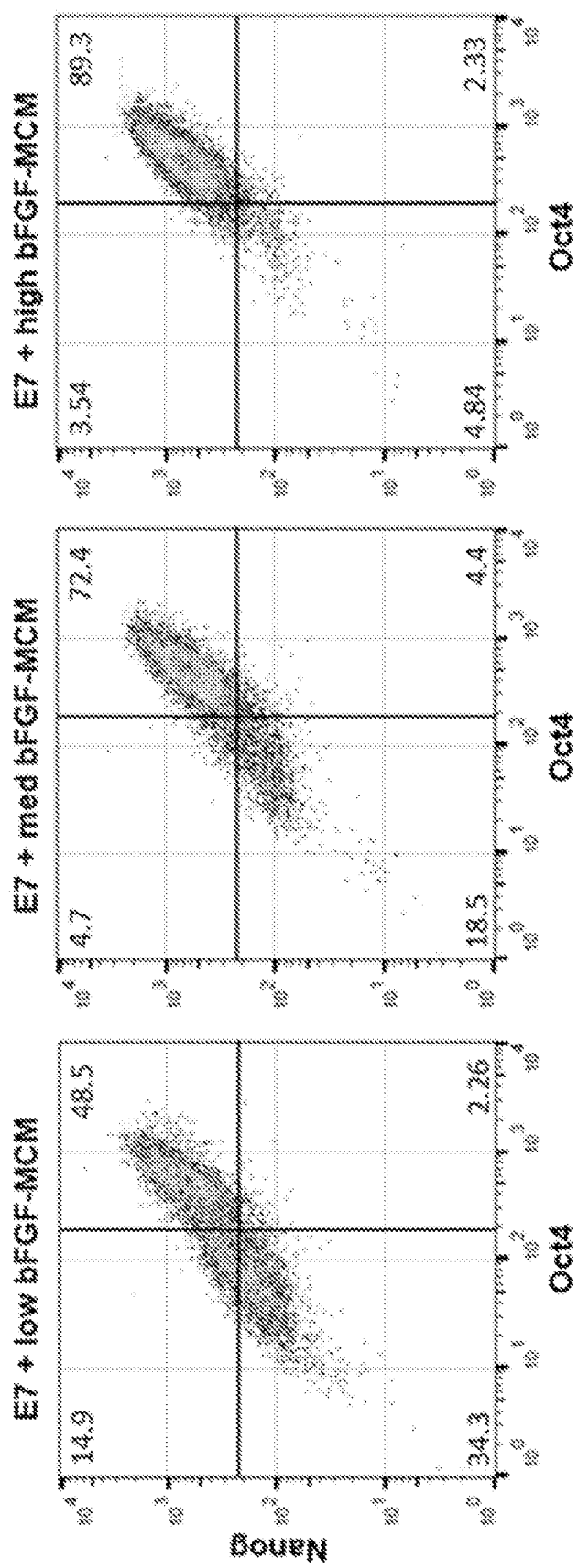
Figure 11A:
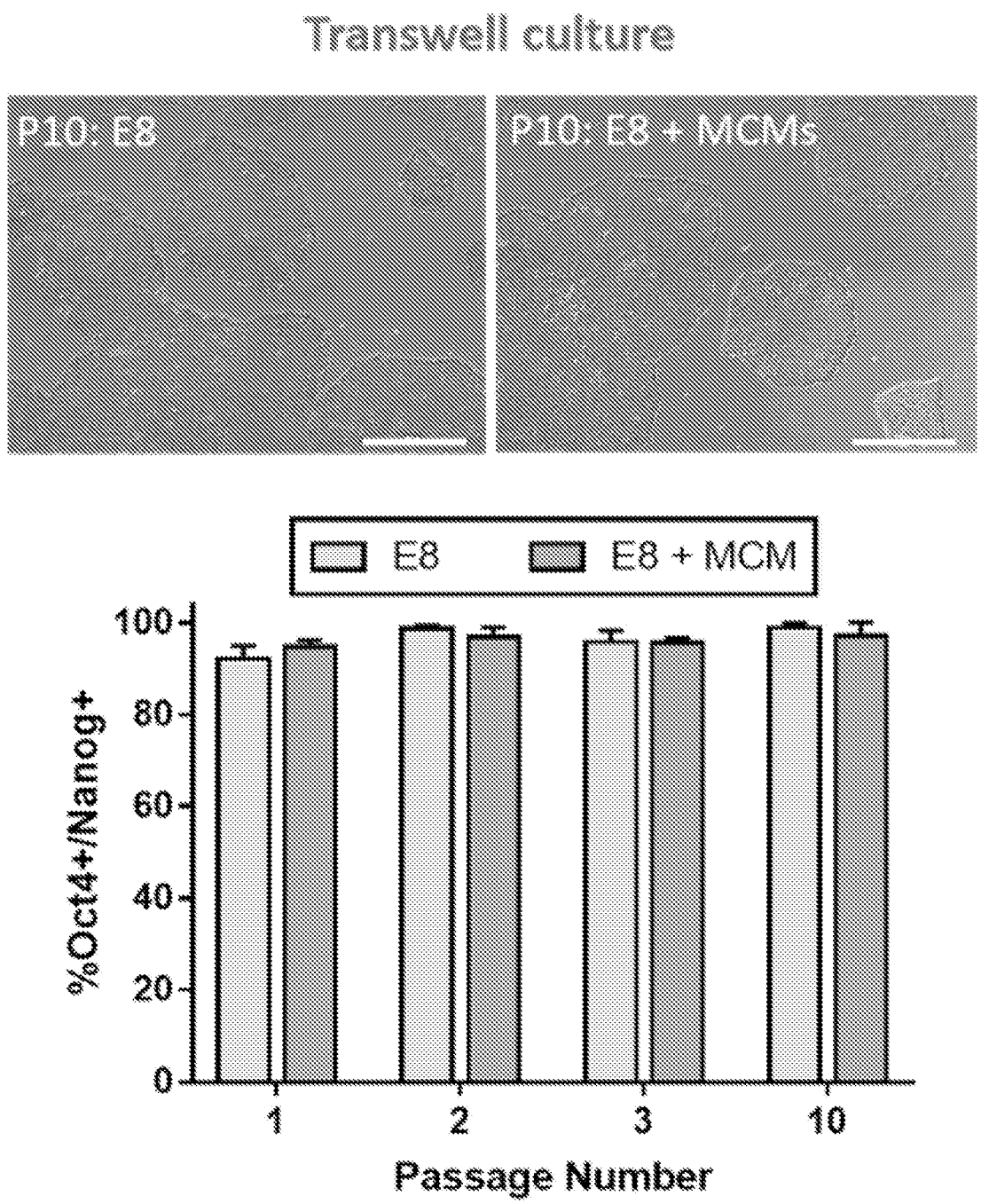
FIGS. 11A & 11B show that blank (unloaded) MCMs do not significantly affect pluripotency marker expression. Representative phase contrast images (passage 10) and flow cytometry analysis for % Oct4+/Nanog+ hPSCs cultured in E8 media, in the presence or absence of unloaded MCMs in (FIG. 11A) Transwell culture or (FIG. 11B) direct culture over 10 passages. No statistically significant effect of MCMs on % Oct4+/Nanog+ hPSCs was found in Transwell (p=0.73) or direct culture (p=0.21, two-way ANOVA). Scale bars=500 µm.
Figure 11B:
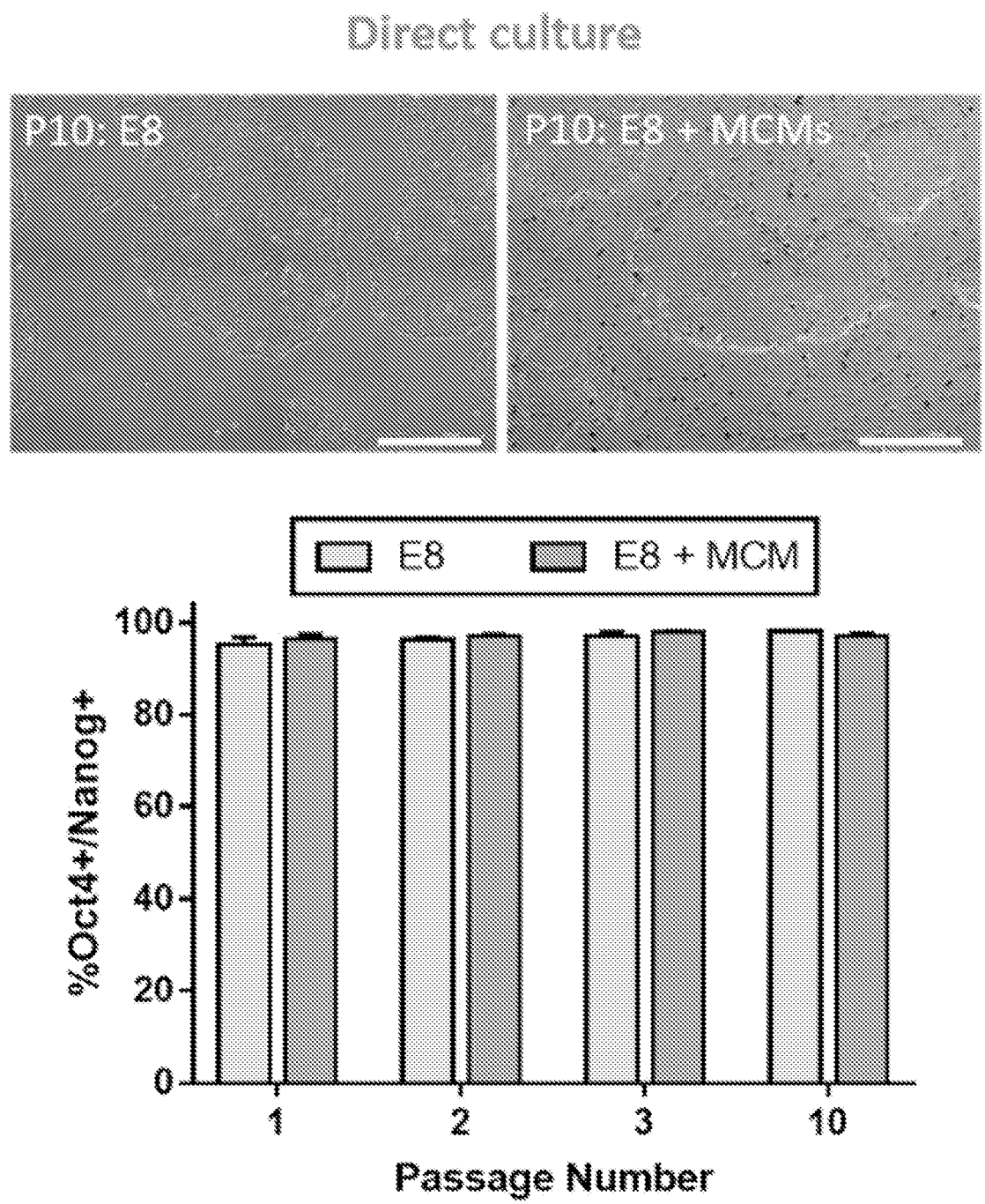
Figure 12A:
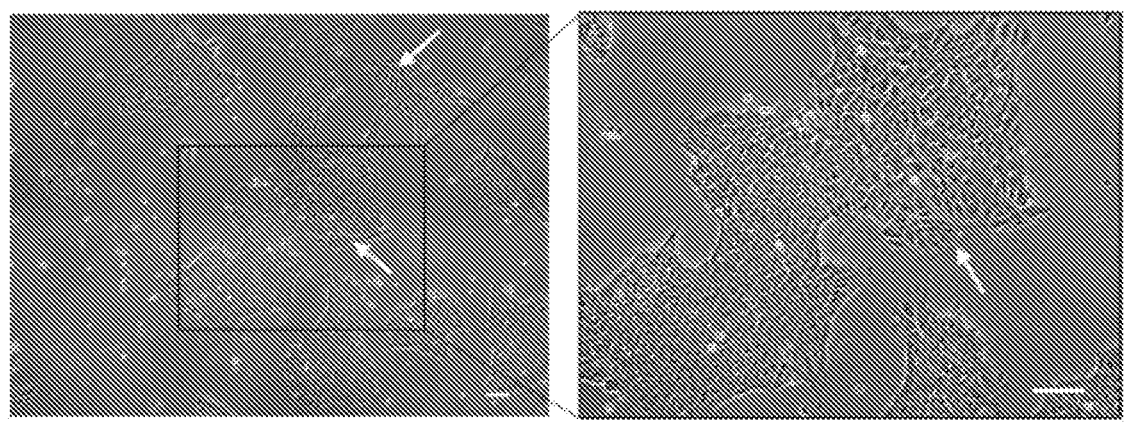
FIG. 12A depicts areas of spontaneous differentiation (white arrows) observed in H1 hESCs in Transwell culture with non-optimized bFGF-MCMs (1.0 mg/"high" dose) by passage 4. Scale bars=100 µm.
Figure 12B:
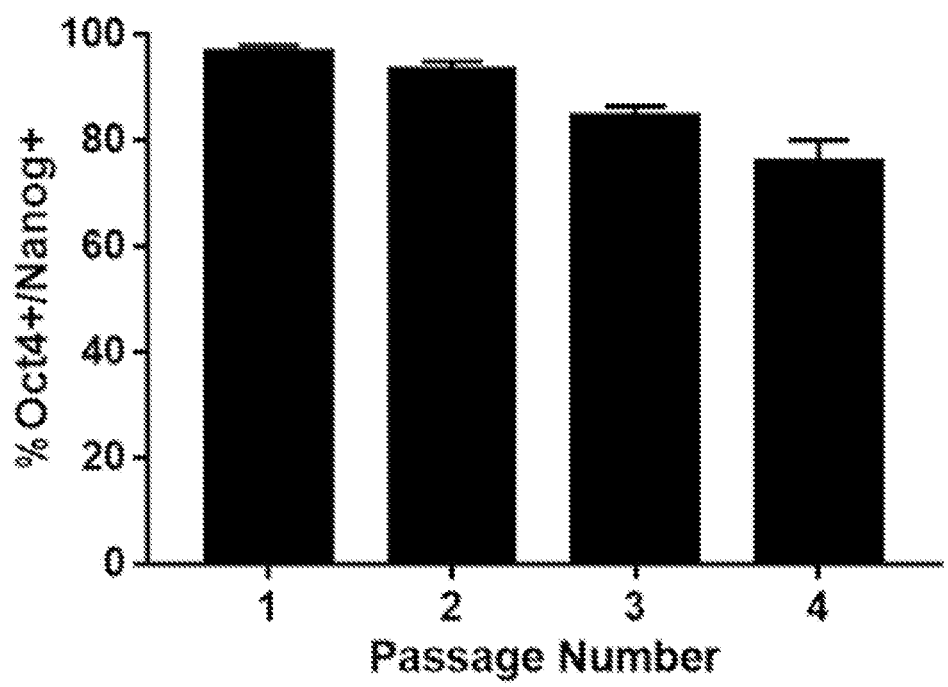
FIG. 12B depicts high dose of non-optimized bFGF-MCMs is insufficient for maintaining>95% Oct4+/Nanog+ hPSCs beyond passage 2.

MCMs efficiently bound and released bFGF to maintain Oct4 and Nanog expression in hPSCs in a dose-dependent manner. Incubation of hydroxyapatite powder in modified simulated body fluid produced microparticles with inorganic nanostructured, plate-like coatings capable of sustaining delivery of bFGF in hPSC culture (FIG. 8A). These coatings demonstrated a high capacity for bFGF binding, with 80.1±6.5% (0.97 μg bFGF/mg MCM) bound after incubation for one hour at room temperature (FIGS. 8B & 9A). The dose-dependent manner in chemically defined media devoid of bFGF (Essential 8 media minus bFGF, hereafter referred to as "E7"). Culture with bFGF-MCMs maintained hPSC colonies with epithelial-like morphologies, similar to those of cells in E8. The appearance of spontaneously differentiating mesenchymal-like cells was inversely correlated with bFGF-MCM dose (FIG. 12A). hPSCs cultured in E7 alone underwent spontaneous differentiation by passage 2, as evidenced by the appearance of cells with mesenchymal-like morphology and concomitant loss of Oct4 and Nanog expression (21.2±10.5% Oct4$^+$/Nanog$^+$ by passage 2; 14.0±1.7% by passage 3) (FIGS. 10A & 10B). Increasing amounts of bFGF-MCMs (mass of MCMs per well=0.1 mg/"low", 0.5 mg/"med", or 1.0 mg/"high") resulted in 50.0±1.4%, 76.1±5.6%, and 88.8±3.1% Oct4$^+$/Nanog$^+$ hPSCs at passage 3, respectively (FIGS. 10B & 10C). Importantly, the presence of unloaded MCMs did not significantly affect pluripotency marker expression of hPSCs cultured in Transwell or direct culture formats over 10 passages (40 days) in E8 medium (FIGS. 11A & 11B). In comparison to standard culture of hPSCs in E8 (which consistently maintained ~95% Oct4$^+$/Nanog$^+$ cells with 100 ng/mL bFGF per day), the high dose of bFGF-MCMs reduced bFGF consumption by 16.7% (FIG. 10B, Table 1), but was unable to maintain undifferentiated hPSCs beyond passage 3 (FIGS. 12A & 12B).

TABLE 1

Total bFGF utilization over 3 passages for MCM binding conditions tested in DOE optimization experiment.

| Culture format | Transwell Culture | | | | | | | | | EB Control |
|---|---|---|---|---|---|---|---|---|---|---|
| Description | Fresh bFGF-MCMs made at initiation of culture and maintained through 3 passages | | | | | | | | | N/A |
| DOE Condition | -- | -+ | +- | ++ | a0 | A0 | 0a | OA | 00 | N/A |
| Loading formulation | 0.5 mg/mL MCM, 0.5 μg/mL bFGF | 0.5 mg/mL MCM, 2.0 μg/mL bFGF | 2.0 mg/mL MCM, 0.5 μg/mL bFGF | 2.0 mg/mL MCM, 2.0 μg/mL bFGF | 0.38 mg/mL MCM, 1.0 μg/mL bFGF | 2.67 mg/mL MCM, 1.0 μg/mL bFGF | 1.0 mg/mL MCM, 00.38 μg/mL bFGF | 1.0 mg/mL MCM, 2.67 μg/mL bFGF | 1.0 mg/mL MCM, 1.0 μg/mL bFGF | N/A |
| Mass of bFGF-MCMs/well, 12w format (mg) | 1.0 | 1.0 | 1.0 | 1.0 | 1.0 | 1.0 | 1.0 | 1.0 | 1.0 | N/A |
| Total bFGF utilization for 3 passages (14) | 1.00 | 4.00 | 0.25 | 1.00 | 2.67 | 0.37 | 0.38 | 2.67 | 1.00 | 1.20 |
| Total bFGF utilization, relative to E8 control (%) | 83.3 | 333.3 | 20.8 | 83.3 | 222.2 | 31.2 | 31.3 | 222.5 | 83.3 | 100.0 |
| Avg % Oct4$^+$/Nanog$^+$ at p3 | 96.9 | 98.1 | 44.5 | 63.1 | 97.2 | 59.0 | 55.9 | 97.1 | 80.7 | 93.87 |

Figure 8C:
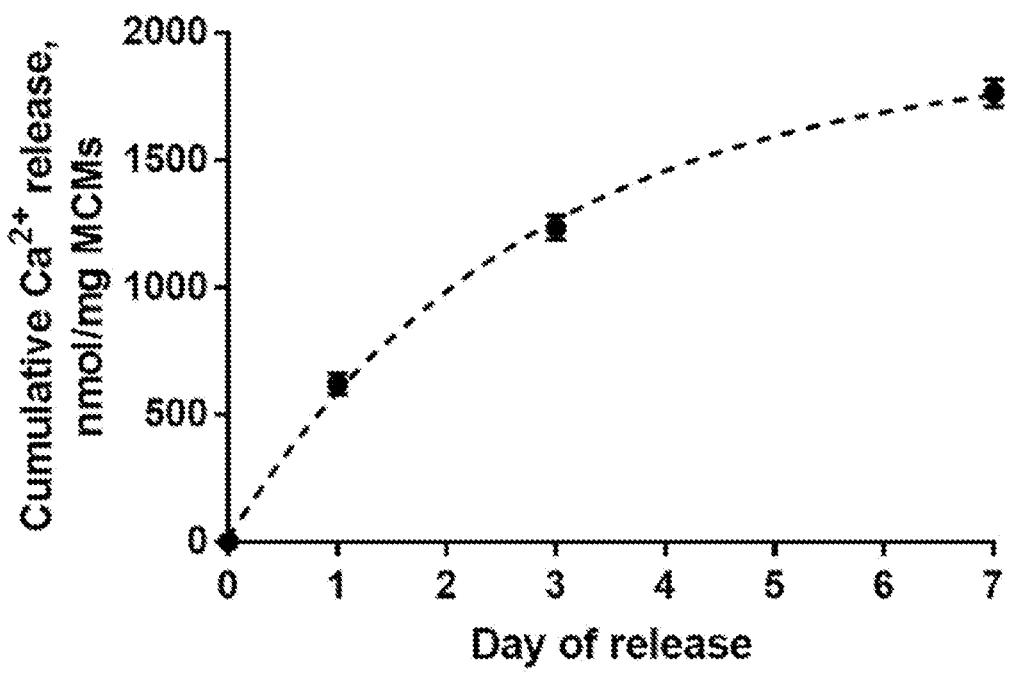
Figure 9B:
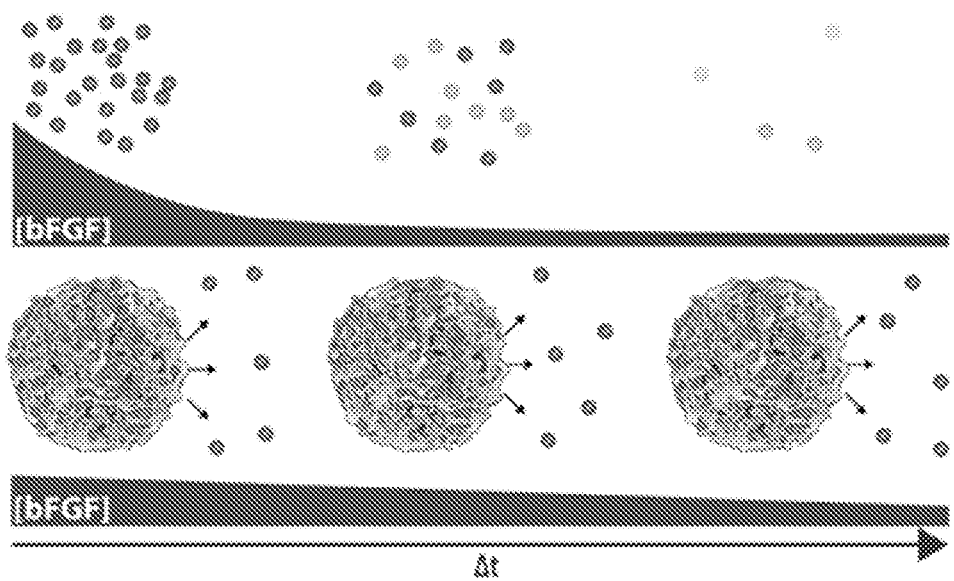
Figure 9C:
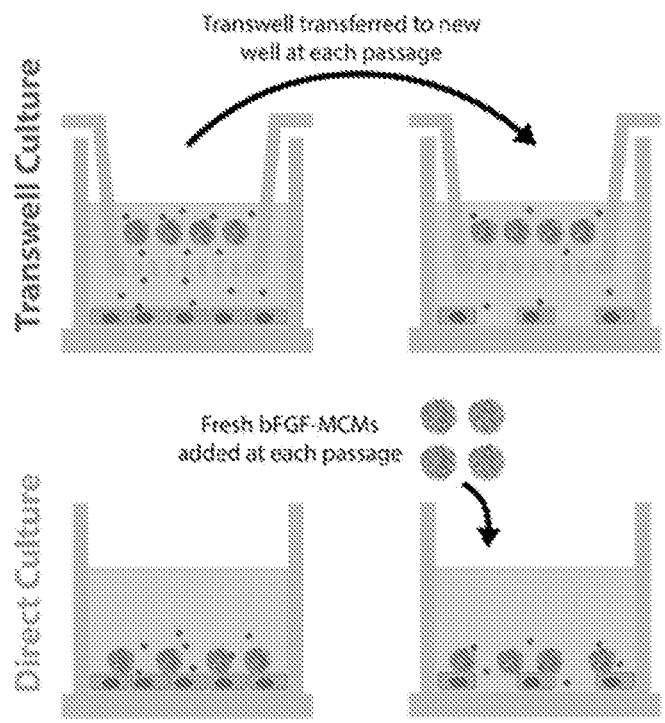
Figure 9D:
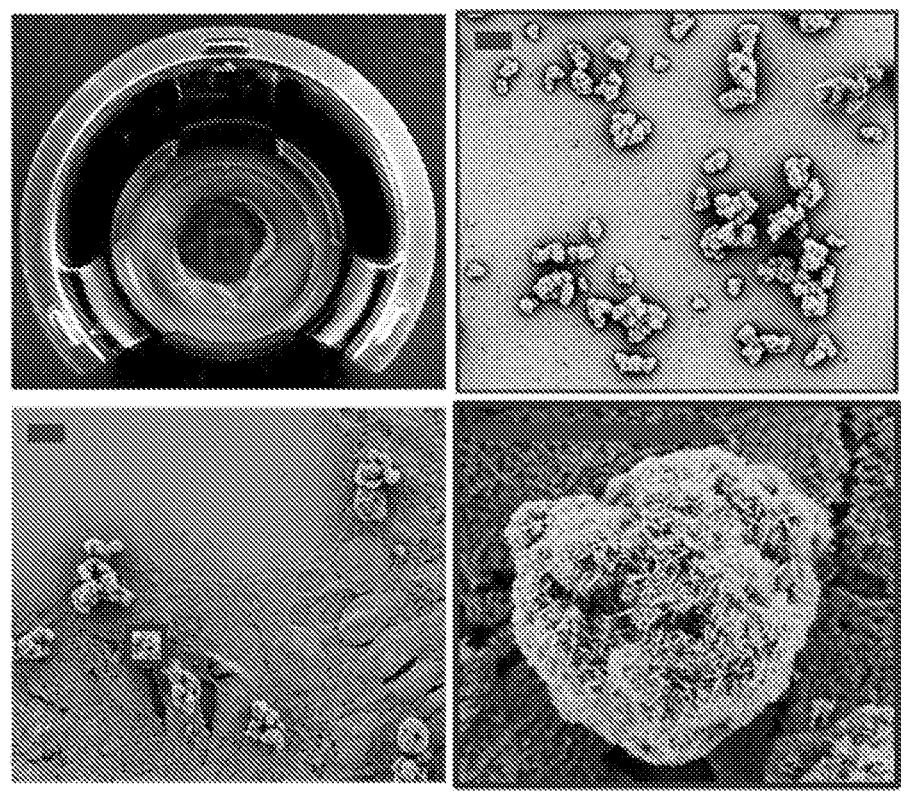

MCMs afforded sustained bFGF release by gradually dissolving at physiological pH, as indicated by sustained calcium dissolution in pH 7.4 Tris-buffered saline over 7 days (FIGS. 8C & 9B). In Transwell culture, MCMs released bFGF without directly contacting cells, and bFGF-MCM-containing Transwells were carried over for continued sustained release throughout the duration of culture. In the direct culture format, bFGF-MCMs were prepared fresh for each passage and added directly to wells containing hPSCs (FIG. 9C). The MCMs interacted closely with the cell membrane but were not internalized, as evidenced by the clear nanostructured features that remained observable by SEM after direct culture of MCMs with hPSCs (FIG. 9D).

Figure 13A:
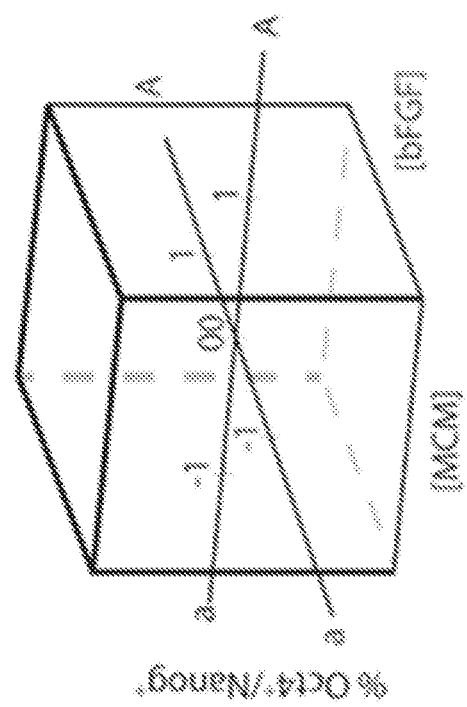
FIGS. 13A-13E show that design of experiments (DOE) optimization of bFGF binding solution identifies MCM conditions that maintain hPSC pluripotency marker expression while minimizing bFGF usage.
Figure 13B:
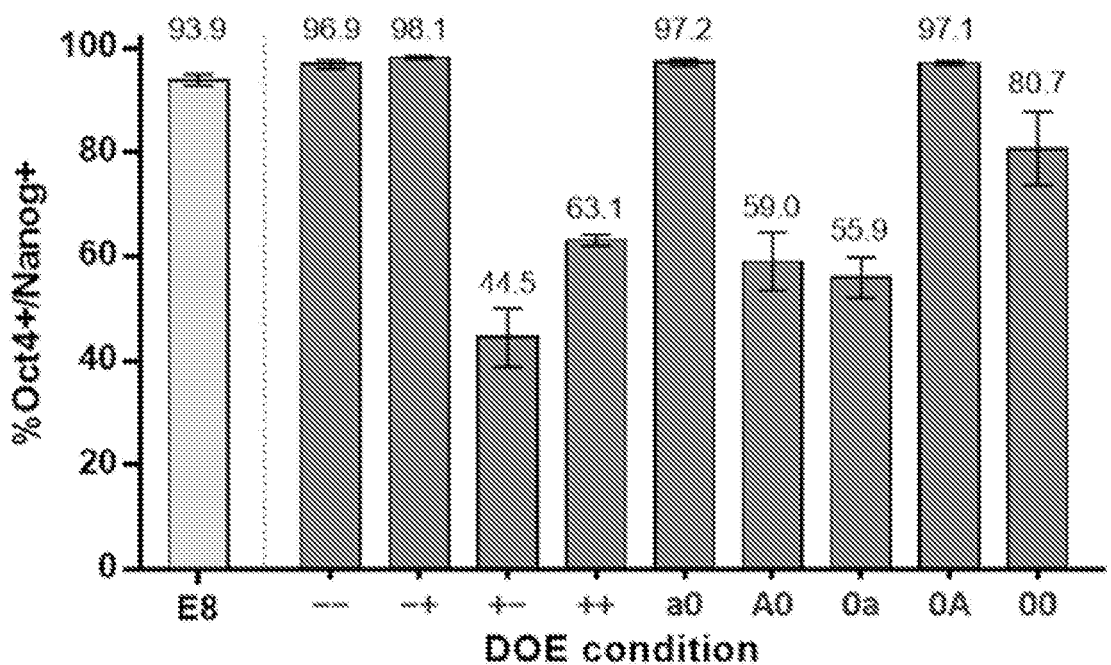
Figure 13C:
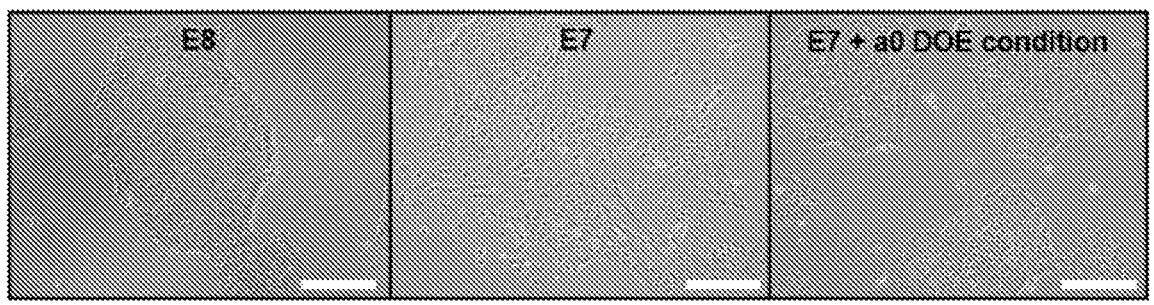

Sustained bFGF release from MCMs maintained hPSC expression of pluripotency markers Oct4 and Nanog in a A Design of Experiments (DOE)-based optimization of bFGF-MCM fabrication afforded maintenance of >95% Oct4$^+$/Nanog$^+$ hPSCs while minimizing bFGF required. A rotatable response surface design was constructed to determine the effects of MCM and bFGF concentrations in the MCM loading solution on hPSC pluripotency. The two-factor, five-level design generated nine unique MCM loading conditions that were tested in Transwell culture for their capacity to maintain pluripotency marker expression for three passages (FIG. 13A). These conditions maintained a range of 44.5±5.6% to 98.1±0.4% Oct4$^+$/Nanog$^+$ hPSCs. Four of the nine MCM loading conditions maintained>95% Oct4$^+$/Nanog$^+$ hPSCs with undifferentiated colony morphology at passage 3, comparable to control hPSCs maintained in E8 media (FIGS. 13B & 13C). Of these four conditions, only (--) reduced the amount of bFGF utilized in comparison to E8 by 16.7% (Table 1).

Figure 13D:
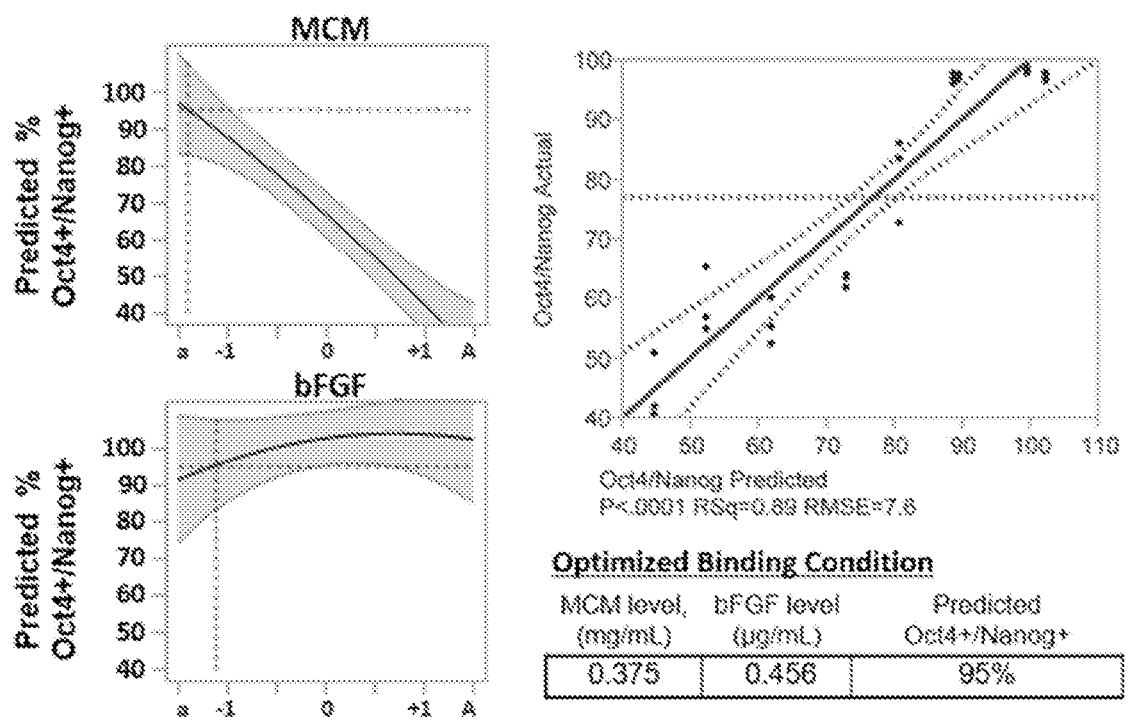
Figure 13E:
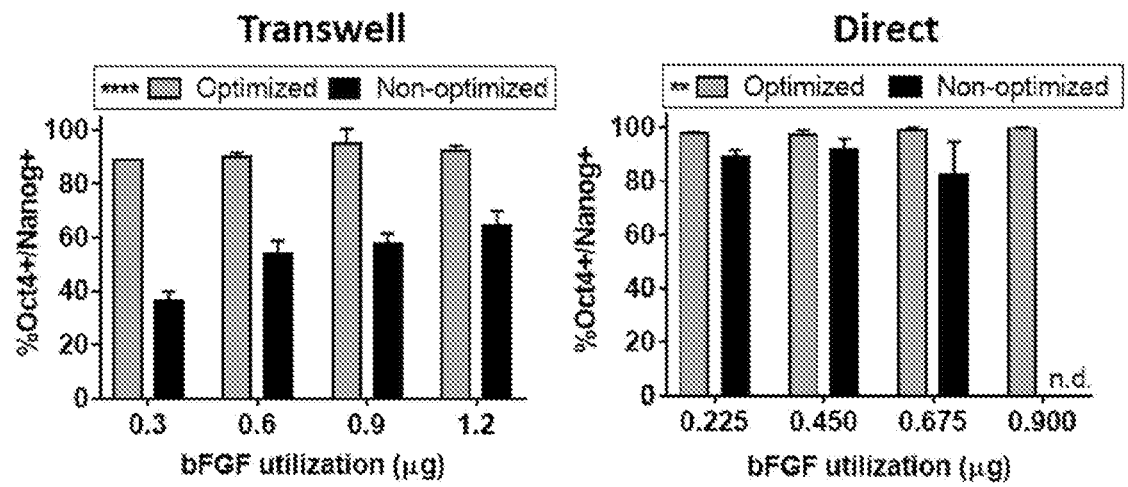

Multivariate analysis of the experimental data resulted in a model with goodness of fit F<0.0001 and statistically significant dependence (P<0.0001) of % Oct4$^+$/Nanog$^+$ hPSCs on both MCM and bFGF concentration in the MCM loading solution (FIGS. 13D & 14A-14C). By defining desirability as "minimizing the amount of bFGF utilized while achieving 95% Oct4$^+$/Nanog$^+$ population," the model was used to determine an optimized MCM loading solution of 0.375 mg/mL MCMs and 0.456 µg/mL bFGF (FIG. 13D). The model was tested by comparing bFGF-MCMs fabricated using the optimized loading condition to non-optimized bFGF-MCMs, across a range of doses in which total bFGF utilization was matched between the two conditions (Table 2). All optimized conditions outperformed non-optimized conditions over three passages in the Transwell culture format. Specifically, MCM doses of 0.6, 0.9, and 1.2 µg bFGF maintained>90% Oct4$^+$/Nanog$^+$ hPSCs using optimized MCMs, while corresponding doses of the non-optimized formulations maintained only 54-64% Oct4$^+$/Nanog$^+$ (FIG. 13E, Table 2). In the direct culture format, all four tested doses of optimized MCMs (61-246 µg bFGF-MCMs per well) successfully maintained>97% Oct4$^+$/Nanog$^+$ hPSCs in E7 media over 3 passages, while corresponding doses of the non-optimized formulations maintained 83-93% Oct4$^+$/Nanog$^+$ (FIG. 13E, Table 2). In addition, the optimized MCMs reduced total bFGF usage by 25.0% (Transwell) and 81.2% (direct) compared to standard hPSC culture in E8 medium with daily feeding (100 ng bFGF/mL per day) while maintaining>95% Oct4$^+$/Nanog$^+$ hPSCs. (Table 3).

TABLE 2

Comparison of total bFGF utilization between non-optimized and optimized bFGF-MCM conditions in Transwell and direct culture formats (see FIG. 13E), versus standard E8 culture. Bolded, italicized conditions are those referred to as "optimized Transwell" and "optimized direct" in the manuscript text, the results for which are summarized in Table 1. All calculations for bFGF utilization were made on a "per well" basis in 12-well plate format with 1.0 mL media volume per well.

| Culture | Transwell Culture | | | | | | | |
|---|---|---|---|---|---|---|---|---|
| Description | Fresh bFGF-MCMs made at initiation of culture and maintained through 3 passages | | | | | | | |
| | Non-optimized | | | | Optimized | | | |
| Loading Formulation | 1.0 mg/mL MCM, 1.0 µg/mL bFGF | | | | 0.375 mg/mL MCM, 0.456 µg/mL bFGF | | | |
| Mass of bFGF-MCMs/well, 12w format (mg) | 0.300 | 0.600 | 0.900 | 1.200 | 0.300 | 0.600 | 0.900 | 1.200 |
| bFGF utilization per passage (µg) | N/A | | | | N/A | | | |
| Total bFGF utilization for 3 passages (µg) | 0.300 | 0.600 | 0.900 | 1.200 | 0.300 | 0.600 | 0.900 | 1.200 |
| Total bFGF utilization, relative to E8 control (%) | 25.0 | 50.0 | 75.0 | 100.0 | 25.0 | 50.0 | 75.0 | 100.0 |
| Average % Oct4$^+$/Nanog$^+$ at p3 | 36.5 | 54.1 | 57.8 | 64.4 | 88.8 | 90.2 | 95.0 | 92.1 |
| Culture | Direct Culture | | | | | | | |
| Description | Fresh bFGF-MCMs made and added at each passage | | | | | | | |
| | Non-optimized | | | | Optimized | | | |
| Loading Formulation | 1.0 mg/mL MCM, 1.0 µg/mL bFGF | | | | 0.375 mg/mL MCM, 0.456 µg/mL bFGF | | | |
| Mass of bFGF-MCMs/well, 12w format (mg) | 0.075 | 0.150 | 0.225 | 0.300 | 0.061 | 0.123 | 0.185 | 0.246 |
| bFGF utilization per passage (µg) | 0.075 | 0.150 | 0.225 | 0.300 | 0.075 | 0.150 | 0.225 | 0.300 |
| Total bFGF utilization for 3 passages (µg) | 0.225 | 0.450 | 0.675 | 0.900 | 0.225 | 0.450 | 0.675 | 0.900 |

TABLE 2-continued

Comparison of total bFGF utilization between non-optimized and optimized bFGF-MCM conditions in Transwell and direct culture formats (see FIG. 13E), versus standard E8 culture. Bolded, italicized conditions are those referred to as "optimized Transwell" and "optimized direct" in the manuscript text, the results for which are summarized in Table 1. All calculations for bFGF utilization were made on a "per well" basis in 12-well plate format with 1.0 mL media volume per well.

| Total bFGF utilization, relative to E8 control (%) | 18.8 | 37.5 | 56.3 | 75.0 | 18.8 | 37.5 | 56.3 | 75.0 |
|---|---|---|---|---|---|---|---|---|
| Average % Oct4$^+$/Nanog$^+$ at p3 | 88.8 | 91.6 | 82.5 | N/A | 97.7 | 97.5 | 99.0 | 99.7 |

TABLE 3

Summary of bFGF utilization vs. E8, for optimized Transwell and optimized direct culture bFGF-MCMs.

| Culture Method | hPSC Maintenance | Use in Extended Culture | bFGF Reduction vs. E8 |
|---|---|---|---|
| Transwell | Passage 3 (Day 12) = 95.0% Oct4$^+$/Nanog$^+$ | Add new bFGF-MCMs every 12 days | 25.0% |
| Direct | Passage 3 (Day 12) = 7.7% Oct$^4$/Nanog$^+$ | Add new bFGF-MCMs every passage | 81.2% |

Figure 15A:
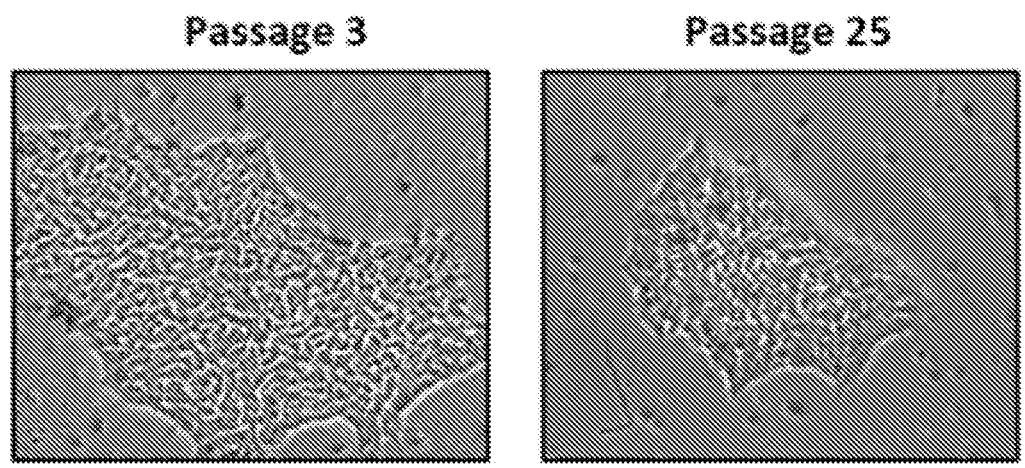
FIGS. 15A-15F show that direct culture with optimized bFGF-MCMs maintains hPSC pluripotency and normal karyotype during long-term culture.
Figure 15B:
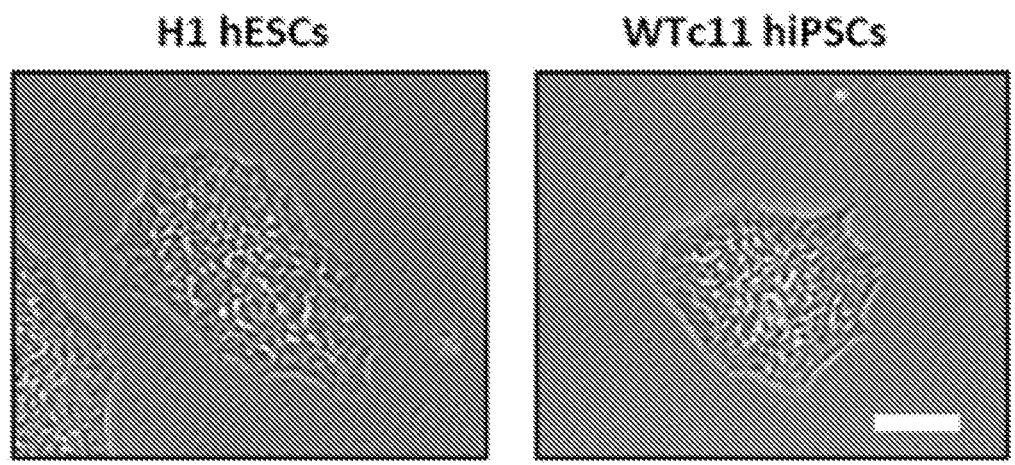
Figure 16:
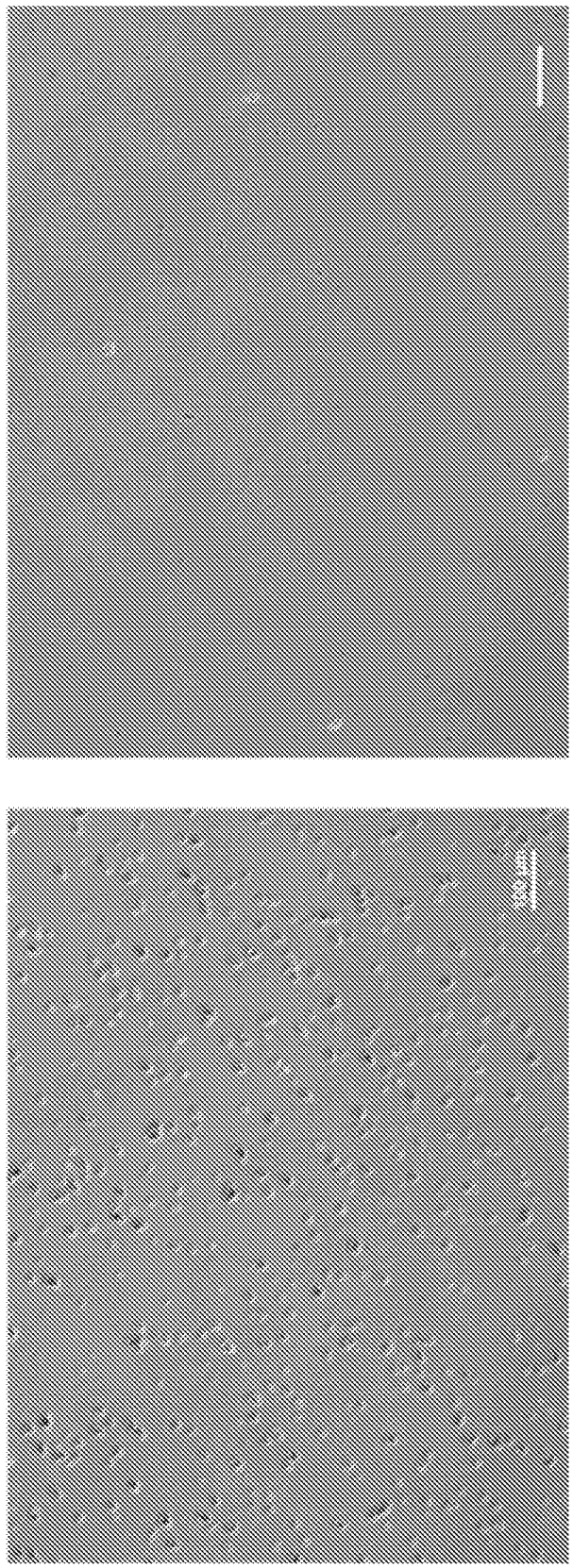
FIG. 16 shows that mineral coatings dissolve upon cell passaging using EDTA. MCMs before and after incubation in Versene EDTA solution, a calcium chelator used in standard hPSC passaging.

Long-term direct culture with optimized bFGF-MCMs maintained hPSC pluripotency while reducing bFGF by >80%. Direct culture with optimized bFGF-MCMs maintained pluripotency of two hPSC lines (H1 hESCs and WTc11 hiPSCs) in E7 for 25 passages (>3 months), while reducing the amount of required bFGF by 81.2% compared to standard culture in E8 (Table 3). Throughout the course of 25 passages, direct culture bFGF-MCMs yielded colonies with typical undifferentiated morphology for both hPSC lines (FIG. 15A). In addition, hPSCs in direct culture were able to be transitioned back to standard culture conditions (E8 media/Matrigel) with no apparent MCM carryover after 2 passages (FIG. 15B), likely due to EDTA-mediated passaging resulting in dissolution and removal of the MCMs (FIG. 16).

Figure 15C:
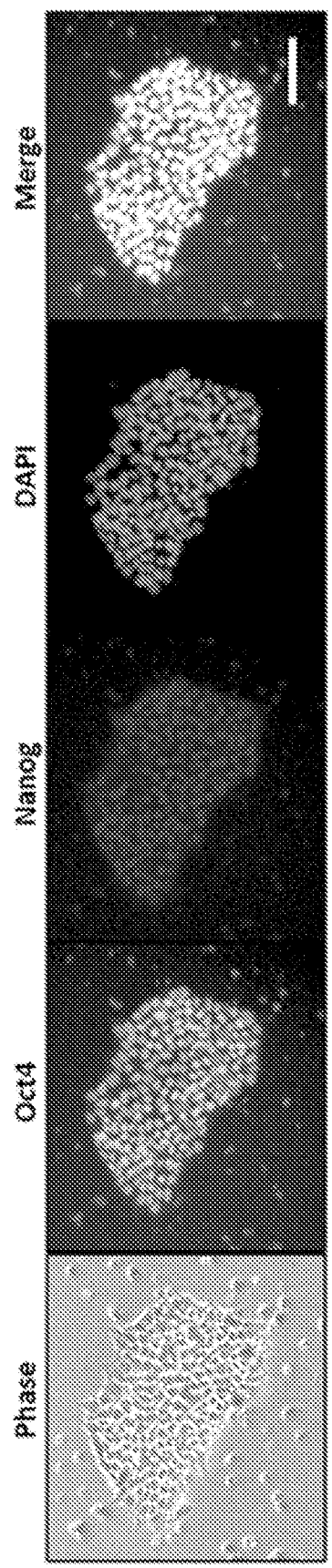
Figure 15D:
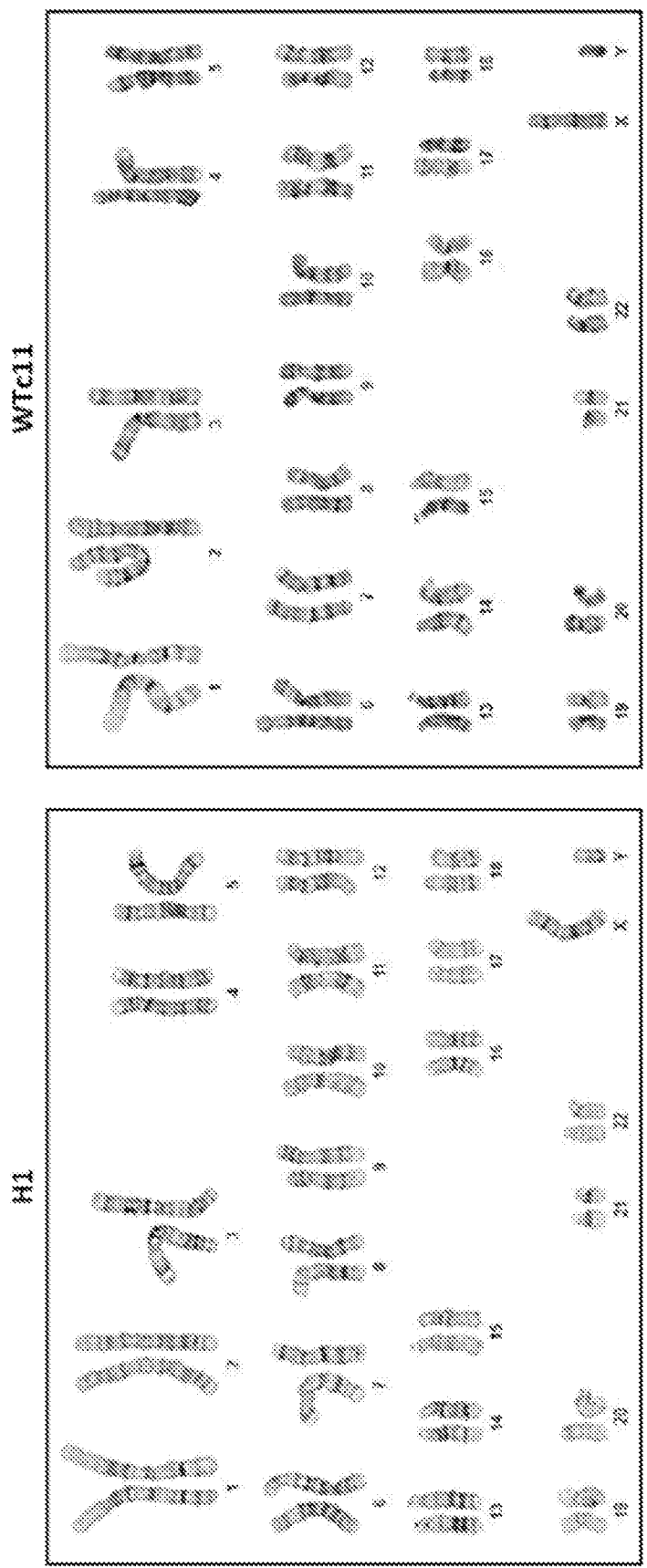
Figure 15E:
Figure 15F:
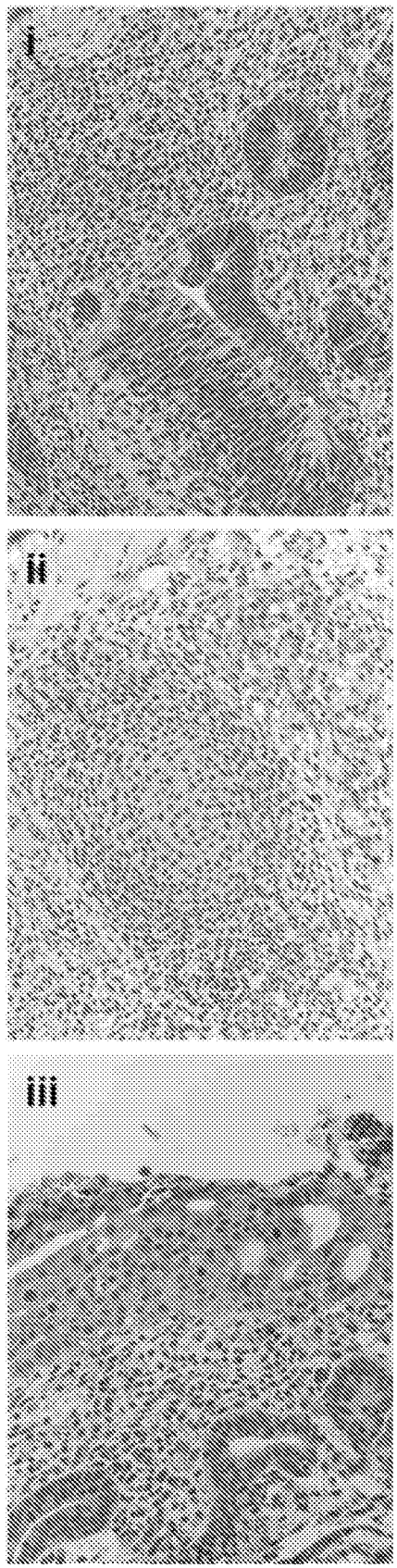
Figure 17:
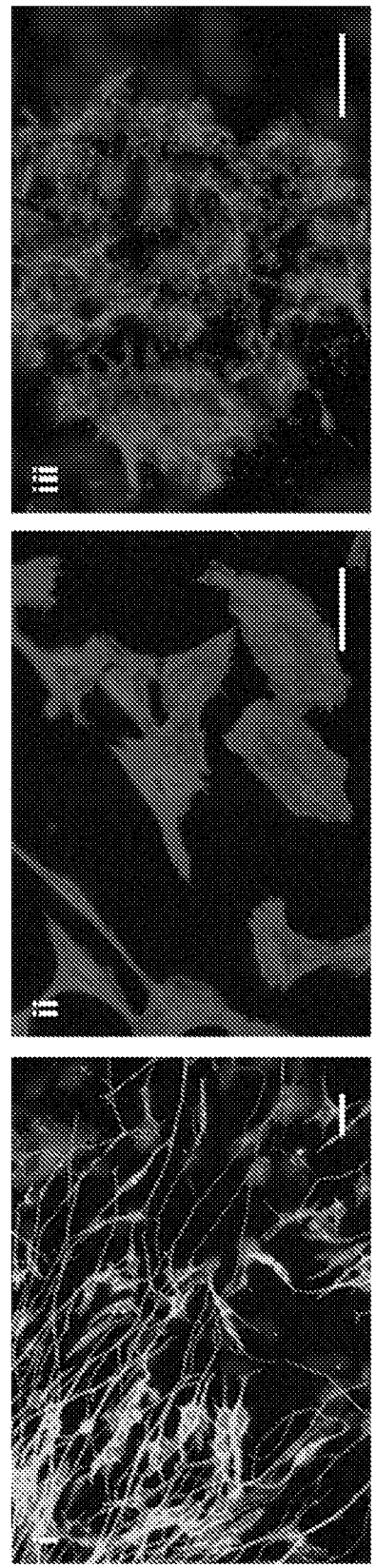
FIG. 17 depicts tri-lineage spontaneous differentiation of hPSCs following direct culture with bFGF-MCMs for 25 passages. WTc11 hiPSCs were maintained in direct culture with bFGF-MCMs for 25 passages. EBs were formed, allowed to spontaneously differentiate and adhere to Matrigel-coated dishes for 14 days, and stained for markers of i) ectoderm (beta-III tubulin), ii) mesoderm (alpha smooth muscle actin), and iii) endoderm (alpha-fetoprotein) lineages. Scale bars=50 µm.
Figure 18:
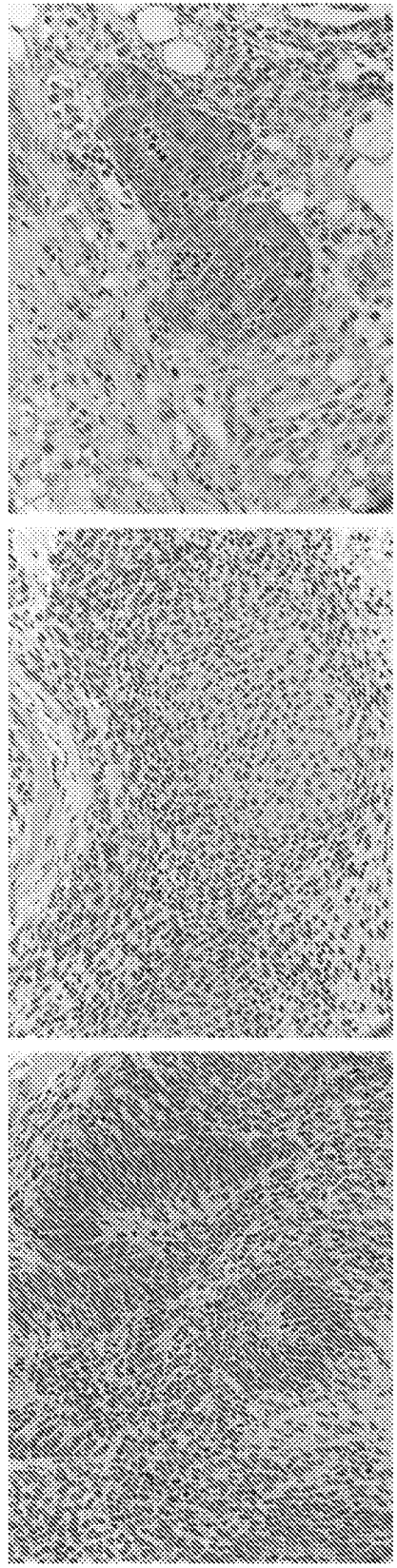
FIG. 18 depicts a histological analysis of teratomas generated from WTc11 hiPSCs after long-term (25 passages) direct culture with bFGF-MCMs. Differentiation into all three germ layers is shown: (i) ectoderm (neuroepithelium), (ii) mesoderm (cartilage) and endoderm (liver).
Figure 19:
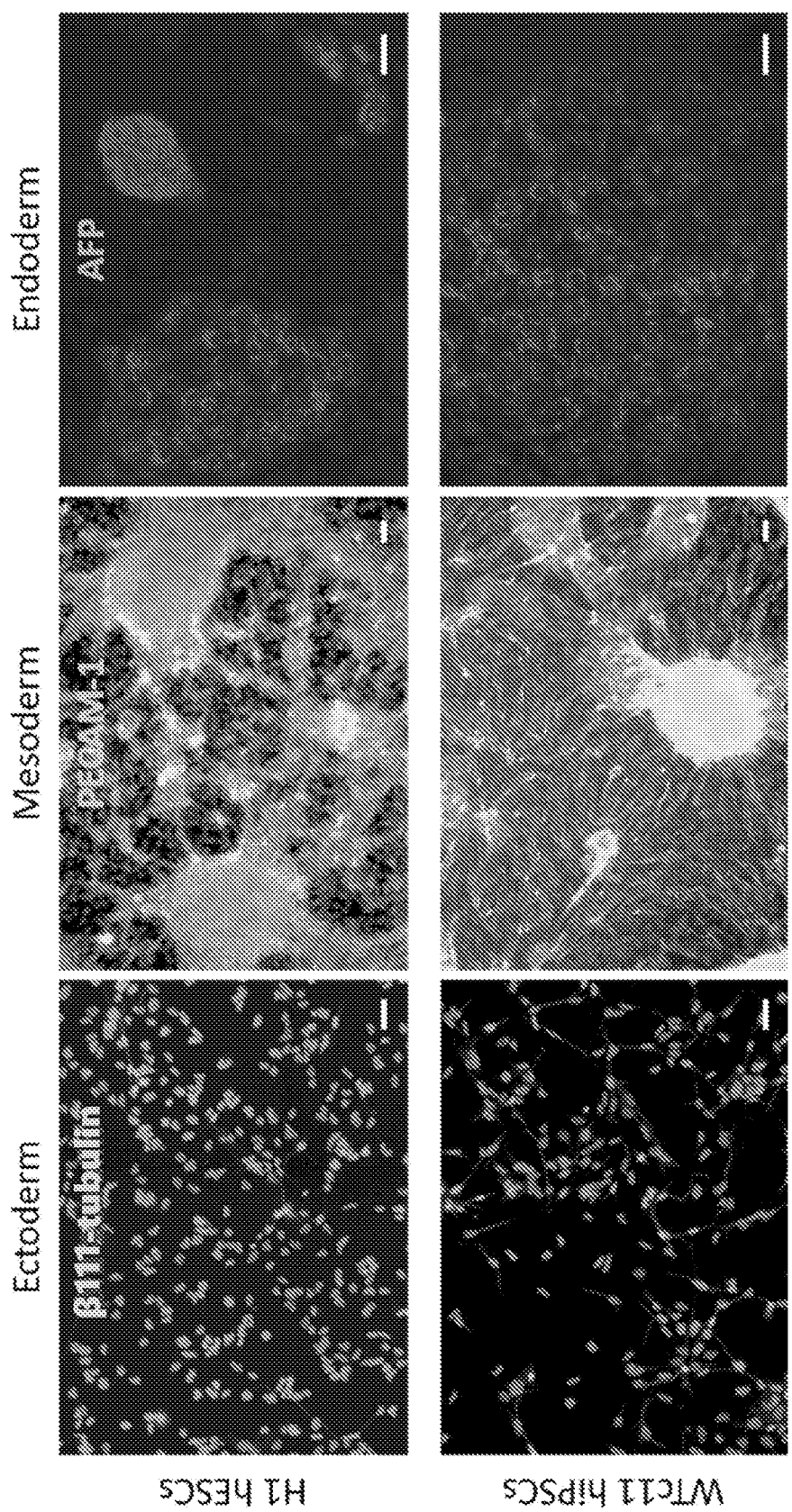
FIG. 19 depicts directed differentiation of hPSCs following direct culture with bFGF-MCMs for 25 passages. H1 hESCs or WTc11 hiPSCs were maintained in direct culture with bFGF-MCMs for 25 passages, subjected to established directed differentiation protocols, and stained for markers of i) ectoderm (beta-III tubulin), ii) mesoderm (PECAM-1), and iii) endoderm (alpha-fetoprotein) lineages. Scale bars=50 µm.

Long-term expansion with bFGF-MCMs maintained robust expression of pluripotency markers in both hPSC lines, as determined by immunofluorescence staining and flow cytometry (FIG. 15C, Table 4), and both lines displayed a normal karyotype (FIG. 15D). Following 25 passages in direct culture with bFGF-MCMs, hPSCs from both lines retained the ability to generate derivatives of ectoderm, mesoderm, and endoderm in vitro and in teratoma assays. Specifically, differentiated cells expressed βIII-tubulin (ectoderm), alpha smooth muscle actin (mesoderm), and alpha-fetoprotein (endoderm) in spontaneously differentiating embryoid bodies in vitro (FIGS. 15E & 17) and each of the hPSC lines generated teratomas containing neuroectoderm, cartilage, and liver tissue in nude mice (FIGS. 15F & 18). In addition, hPSCs were transitioned back to E8 after 25 passages in bFGF-MCM-E7, carried out directed differentiation toward neural, endothelial, and hepatic lineages, and observed generation of βIII-tubulin+neurons, PECAM-1+ endothelial cells, and AFP+ hepatocyte-like cells, respectively (FIG. 19). Taken together, these results demonstrate that direct culture with bFGF-MCMs maintains hPSC pluripotency, while reducing the amount of bFGF needed by >80% when compared to standard hPSC media.

TABLE 4

Percentage of Oct4+/Nanog+ hPSCs vs. passage number during long-term direct culture with bFGF-MCMs.

| Passage # | P6 | P10 | P20 | P25 |
|---|---|---|---|---|
| H1 hESC | 98.8% | 95.6% | 94.7% | 95.0% |
| WTc11 hiPSC | 96.8% | 92.4% | 93.1% | 92.9% |

Figure 20A:
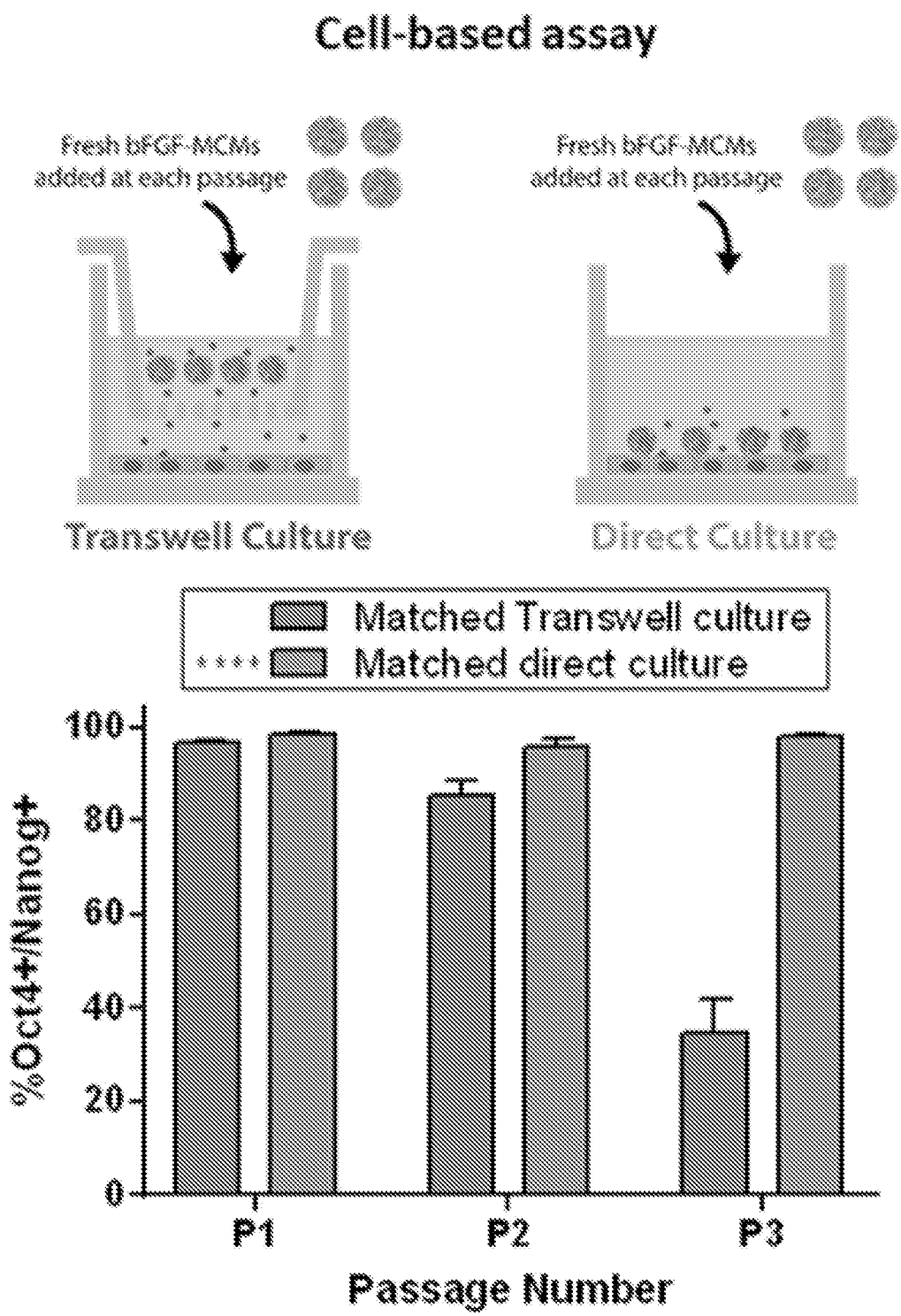
FIGS. 20A & 20B show that local delivery increases growth factor biological potency.
Figure 20B:
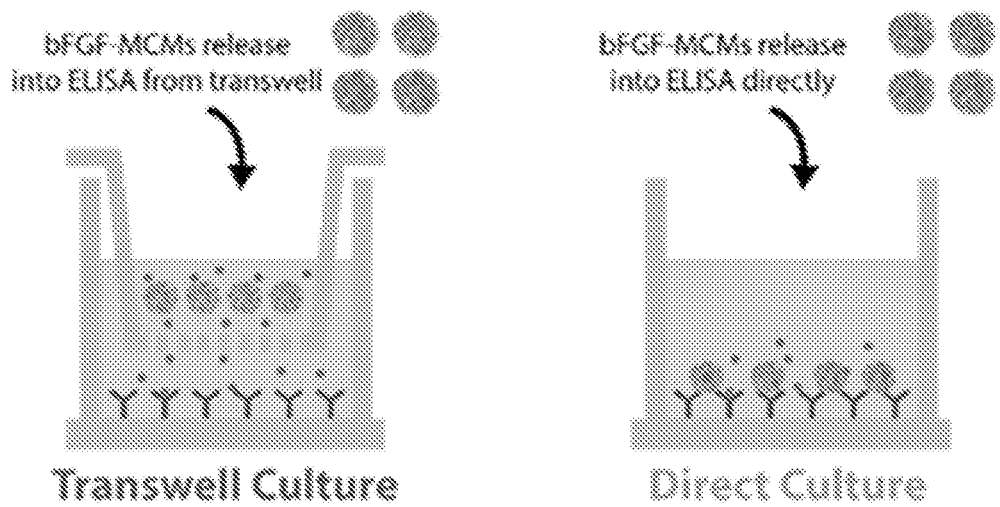
Figure 20B:
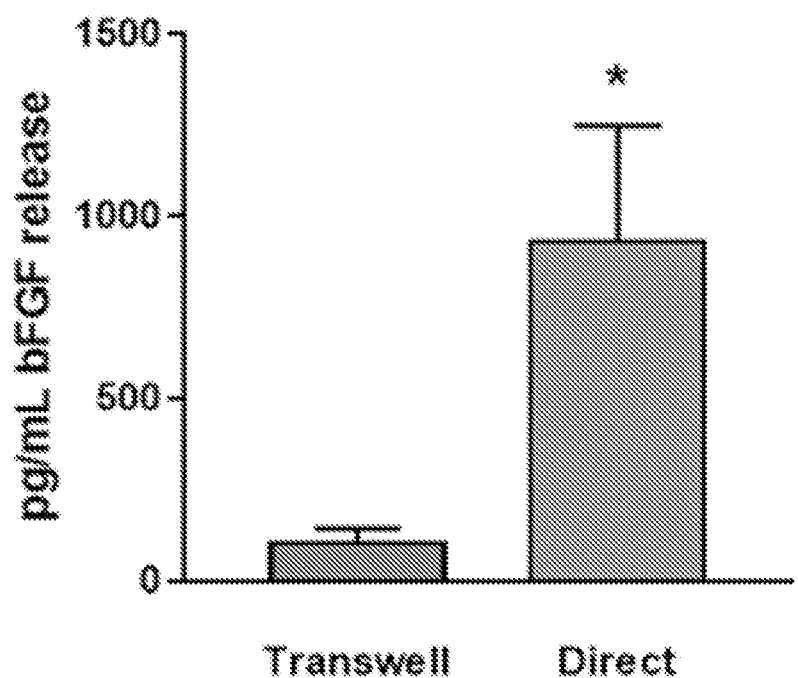

Local bFGF delivery correlated with higher growth factor activity at the culture surface and increased biological response. bFGF-MCMs in direct culture significantly outperformed Transwell culture by maintaining Oct4/Nanog expression at >95% with lower quantities of input bFGF required (FIG. 13E, Table 3). Indeed, the amount of bFGF-MCMs sufficient for long-term hPSC maintenance in direct culture was unable to maintain Oct4/Nanog expression in the Transwell culture format, even when bFGF-MCMs were added fresh at every passage (FIG. 20A). As this suggested that localization of the growth factor in close proximity to cells may enhance the biological response, we utilized an enzyme-linked immunosorbent assay (ELISA) that detects only active bFGF (FIGS. 9A, 9B & 21A-21D) to assess why localized delivery of bFGF-MCMs improved pluripotency maintenance. In this cell-free assay, a 9-fold increase was observed in the amount of active bFGF detected in direct culture relative to Transwell culture when comparing equivalent amounts of input bFGF-MCMs (FIG. 20B). This indicated that direct culture with bFGF-MCMs resulted in a higher local bioavailability of active bFGF at the culture surface compared to Transwell culture.

Figure 21A:
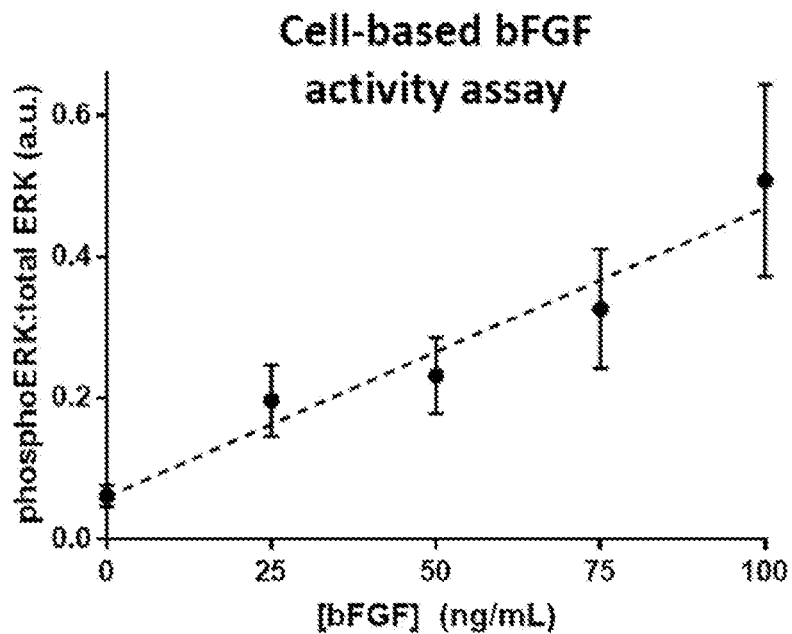
FIGS. 21A-21D show that quantikine bFGF ELISA readouts correlate with bFGF activation of MAPK pathway and reflect thermal instability of free bFGF.
Figure 21B:
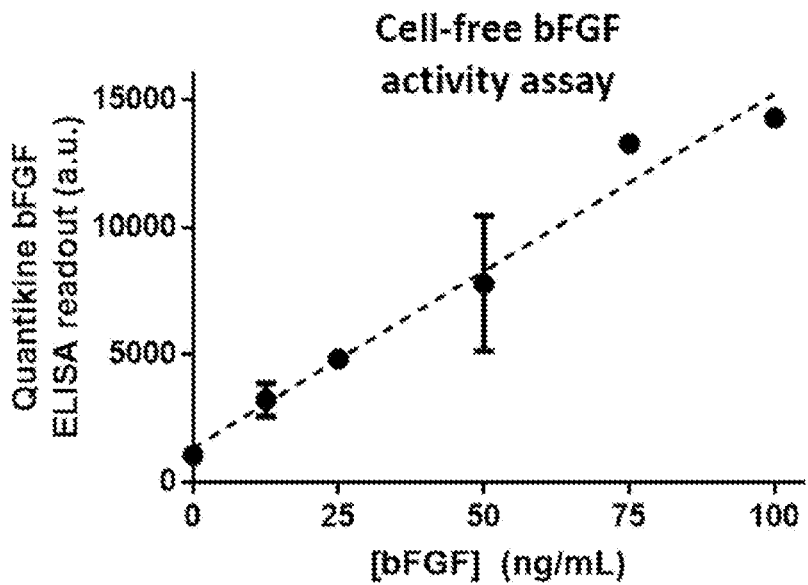
Figure 21C:
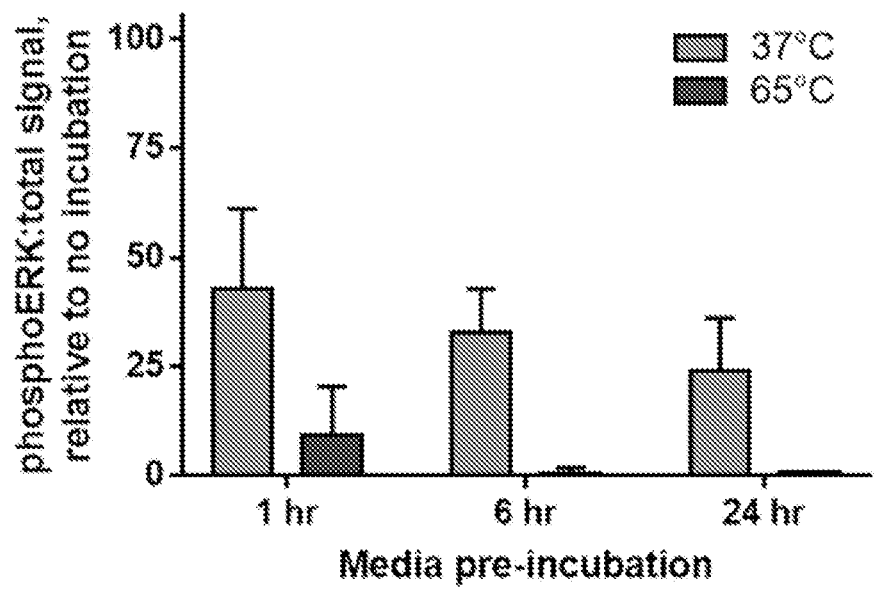
Figure 21D:
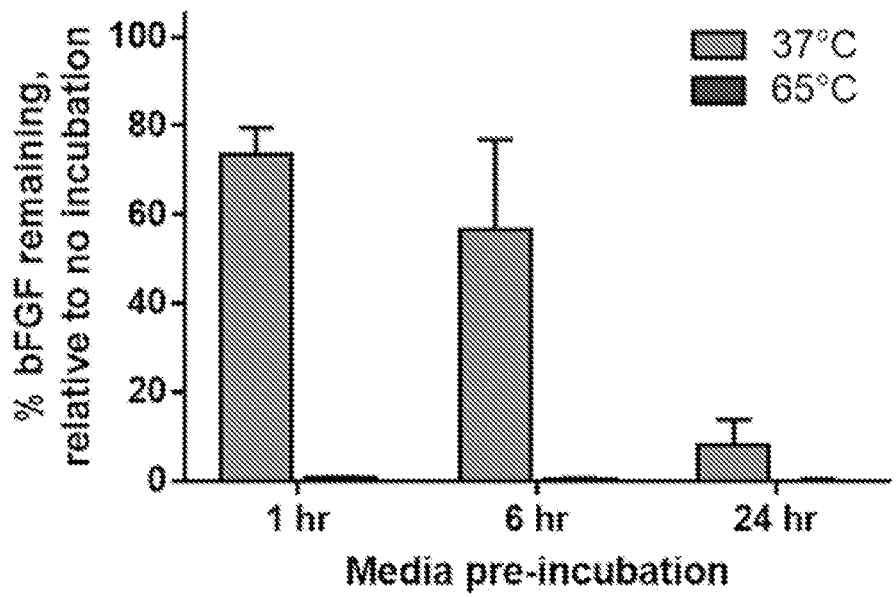
Figure 22A:
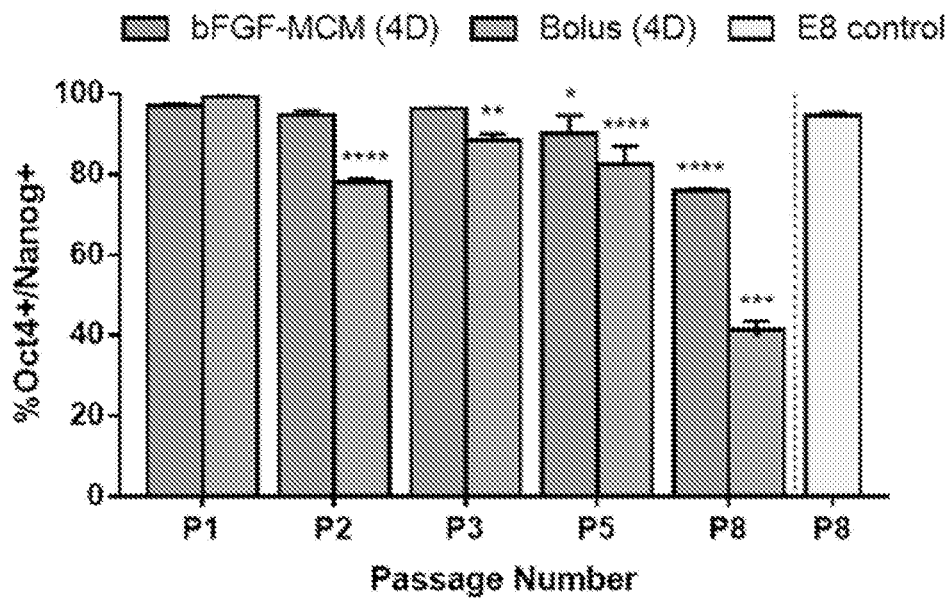
FIGS. 22A-22D depict binding to MCMs improves bFGF thermal stability.
Figure 22B:
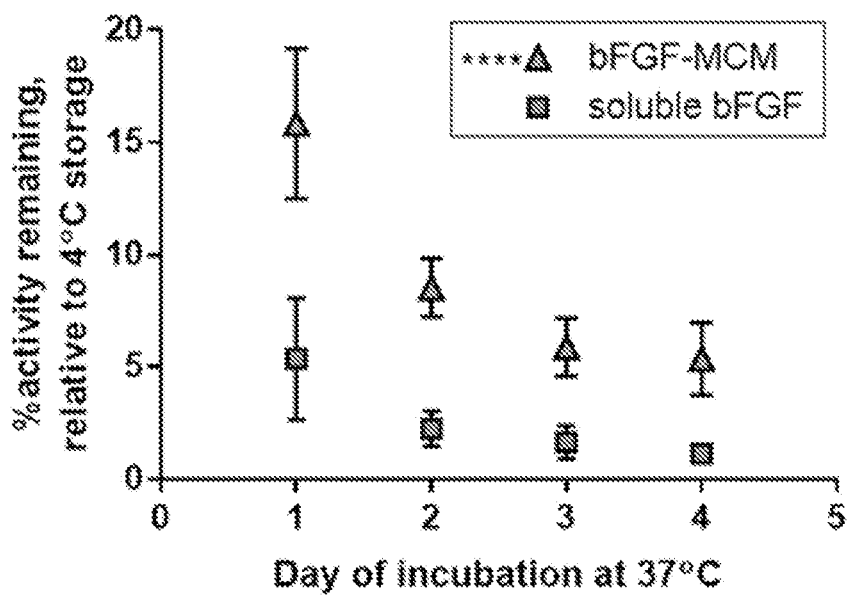

MCMs stabilized bFGF against activity loss at physiological temperatures. Experiments in which media were exchanged only at the time of cell passaging (i.e., every 4 days) showed that bFGF-MCMs better maintained Oct4/Nanog expression in hPSCs when compared to "bolus" conditions, in which a matched amount of soluble bFGF was spiked into E7 media. Under these conditions, bFGF-MCMs in direct culture maintained Oct4/Nanog expression in hPSCs for three passages (96.3±0.1% Oct4$^+$/Nanog$^+$ at P3), while bolus incorporation of soluble bFGF failed to maintain Oct4/Nanog after just one passage (78.0±0.9% Oct4+/Nanog+ at P2) (FIG. 22A). After 8 passages, bFGF-MCMs produced a substantially higher percentage of Oct4$^+$/Nanog$^+$ hPSCs (75.9±0.5%) than the bolus soluble bFGF (41.2±2.3%) (FIG. 22A). To quantify bFGF activity, a bFGF ELISA assay that gave a linear response to active bFGF concentration (FIGS. 21A & 21B) was used. Importantly, it was demonstrated that the assay detected thermally induced loss of bFGF activity in E8 media. bFGF activity loss in media pre-incubated at 37° C. and 65° C. correlated with decreases in ERK phosphorylation in hPSCs treated with the pre-incubated media (FIGS. 21C & 21D). Using the bFGF ELISA, it was observed that, while only 5.37±2.72% and 1.16±0.31% of soluble bFGF remained active after 1 and 4 days of incubation at 37° C., respectively, bFGF-MCMs maintained 15.84±3.33% and 5.36±1.61% bFGF activity over these same periods (FIG. 22B).

Figure 22C:
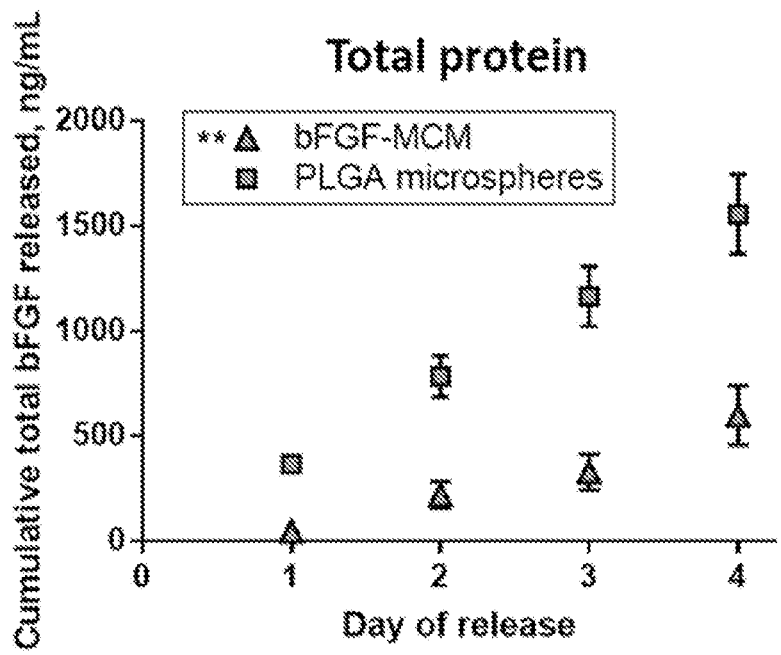
Figure 22D:
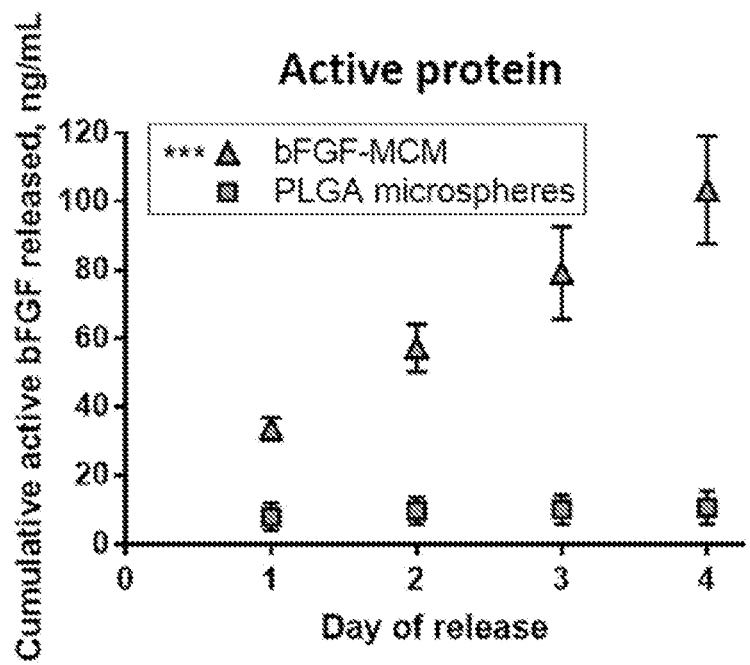

MCMs released active bFGF over four days at 37° C. more efficiently than commonly used and commercially available polymer microspheres designed for bFGF release in hPSC culture. Specifically, PLGA microspheres with encapsulated bFGF released significantly more total protein (1556±188 ng/mL cumulative) over the course of four days compared to MCMs (597±140 ng/mL) (FIG. 22C). However, MCMs released nearly 10-fold more active bFGF over four days (103.5±15.8 ng/mL cumulative) compared to PLGA microspheres (10.8±4.8 ng/mL), which only released detectable active bFGF at days 1 and 2 (FIG. 22D).

In view of the above, it will be seen that the several advantages of the disclosure are achieved and other advantageous results attained. As various changes could be made in the above methods without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A pluripotent stem cell culture method for maintaining stem cell pluripotency, the method comprising: contacting a pluripotent stem cell with a mineral coated microparticle, wherein the mineral coated microparticle comprises a core and a mineral coating that comprises fibroblast growth factor in an amount of fibroblast growth factor ranging from about 0.1 ng fibroblast growth factor per mg mineral coated microparticle to about 10,000 ng fibroblast growth factor per mg mineral coated microparticle, and wherein stem cell pluripotency is maintained when a minimum of 95% Oct4$^+$/Nanog$^+$ cell population is maintained at each cell passage.

2. The method of claim 1, wherein the fibroblast growth factor is selected from the group consisting of purified fibroblast growth factor, recombinant fibroblast growth factor, and combinations thereof.

3. The method of claim 1, wherein the fibroblast growth factor is basic fibroblast growth factor.

4. The method of claim 1, wherein the pluripotent stem cell is contacted with the mineral coated microparticle using a cell culture insert or the pluripotent stem cell is directly contacted with the mineral coated microparticle.

5. The method of claim 1, further comprising analyzing a cell for a marker selected from the group consisting of Oct4, Nanog, Sox2, SSEQ-4, TRA-1-60, TRA-1-81, and combinations thereof.

6. The method of claim 3, wherein the mineral coating comprises the basic fibroblast growth factor in an amount of about 1 µg per mg mineral coated microparticle.

7. The pluripotent stem cell culture method of claim 1, wherein the mineral coated microparticle is added at a concentration less than 0.5 mg/ml and the fibroblast growth factor is greater than 380 ng/ml.

8. A pluripotent stem cell culture method of claim 1, wherein the mineral coated microparticle is added at a concentration less than 0.5 mg/ml, and wherein the fibroblast growth factor ranges from greater than 760 ng fibroblast growth factor per mg mineral coated microparticle to less than or equal to 7,026 ng fibroblast growth factor per mg mineral coated microparticle.

* * * * *